(12) United States Patent
Kladde

(10) Patent No.: US 8,087,729 B2
(45) Date of Patent: Jan. 3, 2012

(54) AIRCRAFT SEAT

(75) Inventor: Burkley U Kladde, Chandler, AZ (US)

(73) Assignee: Wolfgang K, LLC, Chandler, AZ (US)

( * ) Notice: Subject to any disclaimer, the term of this patent is extended or adjusted under 35 U.S.C. 154(b) by 426 days.

(21) Appl. No.: 12/330,892

(22) Filed: Dec. 9, 2008

(65) Prior Publication Data

US 2010/0140999 A1 Jun. 10, 2010

(51) Int. Cl.
A47C 1/12 (2006.01)

(52) U.S. Cl. .................................. 297/445.1

(58) Field of Classification Search ............ 297/452.56, 297/354.1, 452.1, 445.1; 244/118.6
See application file for complete search history.

(56) References Cited

U.S. PATENT DOCUMENTS

| | | | |
|---|---|---|---|
| 3,485,527 A * | 12/1969 | Barghout | 297/445.1 |
| 3,581,620 A | 6/1971 | Hauck et al. | |
| 3,833,257 A | 9/1974 | Dove | |
| 3,883,173 A | 5/1975 | Shephard et al. | |
| 3,910,632 A | 10/1975 | Marechal | |
| 4,055,320 A | 10/1977 | Bengtsson | |
| 4,526,421 A | 7/1985 | Brennan et al. | |
| 4,630,864 A * | 12/1986 | Toll | 297/232 |
| 4,979,778 A | 12/1990 | Shields | |
| 5,143,421 A | 9/1992 | Voss et al. | |
| 5,344,210 A | 9/1994 | Marwan et al. | |
| 5,385,388 A | 1/1995 | Faiks et al. | |
| 5,452,868 A | 9/1995 | Kanigowski | |
| 5,624,158 A | 4/1997 | Adat et al. | |
| 5,636,898 A | 6/1997 | Dixon | |
| 5,699,984 A | 12/1997 | Pinault | |
| 6,237,994 B1 | 5/2001 | Bentley et al. | |
| 6,394,545 B2 | 5/2002 | Knoblock et al. | |
| 6,439,661 B1 | 8/2002 | Brauning | |
| 6,532,962 B1 | 3/2003 | Walker et al. | |
| 6,616,228 B2 | 9/2003 | Heidmann | |
| 6,742,840 B2 | 6/2004 | Bentley | |

(Continued)

FOREIGN PATENT DOCUMENTS

DE 37 37 492 A1 5/1989

(Continued)

OTHER PUBLICATIONS

International Search Report mailed Sep. 28, 2010 for International Appln. No. PCT/US09/067107.

(Continued)

*Primary Examiner* — Milton Nelson, Jr.
(74) *Attorney, Agent, or Firm* — Lathrop & Clark LLP

(57) ABSTRACT

A seat for use in an aircraft having a floor is disclosed. The seat has a support assembly adapted to be secured to the floor, a seat having a central portion and a rear portion, a seat back pivotably coupled to the support assembly for movement between an upright position and a reclined position relative to the support assembly. A pivot assembly couples the central portion of the seat to the support assembly for permitting the seat to pivot about a pivot axis relative to the support assembly. A connector assembly couples the rear portion of the seat to the seat back for causing the rear portion of the seat to pivot downwardly about the pivot axis in unison with the seat back as the seat back moves from the upright position to the reclined position A method of construction of an aircraft seat frame is also disclosed. An armrest for an aircraft seat is further disclosed.

3 Claims, 40 Drawing Sheets

U.S. PATENT DOCUMENTS

| | | | |
|---|---|---|---|
| 6,758,523 B2 | 7/2004 | VanDeRiet et al. | |
| 6,764,137 B2 | 7/2004 | Menard | |
| 6,913,315 B2 | 7/2005 | Ball et al. | |
| 6,966,604 B2 | 11/2005 | Stumpf et al. | |
| 6,991,291 B2 | 1/2006 | Knoblock et al. | |
| 7,032,971 B2 | 4/2006 | Williams | |
| 7,083,230 B2 | 8/2006 | Kull et al. | |
| 7,097,249 B2 | 8/2006 | Igarashi et al. | |
| 7,108,325 B2 | 9/2006 | Williamson et al. | |
| 7,131,700 B2 | 11/2006 | Knoblock et al. | |
| 7,140,684 B2 | 11/2006 | Wagner et al. | |
| 7,249,802 B2 | 7/2007 | Schmitz et al. | |
| 2006/0082208 A1 | 4/2006 | Beermann et al. | |
| 2007/0024098 A1 | 2/2007 | Knoblock et al. | |
| 2007/0065248 A1 | 3/2007 | Legeay | |
| 2008/0124557 A1* | 5/2008 | Freestone | 428/425.8 |
| 2008/0169694 A1 | 7/2008 | Speh et al. | |
| 2009/0084925 A1* | 4/2009 | Kismarton | 248/503.1 |
| 2010/0187895 A1* | 7/2010 | Kismarton et al. | 297/452.18 |

FOREIGN PATENT DOCUMENTS

| | | |
|---|---|---|
| DE | 101 22 386 A1 | 11/2002 |
| DE | 101 35 857 C1 | 11/2002 |
| FR | 2 433 433 A1 | 3/1980 |
| WO | WO 02/051703 A1 | 7/2002 |
| WO | WO 2007/095522 A2 | 8/2007 |
| WO | WO 2007/110732 A2 | 10/2007 |

OTHER PUBLICATIONS

International Search Report issued Sep. 28, 2010 in International Application No. PCT/US09/067107.

Amendment under Article 34 filed Dec. 28, 2010, in International Application No. PCT/US09/067107.

Hermanmiller, *Embody Chair for Your Body and Mind*, Product data sheet off of Hermanmiller website, http://www.hermanmiller.com/CDA/SSA/Product/0,,a10-c440-p271,00.html (Oct. 27, 2008).

* cited by examiner

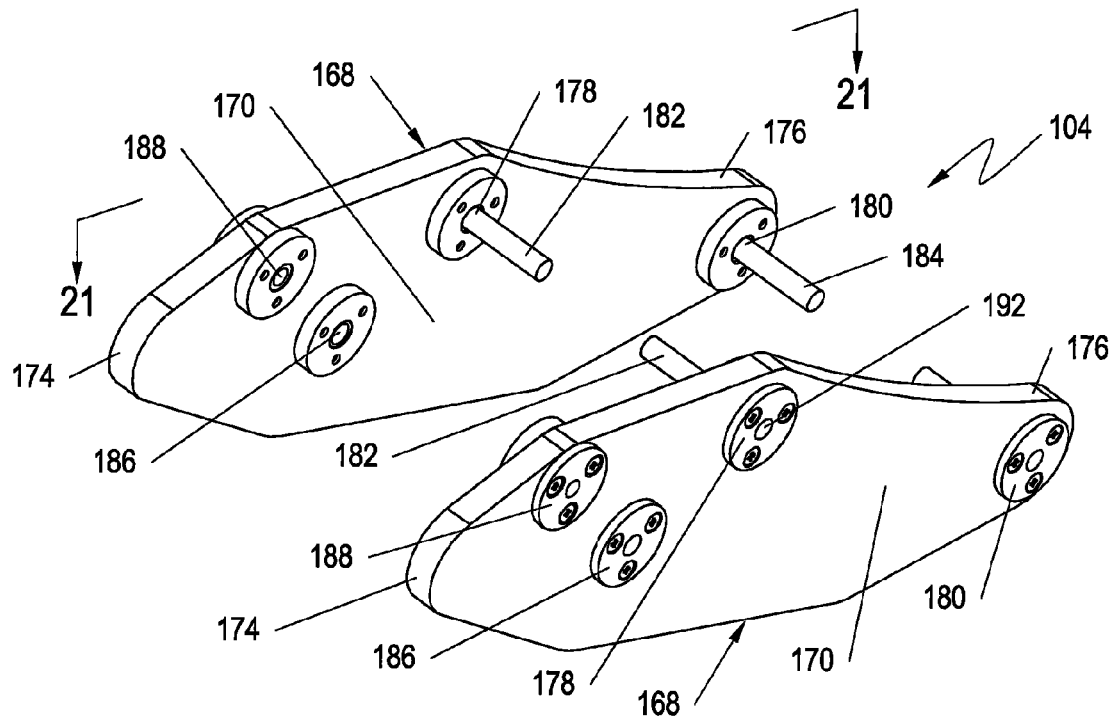
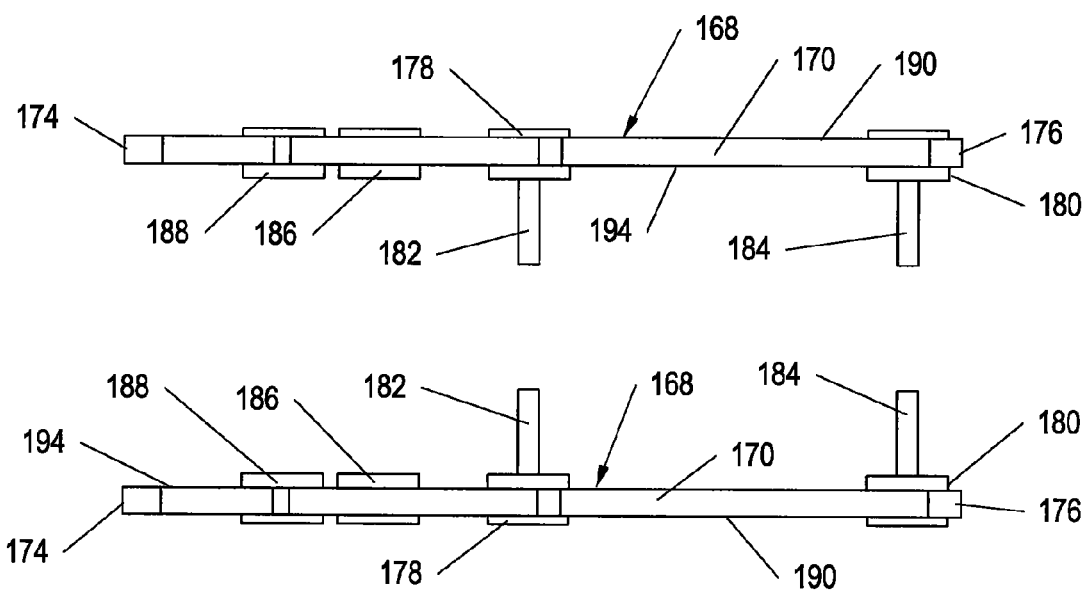
FIG. 21

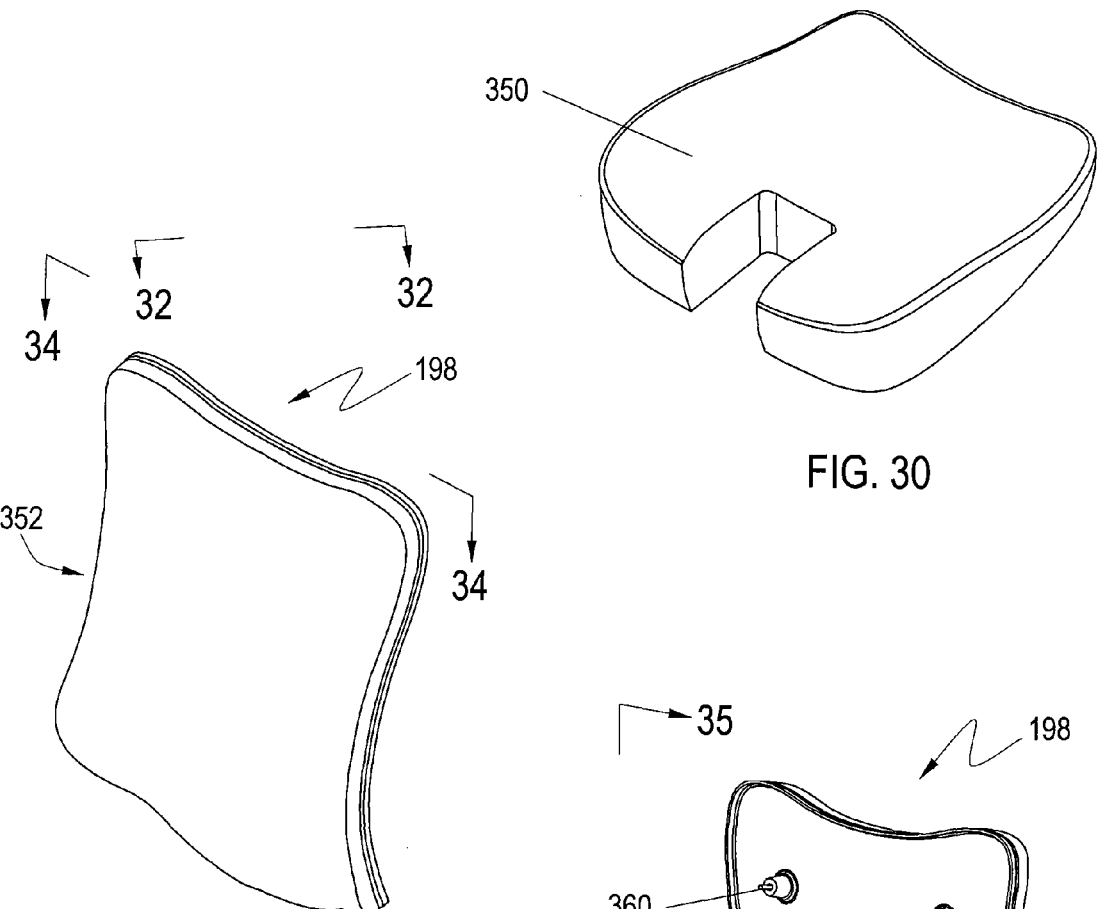
FIG. 30
FIG. 31
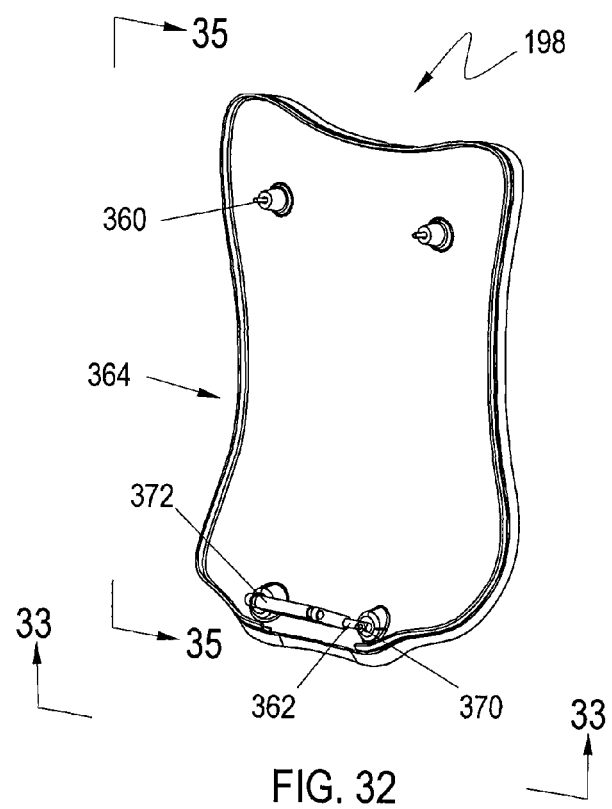
FIG. 32

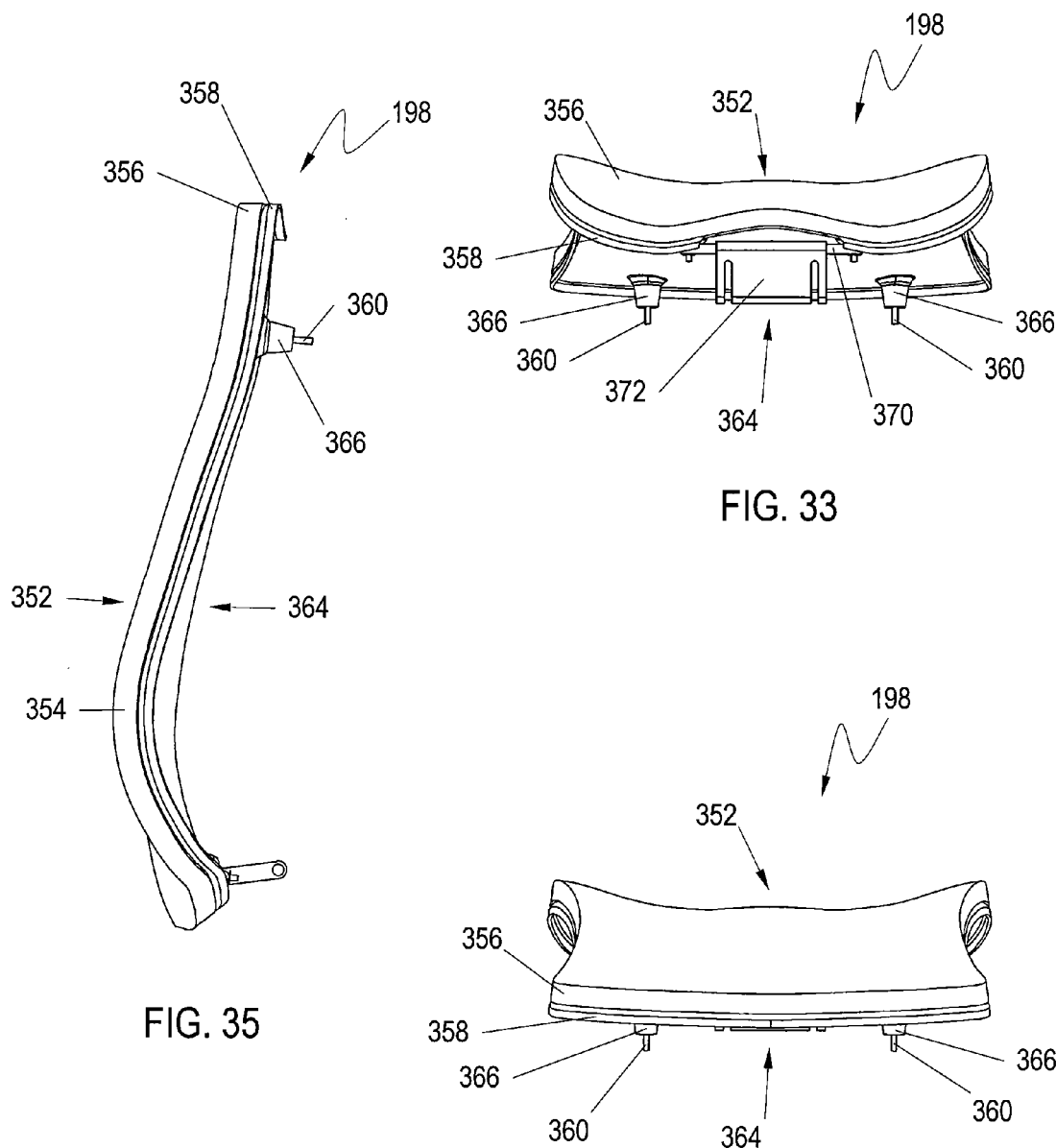

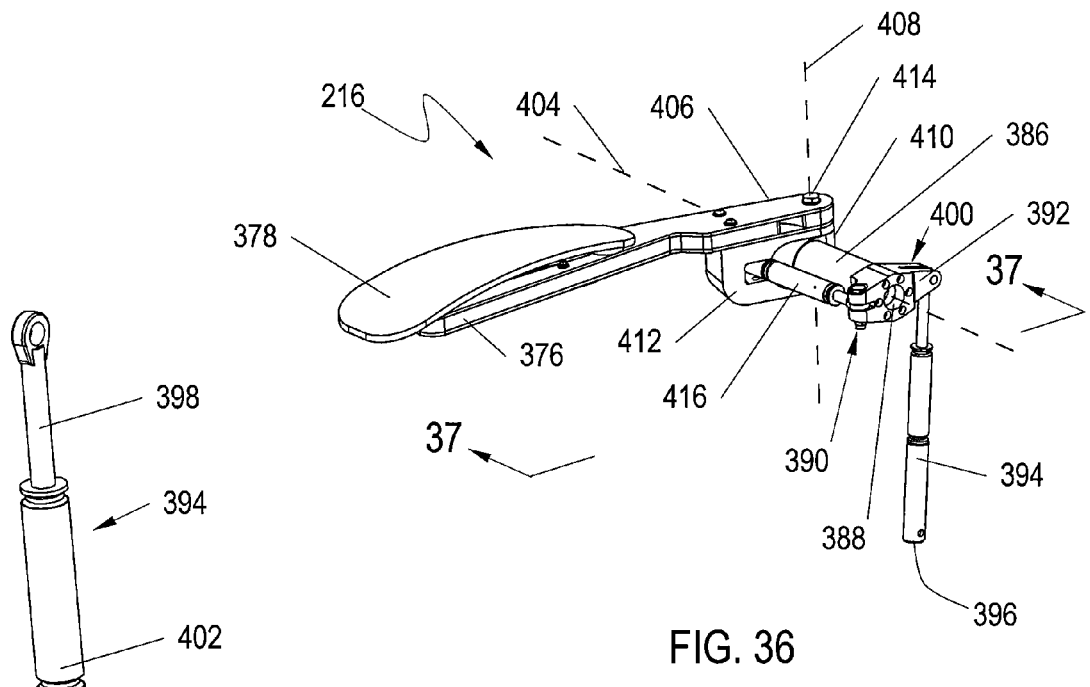
FIG. 36
FIG. 38
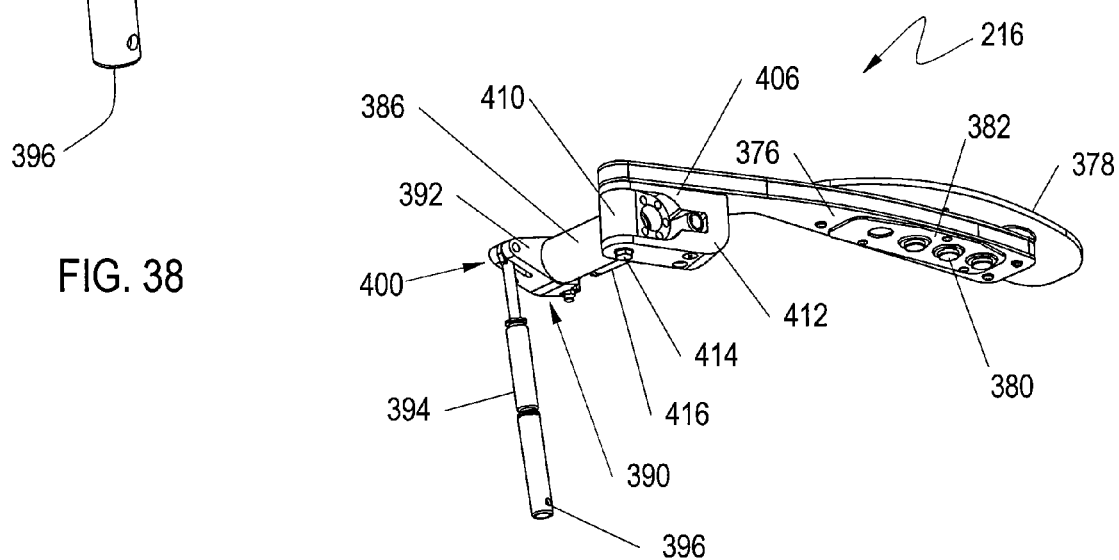
FIG. 37

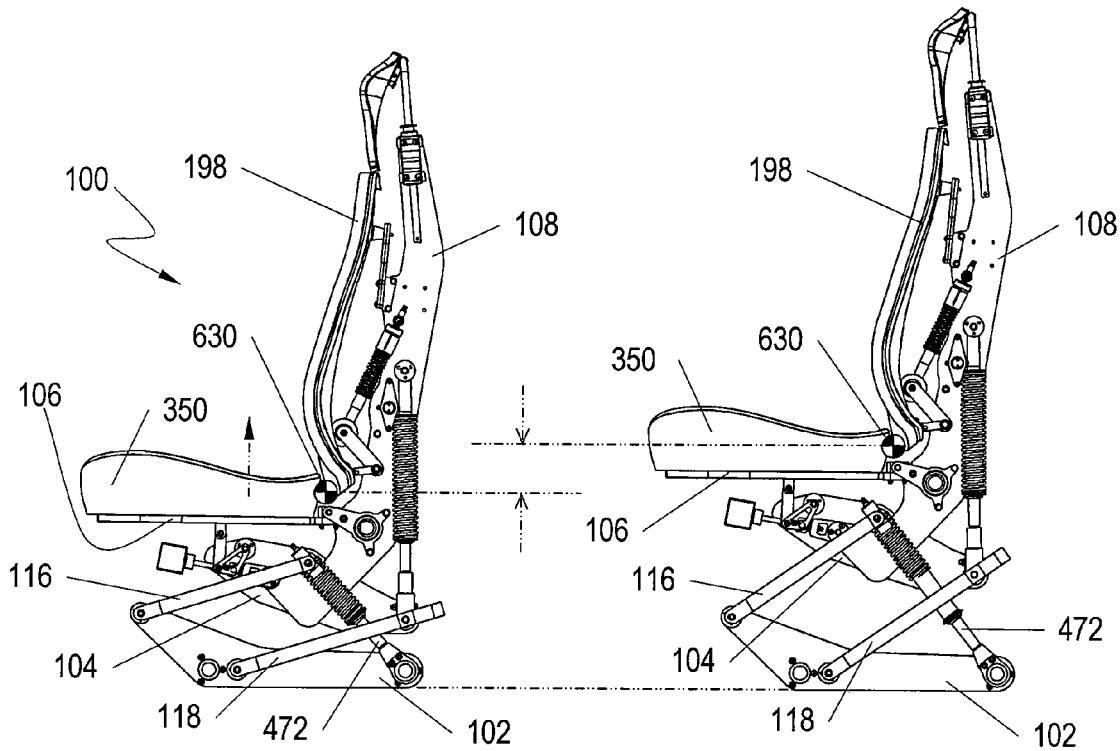
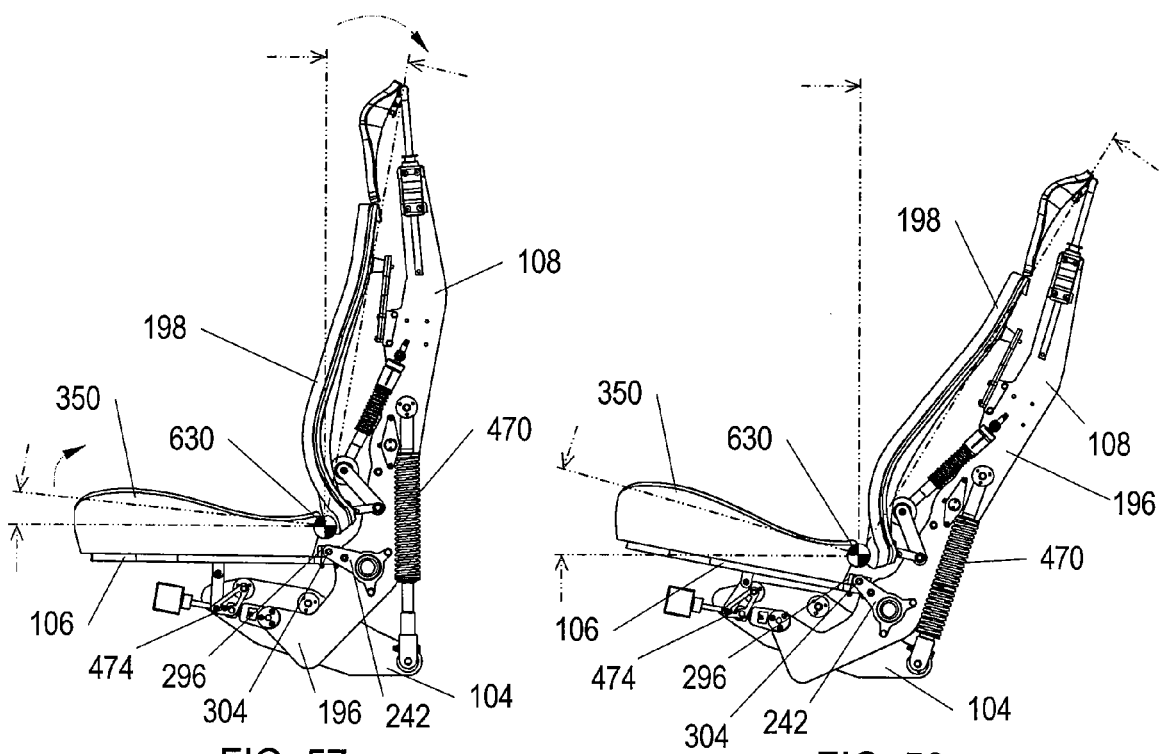
FIG. 55　FIG. 56　FIG. 57　FIG. 58

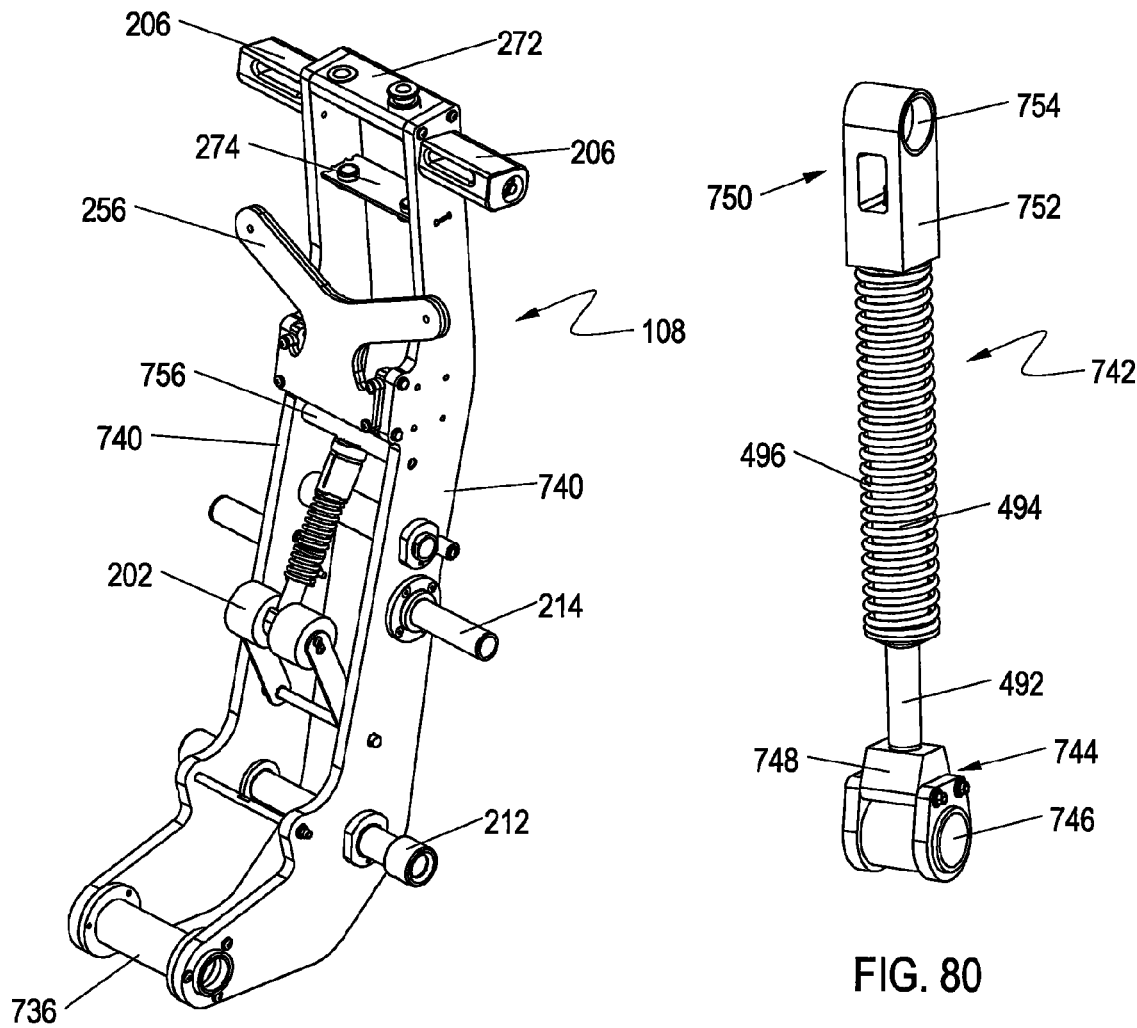
FIG. 80
FIG. 79
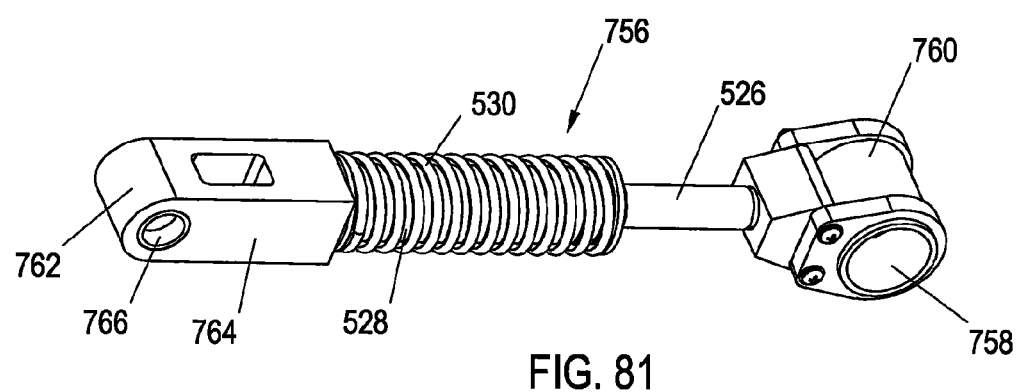
FIG. 81

AIRCRAFT SEAT

SCOPE OF THE INVENTION

The present invention relates to seating and more particular to aircraft seating.

BACKGROUND

Aircraft seats have specific performance requirements that generally relate to weight and crash loads, typically requiring low weight and high strength. These performance requirements are often significant drivers of seat design, especially in seats including integral occupant restraints.

The performance requirements are not always aligned with seat comfort. For instance, to attempt to accommodate occupant comfort, current aircraft seats are able to recline by changing the angle of the seat back. In such a traditional aircraft seat, as the seat back is reclined, increasing frictional force is required under the occupant's backside to keep the occupant from sliding out of the seat. This friction uncomfortably tugs on clothing, can lead to the occupant sliding forward, and may create a gap in the lumbar region of the back or spine. This leads to back fatigue, discomfort, loss of concentration, and the possibility of injury.

Another typical concern with aircraft seats, and specifically flight deck seats, is the ability of the pilot to fully extend his or her legs to fully actuate the rudder pedals of the aircraft. In current aircraft seats, this need is addressed through complicated mechanisms that "give-way" under load. These systems, unfortunately, are often poorly designed from an ergonomic perspective and are not well-understood by users, causing misuse and reduced comfort.

Traditional back cushions used for flight deck seats include thick, in some instances contoured foam cores with lateral/side bolstering. These cushion designs are frequently adapted from automobiles or ground vehicles. During cornering, ground vehicle occupants experience lateral acceleration or force. However, aircraft do not generate any significant lateral load or force, as turns are primarily executed by rolling the aircraft about its longitudinal axis. This rolling motion keeps the acceleration or force associated with turning in a vertical orientation relative to the aircraft seat. Thus, lateral or side bolsters as used in ground vehicles and traditional aircraft seats are largely unnecessary in an aircraft, and represent a size-limiting feature that may create comfort issues for larger occupants. The non-integrated design of current aircraft seats requires the use of thick foam cushion cores that are contoured, with or without side bolstering, to provide a suitable occupant interface. Thus, the extra thickness of foam is detrimental to the overall weight of the seat, which is a significant performance metric.

Current flight deck seats for aircraft also employ poor ergonomic adjustment mechanisms for tailoring the support of the back cushion. Some currently available seats include adjusters that allow the occupant to move the entire back cushion up and down, as well as to recline the entire cushion relative to the remainder of the seat back structure such that the bottom edge of the back cushion is thrust forward toward the occupant's lower back. Unfortunately, occupants do not typically have a back shape consistent with the first form of adjuster. Other currently available seats include an adjustable lumbar support widely used in automotive applications to provide lumbar "support" by pushing the back cushion out in an attempt to force proper back curvature. With respect to these seats, however, it has been found that pressure applied in the lumbar area of the back does not necessarily result in healthy posture, and the lumbar curvature pressure application location varies more over a range of occupant sizes as compared to the lumbosacral area, which varies less over the same range.

There is a need for an aircraft seat that improves occupant comfort but continues to meet the performance requirements of an aircraft seat.

SUMMARY OF THE INVENTION

A seat for use in an aircraft having a floor is disclosed. The aircraft seat has a support assembly adapted to be secured to the floor, a seat having a central portion and a rear portion, and a seat back pivotably coupled to the support assembly for movement between an upright position and a reclined position relative to the support assembly. A pivot assembly couples the central portion of the seat to the support assembly for permitting the seat to pivot about a pivot axis relative to the support assembly. A connector assembly couples the rear portion of the seat to the seat back for causing the rear portion of the seat to pivot downwardly about the pivot axis in unison with the seat back as the seat back moves from the upright position to the reclined position.

A method of construction of an aircraft seat frame is also disclosed. The method includes the step of providing at least one flat graphite composite plate of uniform construction and thickness. All primary structural components of the frame are two-dimensionally cut from the at least one flat graphite composite plate, forming a plurality of primary structural components of uniform construction and thickness. The plurality of primary structural components are assembled into a seat frame.

An armrest for an aircraft seat is also disclosed. The armrest comprises an arm support portion having a first end and a second end. The armrest also includes a first pivot member. The first end of the arm support portion is attached to the first pivot member for pivoting the arm support portion about a first axis. A second pivot member is linked to the first pivot member for pivoting the arm support portion about a second axis perpendicular to the first axis such that the arm support portion may be positionally adjusted.

BRIEF DESCRIPTION OF THE DRAWINGS

FIG. 20 is a perspective view of the mid support structure of the aircraft seat of FIG. 1.

FIG. 21 is a top plan view of the mid support structure of the aircraft seat of FIG. 1, taken along line 21-21 of FIG. 20.

FIG. 30 is a perspective view of a seat cushion for use with the aircraft seat of FIG. 1.

FIG. 31 is a perspective view of the back support for use with the aircraft seat of FIG. 1.

FIG. 32 is a perspective view of the back support for use with the aircraft seat of FIG. 1, taken along line 32-32 of FIG. 31.

FIG. 33 is a bottom plan view of the back support for use with the aircraft seat of FIG. 1, taken along line 33-33 of FIG. 32.

FIG. 34 is a top plan view of the back support for use with the aircraft seat of FIG. 1, taken along line 34-34 of FIG. 31.

FIG. 35 is a side elevation view of the back support for use with the aircraft seat of FIG. 1, taken along line 35-35 of FIG. 32.

FIG. 36 is a perspective view of an armrest assembly for use with the aircraft seat of FIG. 1.

FIG. 37 is a perspective view of an armrest assembly for use with the aircraft seat of FIG. 1, taken along line 37-37 of FIG. 36.

FIG. 38 is a perspective view of a telescoping arm of the armrest assembly of FIG. 36 for use with the aircraft seat of FIG. 1.

FIG. 55 is a side elevation view of the aircraft seat of FIG. 1, showing the vertical adjustment assembly in a minimum height orientation.

FIG. 56 is a side elevation view of the aircraft seat of FIG. 1, showing the vertical adjustment assembly in a maximum height orientation.

FIG. 57 is a side elevation view of the aircraft seat of FIG. 1, absent the lower support structure and showing the recline adjustment assembly in an maximum upright orientation.

FIG. 58 is a side elevation view of the aircraft seat of FIG. 1, absent the lower support structure and showing the recline adjustment assembly in an maximum recline orientation.

FIG. 79 is a perspective view of a seat back support structure of the aircraft seat shown in FIG. 70.

FIG. 80 is a perspective view of a recline adjustment actuator assembly for use with the aircraft seat shown in FIG. 70.

FIG. 81 is a perspective view of a height adjustment actuator assembly for use with the aircraft seat shown in FIG. 70.

DESCRIPTION OF THE INVENTION

Figure 1:
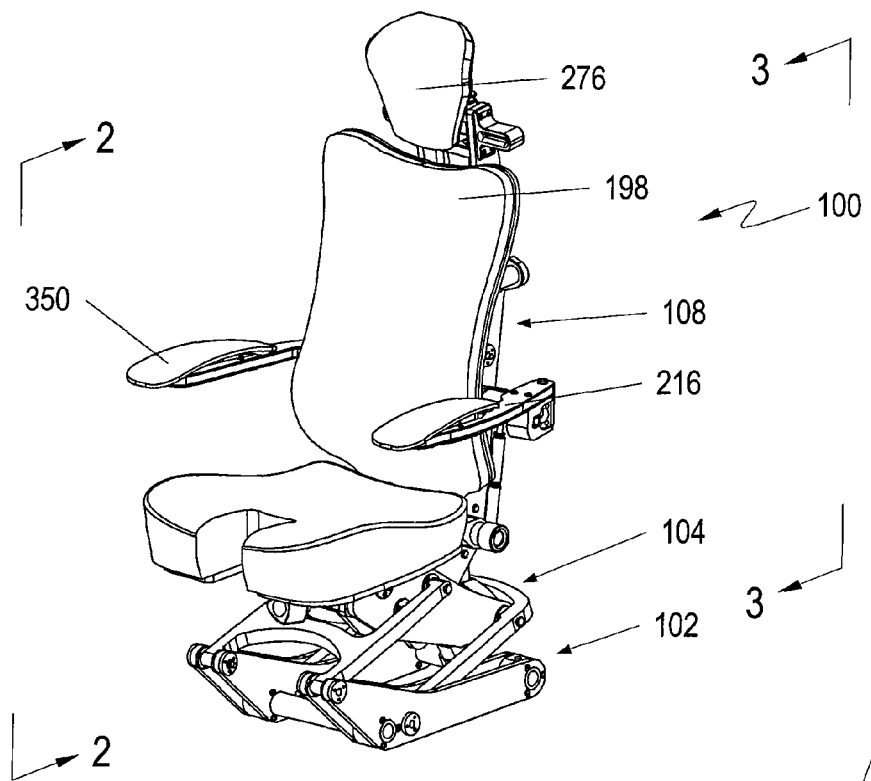
FIG. 1 is a perspective view of an aircraft seat of the present invention.
Figure 2:
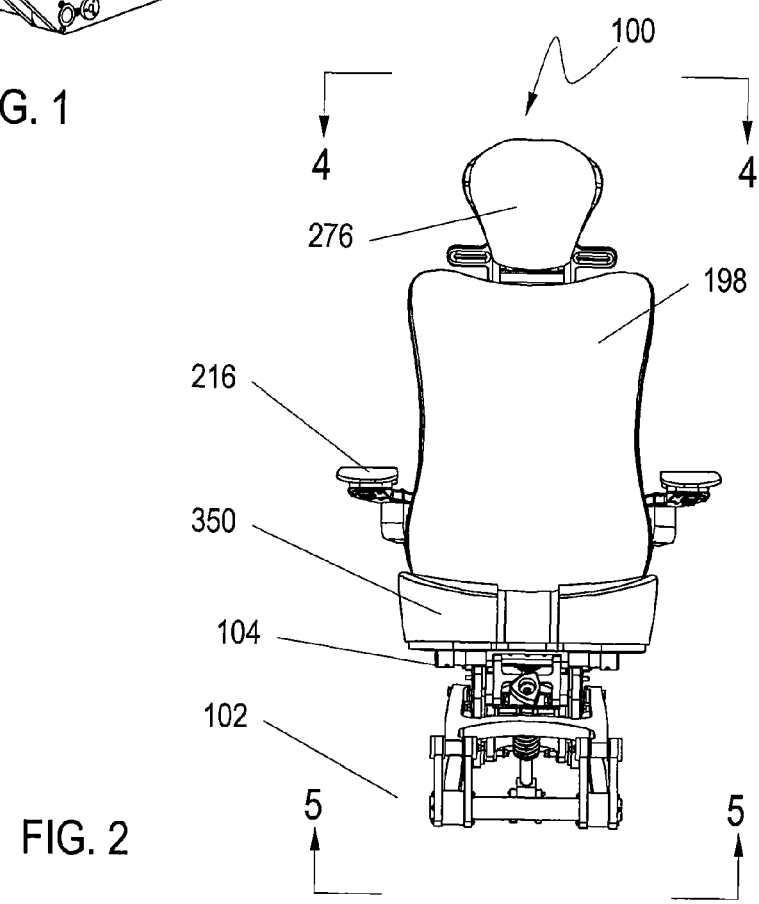
FIG. 2 is a front elevation view of the aircraft seat of FIG. 1, taken along line 2-2 of FIG. 1.

The invention is generally directed to an aircraft seat, and in particular, to a highly adjustable aircraft seat. The seat of the embodiments disclosed herein is preferably for use in transport category airplanes, including but not limited to, military and civil applications in the form of flight deck seating, as well as cabin observer and cabin operator applications. However, one of skill in the art would understand that the seat, its components and mechanisms described herein are applicable to any aircraft seat.

The aircraft seat 100 of an exemplary embodiment is largely constructed of composite plates, such as graphite composite plates, and more preferably flat graphite composite plates. Alternative materials, including but not limited to metals and plastics, suitable for the purposes provided herein would not depart from the overall scope of the present invention. Generally, the plates are connected at various locations by mechanical joints. The mechanical joints may be formed of the same material as the plates, an alternative material such as but not limited to a metal including but not limited to stainless steel, aluminum, titanium, or a combination thereof, or a plastic including but not limited to nylon, acetyl, or a combination thereof. The mechanical joints allow the geometry of the seat to be adjusted to accommodate a variety of occupant positions and occupant sizes. The motion of the joint connections is generally controlled by rigid links and occupant-controlled adjusters, including but not limited to, hand operated or manual telescoping adjusters, hand-lever adjusters, push-button adjusters, electric telescoping adjusters, and gas or hydraulic telescoping adjusters.

As can be seen generally from FIGS. 1-11, the aircraft seat 100 is formed by a structure or frame including one or more subassemblies carrying occupant support devices. The frame or any one or more of the subassemblies may generally form a support assembly adapted to be secured to the floor of an aircraft. A seat having a central portion and a rear portion and a seat back pivotably coupled to the support assembly may also be provided. Generally, the subassemblies include a lower support structure 102, a mid support structure 104, a pan support structure 106 and a seat back structure 108, which may form frame assembly 110.

As used herein, the terms "forward" and "front" are used to indicate occupant side of the aircraft seat assembly 100, namely, the side of the assembly which receives an occupant in a sitting position. The terms "rearward" and "back" are used to indicate non-occupant supporting or back side of the seat assembly 100. Additionally, as described herein, several assemblies may be formed of two or more substantially identical components. To this end, like reference numbers have been used to illustrate like components.

The lower support structure 102, as seen in FIGS. 9-15 is formed of base member assemblies 112 connected by a combination of cross tubes 114. Preferably, two base member assemblies 112 are connected by two cross tubes 114. The lower support structure carries swing arms 116, 118. The base member assemblies 112 provide pivot shafts for the swing arms 116, 118. The base member assemblies 112 transmit swing arm structural loads to the floor interface. The base member assemblies 112, shown in FIGS. 12-15, are each constructed of two interconnected plates 120. More preferably, each base member assembly is formed of two plates 120, two spaced apart panel spacers 122, and a plurality of panel fittings 124 which retain first and second pivot shafts 126, 128 at two locations between the plates 120.

The plates 120 are each an elongate member having a floor facing portion 130 which may be adapted to engage the floor or an assembly for securing to the floor, and an upper portion 132 or extension on the forward end 134 of the plate 120. Preferably, the plate 120 gradually increases in height from an approximate mid-portion 136 of the plate toward the upper portion 132 or forward end 134. Additionally, the forward end 134 has an inwardly angled portion 138 that extends down from the upper portion 132 to the floor facing portion 130 of the plate 120. The plates 120, and preferably two plates, are laterally positioned, and more preferably, positioned in parallel alignment. The plates 120 are connected by one or more, and more preferably, two panel spacers 122 which form cross tube 114 mounts. A first or upper pivot shaft 126 is located at, and extends between, the upper or forward end 132, 134 of the plates of base member assembly 112. A second or lower pivot shaft 128 is spaced a distance from the upper pivot shaft 126, rearward of the upper pivot shaft. Preferably, the lower pivot shaft 128 is positioned at a location between the first and second panel spacers 122. Each pivot shaft 126, 128 in the illustrated embodiment consists of male and female panel fitting components, that allow the swing arms to be installed onto the shafts, while also serving to locally reinforce the panels or plates, spreading the structural loads applied by the swing arms. A plurality of panel fittings 124 are provided attached to the plates 120. The panel fittings 120 allow the male and female portions of the pivot shafts 126, 128 to be attached through the plates 120. While specific examples are disclosed, a variety of reinforcing panel or plate fittings may be used to accomplish the purposes provided.

The base member assemblies 112 are farther aligned in parallel (see FIG. 12) in the lower support structure 102. In alignment, a cross tube mount 122 of one base member assembly 112 receives a first end 140 of a first cross-tube 114. A corresponding positioned cross tube mount 122 of a second base member assembly 112 receives a second end 142 of the cross-tube 114. A second cross tube is received in second or additional cross-tube mounts 122 in the first and second base member assemblies 112 in the same manner.

Figure 16:
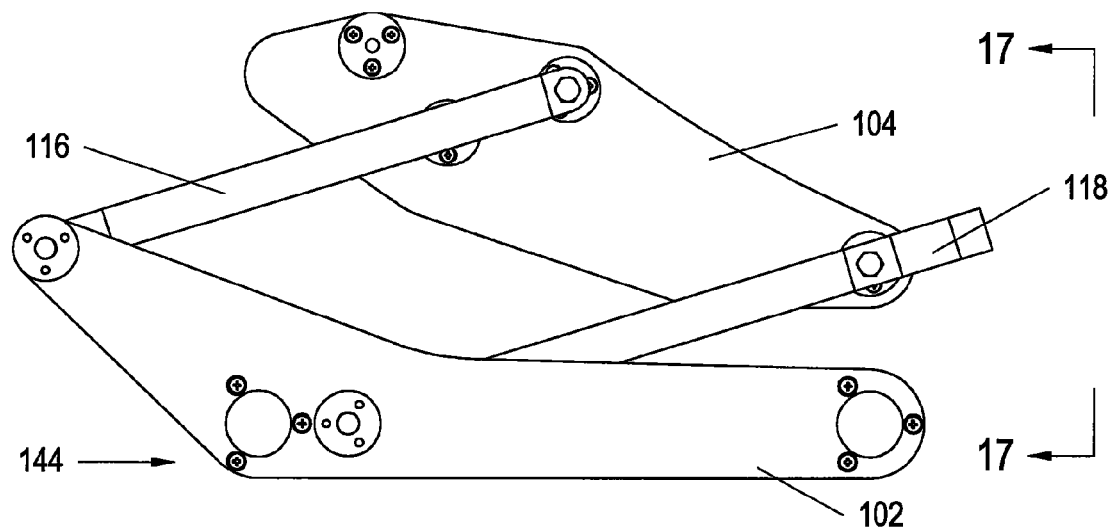
FIG. 16 is a side elevation view of the lower support structure and mid support structure of the aircraft seat of FIG. 1, showing swing arms connected between the lower support structure and mid support structure.
Figure 17:
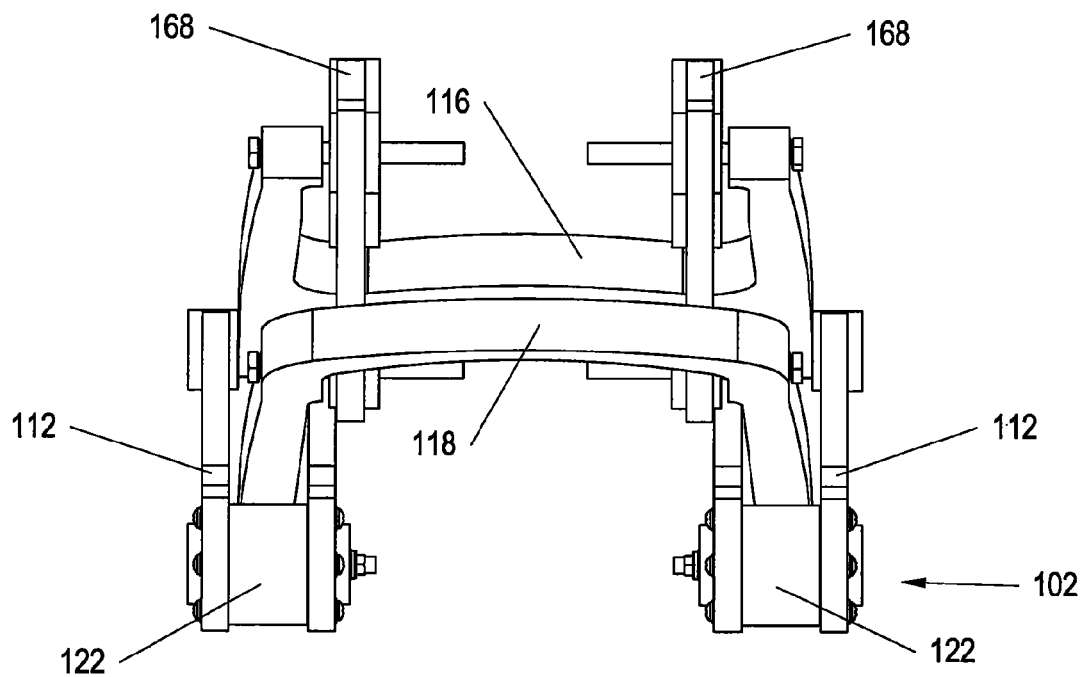
FIG. 17 is an end perspective view of the lower support structure and mid support structure of the aircraft seat of FIG. 1, taken along line 17-17 of FIG. 16, showing swing arms connected between the lower support structure and mid support structure and having cross members between base assemblies removed.

As indicated, each base member assembly 112 also supports one or more swing arms 116, 118, and preferably a portion of a swing arm. An upper swing arm 116 is pivotally attached to the base member assembly 112 at the upper portion 132 of the assembly (see FIGS. 16-17). A lower swing arm 118 is pivotally attached to the base member assembly 112 at a lower portion 144 of the base member assembly. More specifically, the upper swing arm 116 is received by the upper pivot shaft 126. Likewise, the lower swing arm 118 is received by the lower pivot shaft 128.

Figure 18:
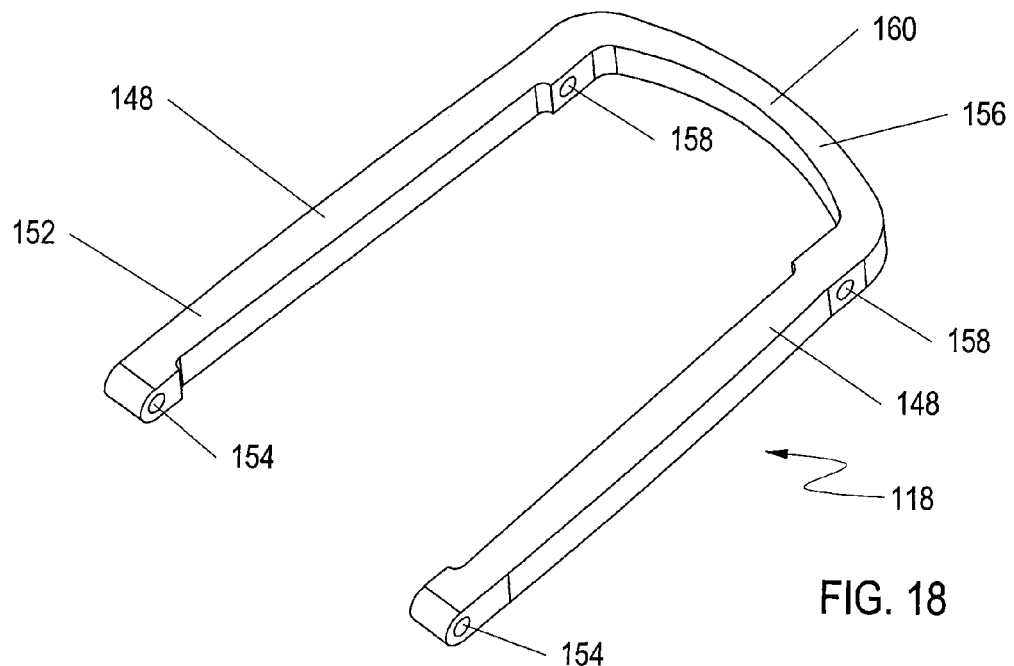
FIG. 18 is a perspective view of a swing arm used with the aircraft seat of FIG. 1.
Figure 19:
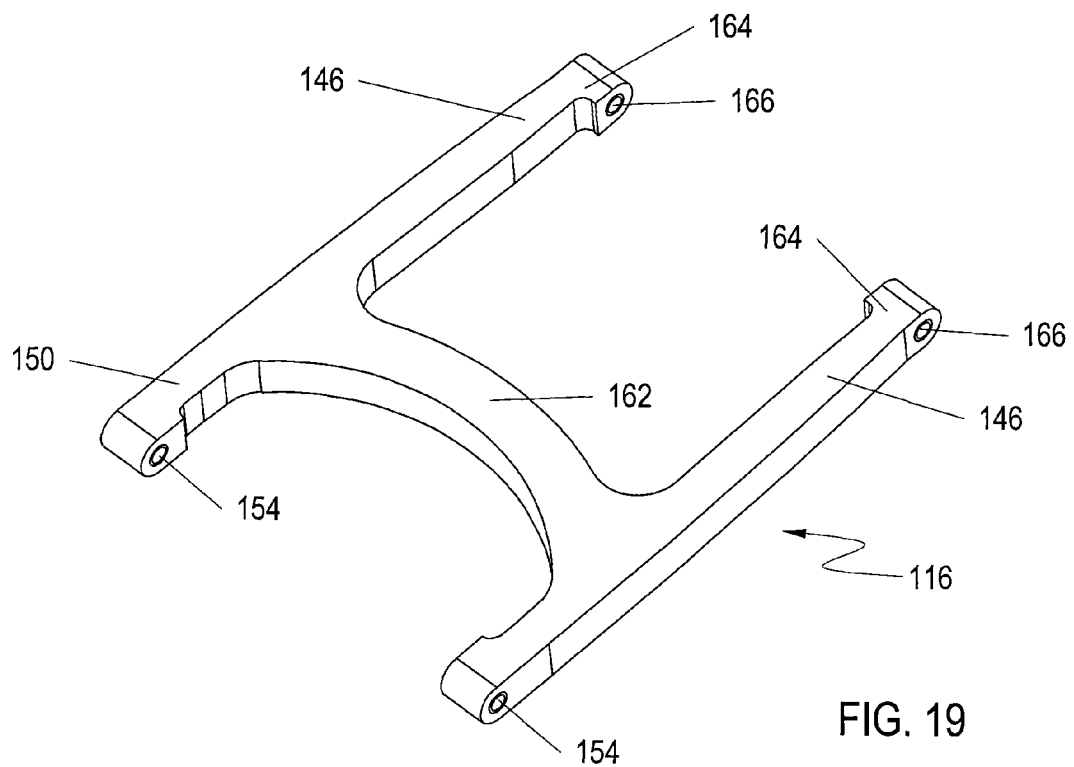
FIG. 19 is a perspective view of a swing arm used with the aircraft seat of FIG. 1.

The swing arms 116 and 118, as can be seen in FIGS. 18-19, are formed generally of two longitudinally extending arm members 146 and 148. The lower portion 150, 152 of each swing arm may be sized to fit between the two plates 120 of each base member assembly 112 and is arranged to be at least partially rotatable about a pivot shaft 126 or 128 attached to the plates. To this end, the swing arms 116, 118 include one or more apertures 154 at their lower portions 150, 152 or ends that receive the pivot shaft 126 or 128. The lower swing arm 118 further has an upper portion 156 having one or more mid-support receptors 158 formed by an aperture through the arms 146, 148 and an upper cross member 160 which connects the longitudinally extending arm members 148. Upper swing arm 116 (see FIG. 19) has a cross member 162 extending between the longitudinally extending arm members 146 and 148 between the lower portion 150, 152 and upper portions 156, 164 of the swing arms. Furthermore, the upper portion 164 of the upper swing arm includes a mid-support receptor 166 formed by an aperture through the arms 146 and 148. The apertures and mid-support receptors in the swing arms may also receive sleeve bearings that are pressed-in at the pivot connections over the pivot shafts, which provide smooth rotation over an extended lifetime.

Attached or linked to the lower support structure 102 is a mid support structure 104 (see FIGS. 9-11 and 16-17). The mid support structure 104 may be linked to the lower support structure 102 by the upper and lower swing arms 116, 118. The mid support structure 104 is a floating structure in that its lateral position is determined or controlled by its interface with the lower support structure 102 and the seat back structure 108. The interface is formed by the swing arms 116, 118.

The mid support structure 104 is preferably formed of one or more, and preferably two panel assemblies 168 (see FIG. 20). Each panel assembly 168 is formed generally of a plate 170 having a plurality of fittings 178, 180, 186, 188 thereon. The plate 170 is an elongate member having a forward end 174 and a rearward end 176. As shown in FIGS. 20-21, four panel fittings are carried by each plate and form, generally, the panel assemblies that provide an interface of the mid support structure with the lower support structure 102, the seat back structure 108, the thigh angle adjustment assembly 474, and the vertical adjustment assembly 472. At least one fitting is an upper panel fitting 178 which may be positioned in an upper position on the plate 170 between the forward and rearward ends 174 and 176 of the plate. A lower panel fitting 180 is positioned at or near the rearward end 176 of the plate 170. The panel fitting may be a male or female type connector, an anchor type connector, or other connector suitable for the purposes provided. In one example of an embodiment, the upper and lower panel fittings 178, 180 each receive a cylindrical pivot pin, forming, on each plate, an upper pivot pin 182 and a lower pivot pin 184.

The mid support structure panel assemblies 168 are arranged in parallel alignment such that they form mirror images of each other (see FIG. 21). The plates include an outer portion 190 and an inner portion 194. The inner portions 194 are arranged to face each other. The upper pivot pins 182 are adapted to engage, be received by, and may be supported at least in part by the upper swing arm mid-support receptors 166 on the plate. The pin may also be received by a pin cap 192 or similar device. The pin receives a portion of the height adjustment or vertical adjustment mechanism 472, which may also be secured by a pin cap 192. The lower pivot pins 184, similarly, are adapted to engage, be received by, and may be supported at least in part by the lower swing arm mid-support receptors 158. More specifically, the lower pivot pins are operably connected to the lower swing arm mid-support receptors 158. The lower pivot pin 184 carries a portion of the recline adjustment mechanism 470, which may be pivotable thereon. One or more pivot fasteners 192 may be provided which interface with swing arms at 158, 166 (shown in FIGS. 18 and 19). Pivot pins 182, 184 may be integrally connected and wholly constitute, or form a portion of lower or upper panel fitting 178 or 180. The swing arm mid-support receptors 158, 166, which are carried by the upper and lower swing arms 116, 118, provide pivotal movement about the upper and lower pivot pins 182, 184 on each panel assembly 168.

Also attached to each plate 170 at a position forward of the upper panel fitting 178 is one or more additional fittings, and more preferably, two fittings which may form a seat back structure connector 186 and a thigh angle adjustment assembly connector 188. The seat back structure connector 186 may receive a pivot member 228, 230 from the seat back structure 108 which pivot member is pivotable within or about the connector 186. Similarly, the thigh angle adjustment assembly connector 188 may receive a pin (not shown) or other fastening device from the thigh angle adjustment assembly 474.

Figure 9:
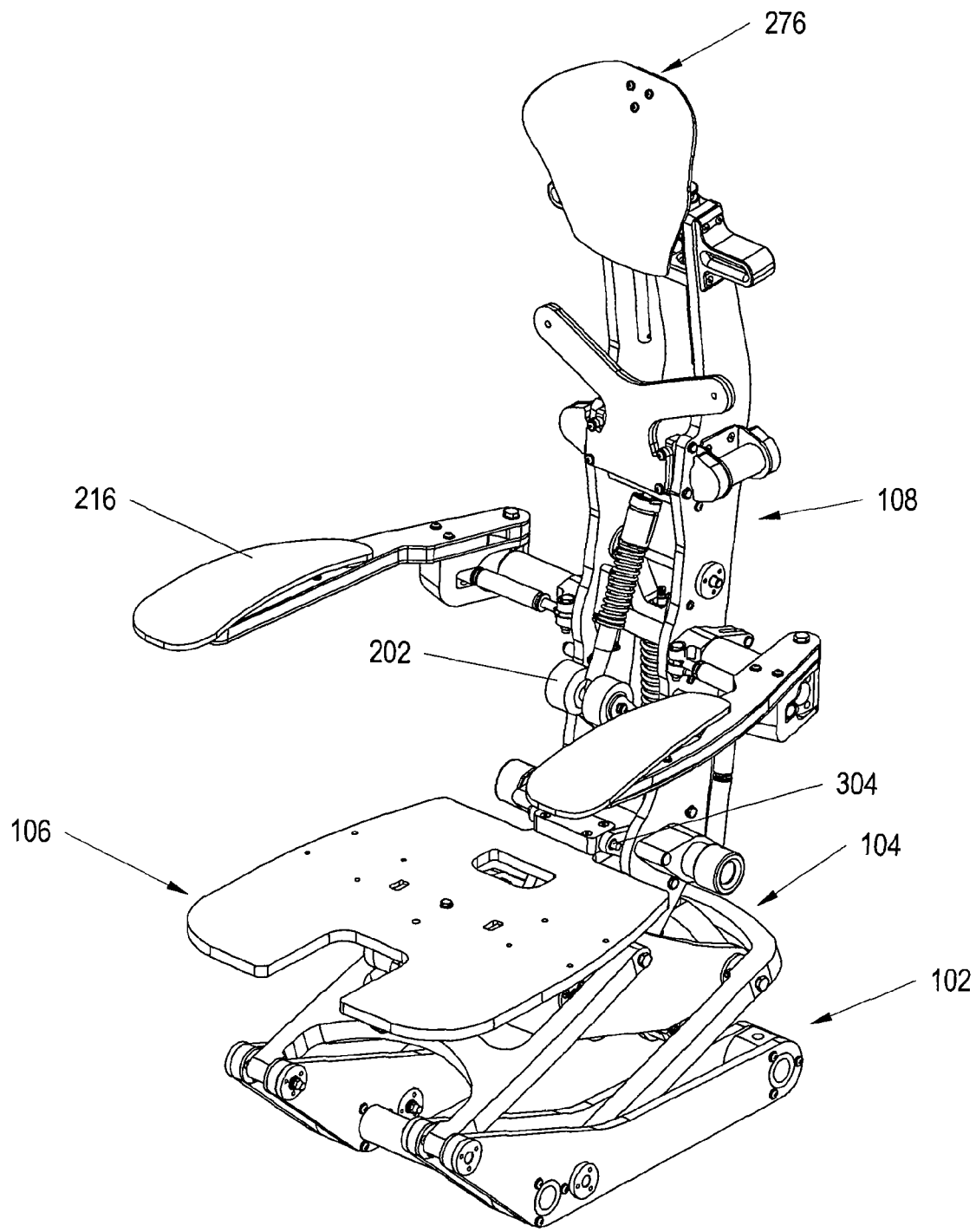
FIG. 9 is a perspective view of the aircraft seat of FIG. 1, showing the aircraft seat with seat cushion and back support removed.
Figure 10:
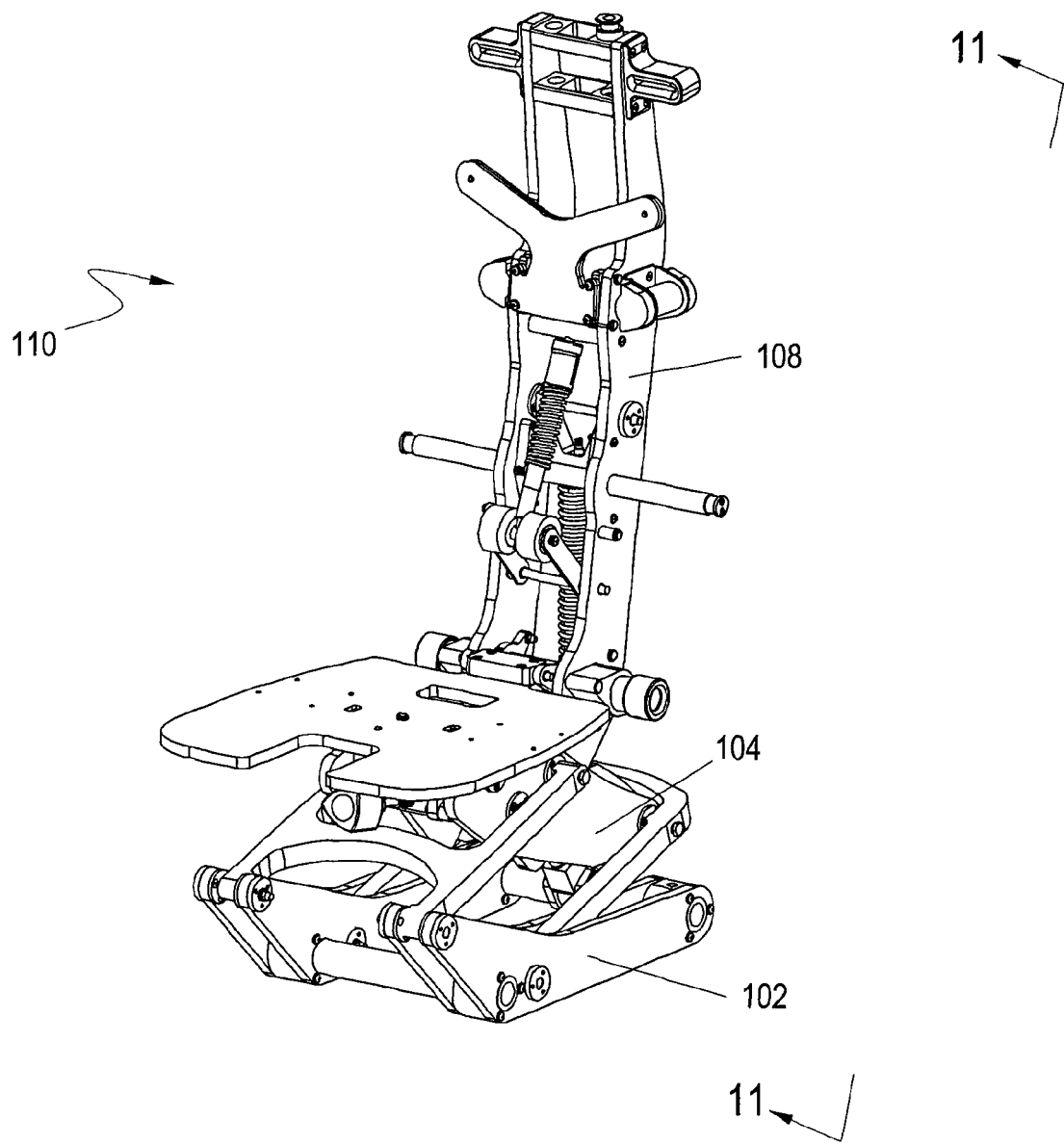
FIG. 10 is a perspective view of the aircraft seat of FIG. 1, showing the frame assembly without the pan support structure.
Figure 11:
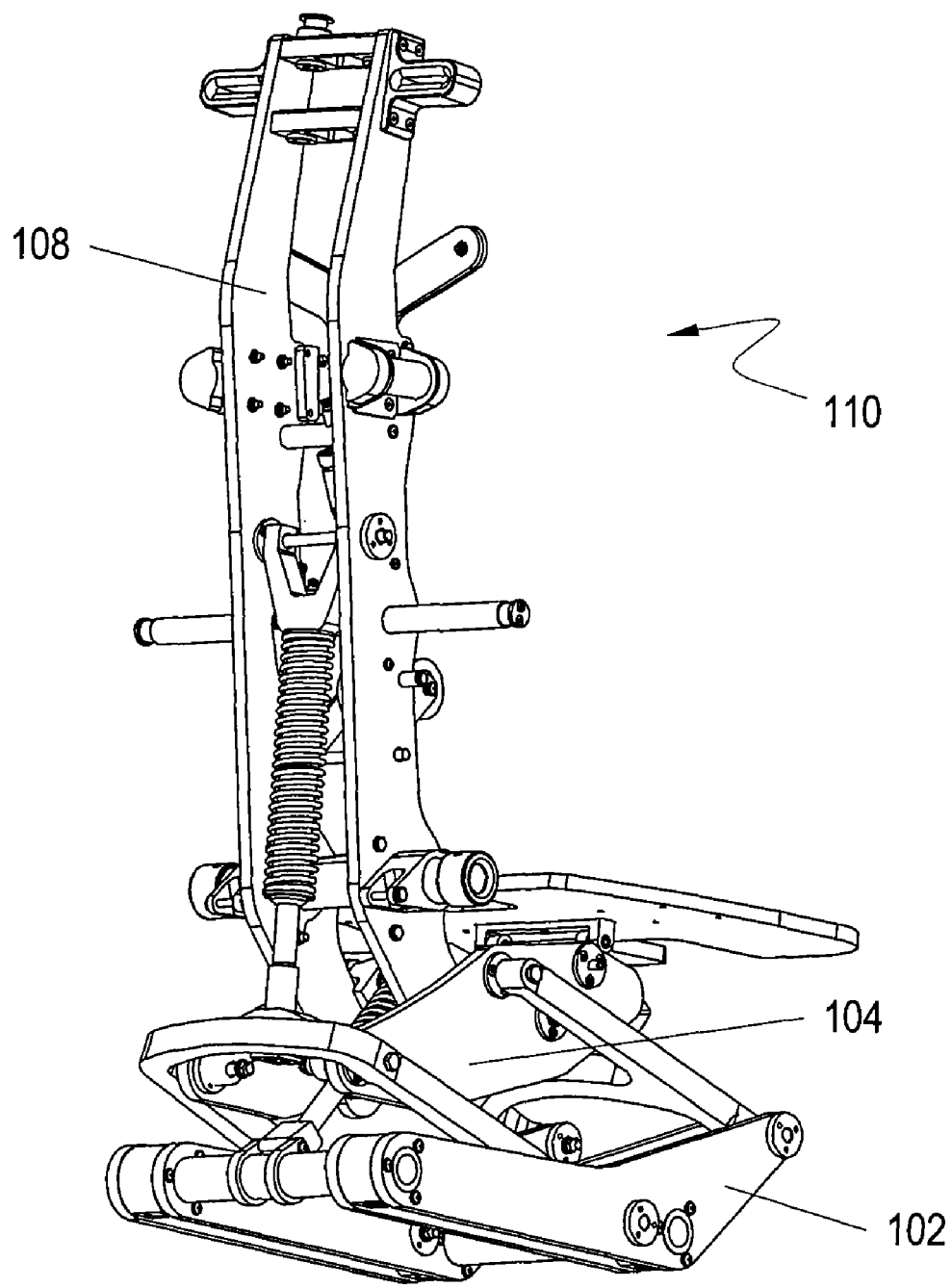
FIG. 11 is a perspective view of the aircraft seat of FIG. 1, taken along line 11-11 of FIG. 10, showing the frame assembly without the pan support structure.
Figure 12:
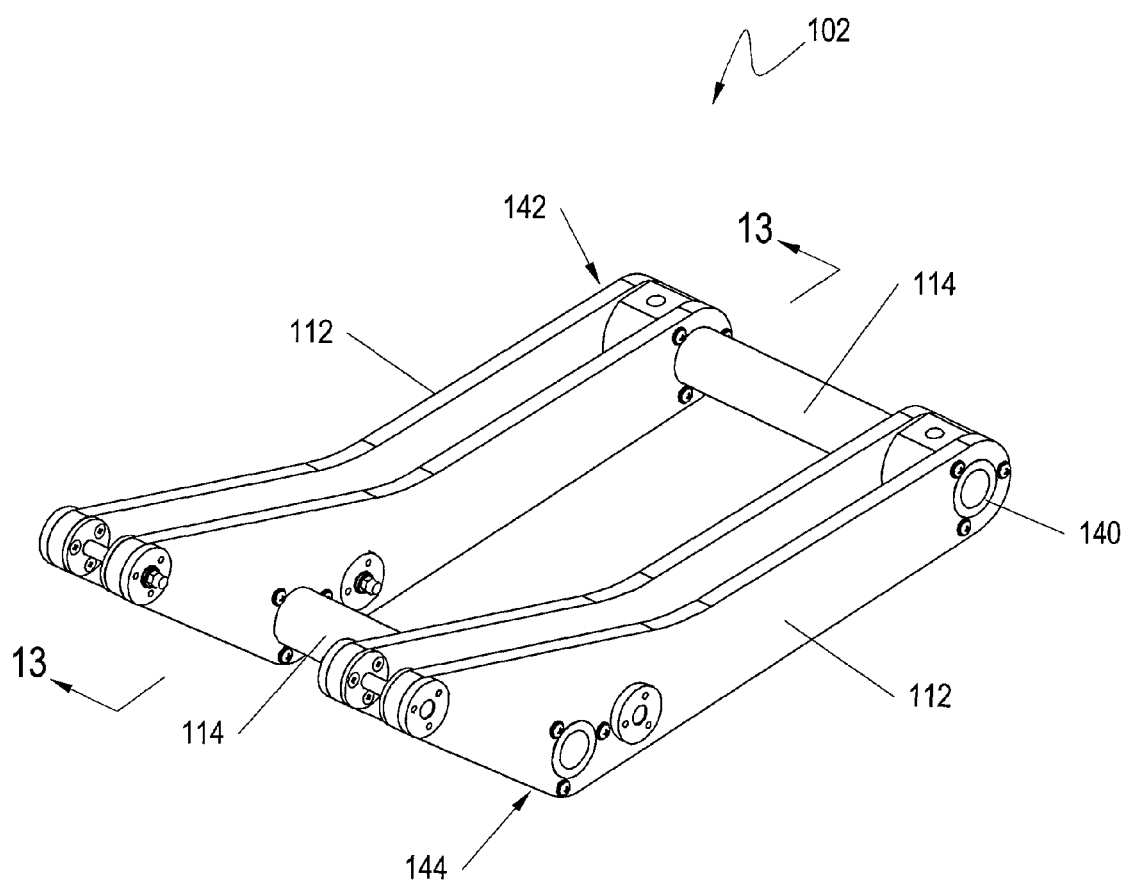
FIG. 12 is a perspective view of the lower support structure of the aircraft seat of FIG. 1.
Figure 13:
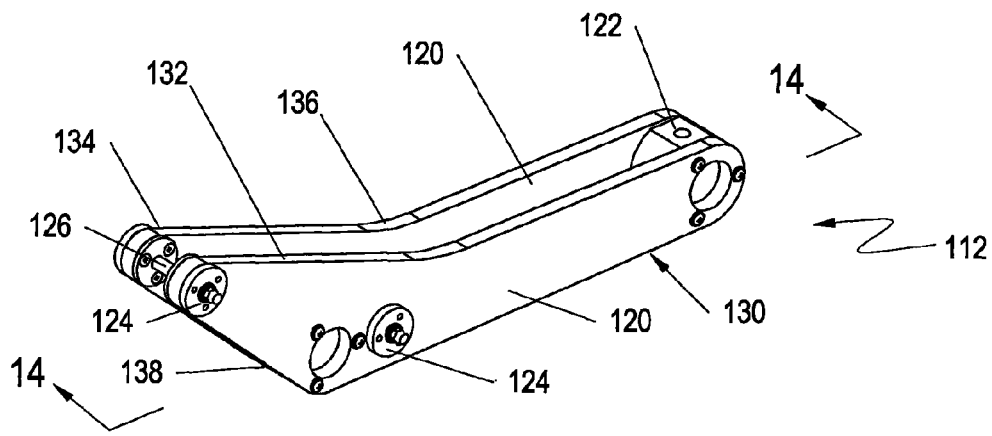
FIG. 13 is a perspective view of the lower support structure of the aircraft seat of FIG. 1, taken along line 13-13 of FIG. 12, showing a base member assembly.
Figure 14:
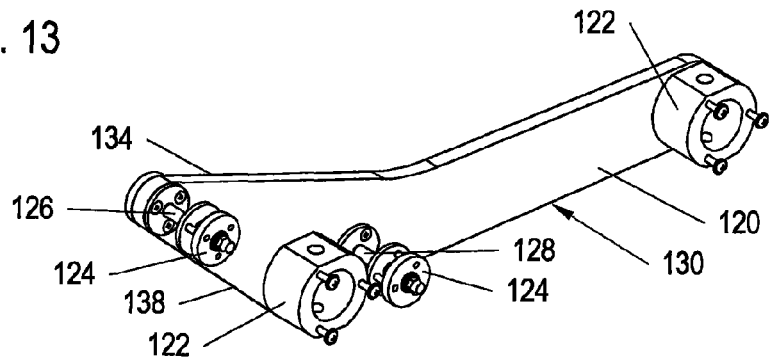
FIG. 14 is a cut-away perspective view of the lower support structure of the aircraft seat of FIG. 1, taken along line 14-14 of FIG. 13, showing a portion of the base member assembly, absent a plate.
Figure 15:
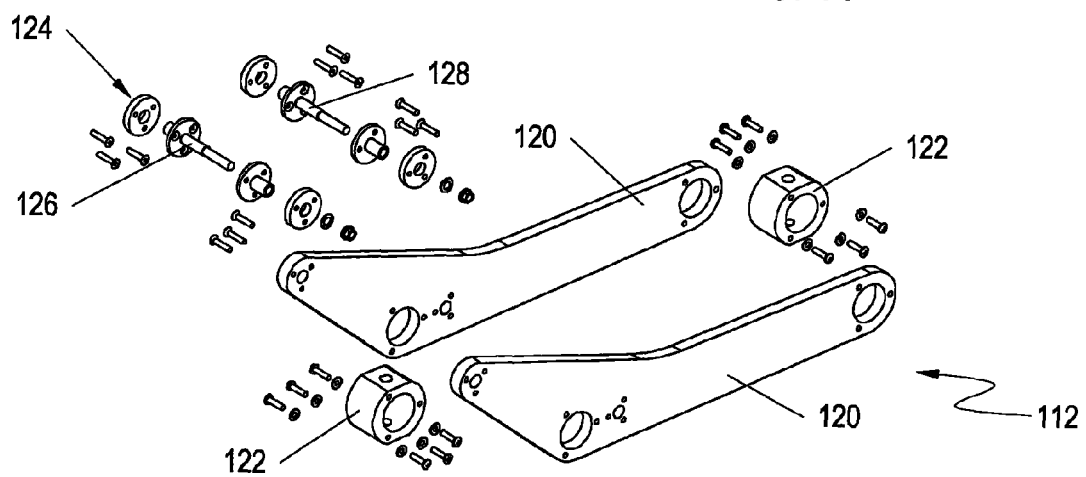
FIG. 15 is a perspective exploded view of a base member assembly of FIG. 13, for the lower support structure of the aircraft seat of FIG. 1.

As seen in FIGS. 9-11, attached to the mid support structure 104 is a seat back structure 108. The seat back structure may form a portion of the seat back and is pivotably coupled to the support assembly for movement between and upright position and a reclined position relative to the support assembly. The seat back structure 108, shown in FIGS. 22-25, is generally formed of one or more plates 196 carrying a plurality of cross member components and panel fittings. The seat back support also includes attachment locations for the pan support structure 106, as well as attachment locations for the occupant back support surface 198, lumbar adjustment assembly 202, headrest guides 204, strap guides 206 and mounting locations 208, 210 for shoulder straps and inertia reels, mounting locations 212 for left and right portions of a lap belt, and mounting locations 214 for arm rest assemblies 216.

More specifically, a seat back may be attached to the support structure, and may include seat back structure 108 may be formed by two plates 196 which may support a back cushion or back support surface. Each plate 196 is an elongate member having a lower portion 218, an upper portion 220, and including a plurality of attachment locations for various components. Each plate 196 may extend substantially the entire length of the seat back. Preferably, the two plates 196 are provided or positioned in parallel and have aligned openings, or more specifically attachment locations, when arranged for assembly into the seat back structure 108. The lower portion 218, or the lower end of the seat back structure 108 has a pivot support member 222 attached which includes an aperture (not shown) therethrough. Namely, the pivot support member 222 extends through support member panel fittings 224 carried by the lower end 218 of the plates 196. The outer ends 228, 230 of the pivot support member 222 are received in the apertures of the pivot support members and are capable of pivoting therein. The pivot support member 222 carries a thigh adjustment assembly anchor 226 along a portion of its length, preferably at a location between the parallel aligned plates 196.

Figure 22:
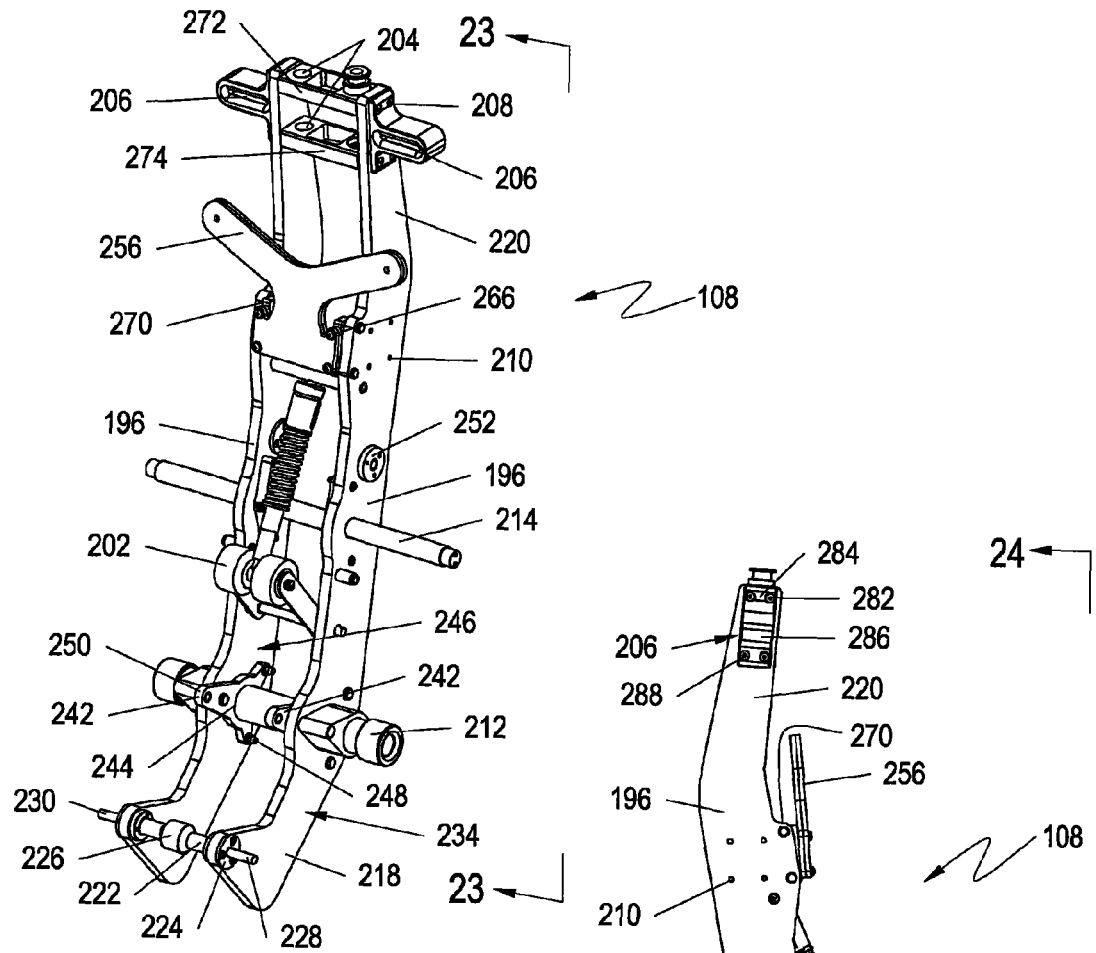
FIG. 22 is a perspective view of the seat back structure of the aircraft seat of FIG. 1.
Figure 23:
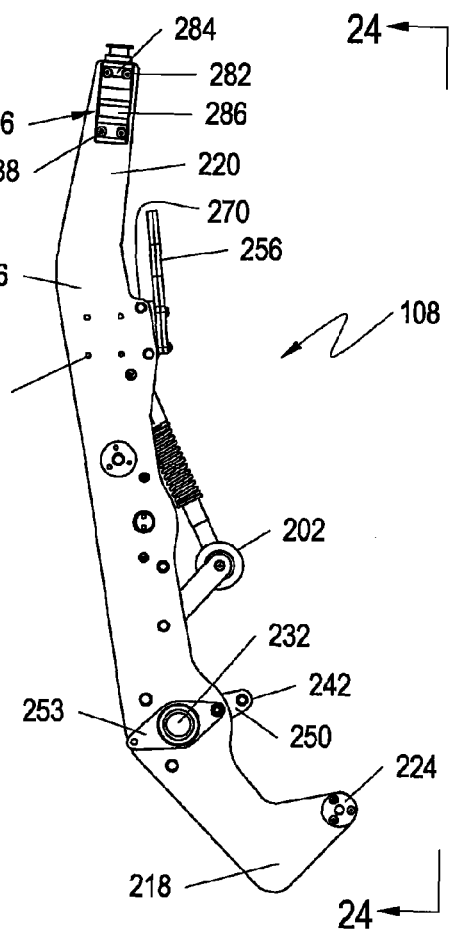
FIG. 23 is a side elevation view of the seat back structure of the aircraft seat of FIG. 1, taken along line 23-23 of FIG. 22.
Figure 24:
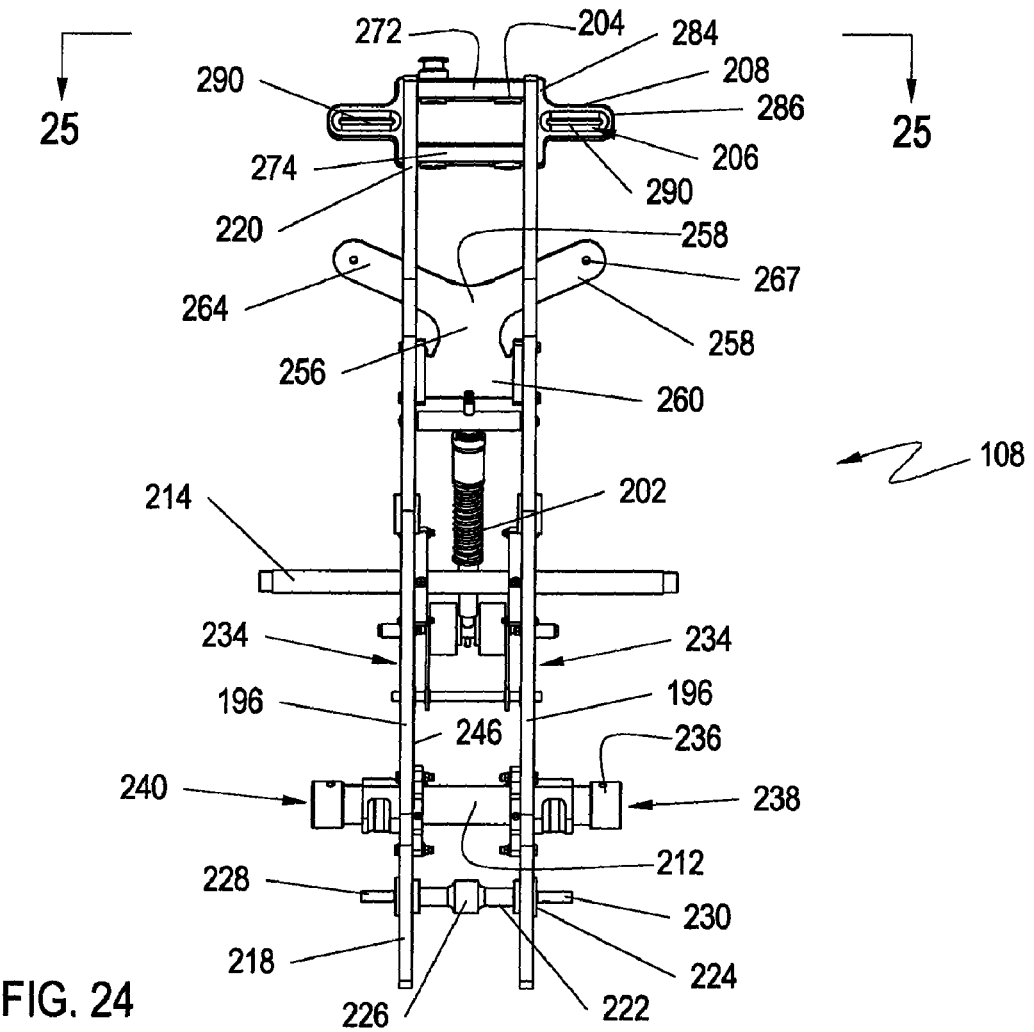
FIG. 24 is a rear elevation view of the seat back structure of the aircraft seat of FIG. 1, taken along line 24-24 of FIG. 23.

Spaced a distance from the pivot support member 222, preferably a distance above the pivot support member, and carried by the plates 196, is the lap belt mounting member 212. The lap belt mounting member 212 extends between the plates 196, through apertures 232 in the plates, and extends a distance beyond the outer surface 234 of each plate. As shown in FIGS. 22 and 24, the lap belt mounting member 212 may be formed of a cylindrical rod or tube having an annular cap 236 on each end 238, 240 of the rod. The lap belt (not shown) is mounted at or near the annular caps on the ends of the assembly. The lap belt mounting member 212 also carries one or more pan support structure mounting members 242. The pan support structure mounting members 242 preferably have an aperture 244 sized to correspond with the width or diameter of the lap belt mounting member 212, and are received thereon. The pan support structure mounting members 242 may be positioned on an interior surface 246 of the plates 196. The mounting members 242 may be secured to the plates 196 through one or more securing devices 248, such as threaded screws. In the illustrated embodiment shown in FIG. 23, three threaded screws 248 are spaced radially about the aperture 244 and lap belt mounting member 212, for securing to each plate. To this end, the pan support structure mounting member 242 may be arranged for securement at three locations about the lap belt mounting member 212. In addition, the mounting member 242 may have an extended portion 250 extending forward of the plate 196 for engaging or attachment to the pan support structure 106.

One or more panel fittings 252 are also attached to each of the seat back structure plates 196 at a distance above the lap belt mounting member 212, and preferably, each of the plates 196 has a panel fitting 252 aligned with a panel fitting 252 on the adjacent plate. The panel fittings 252 may be any suitable fitting, including but not limited to an anchor-type fitting or a male or female-type fitting. These fittings 252 preferably form an attachment for one or more components described herein.

An armrest support link 214 may also be carried by the seat back structure 108. The armrest support link 214 as shown in FIG. 22 is a cylindrical rod extending through the aligned plates 196. The armrest support link 214 is adapted to receive armrests 216.

At least one occupant back support surface 198 mounting plate 256 may be provided on the seat back structure 108 for retaining the back support 198. As can be seen in FIGS. 22 and 24, the mounting plate 256 is preferably formed of an elongate member attached to at least one of the seat back structure plates 196. In a preferred embodiment, the back support surface 198 mounting plate 256 is attached to each of two seat back structure plates 196 using one or more connecting devices 270. To this end, the mounting plate 256 is arranged, in a preferred embodiment, with a plate attachment portion 258 and an occupant back support mounting portion 260. The mounting plate 256 in one exemplary embodiment is formed as a substantially Y-shaped member wherein the occupant back support mounting portion 260 is formed of first and second arms 262, 264 extending from the plate attachment portion 258. The plate attachment portion 258 in the illustrated embodiment has a plurality of, and in particular, four apertures 266 which receive threaded connectors (not shown), such as screws, for attachment of the mounting plate 256 seat back structure plates 196. One or more fitting blocks 270 may be mounted by any suitable means to each of the plates 196. These fitting blocks 270 may receive the threaded connectors (not shown) which are used to attach the mounting plate 256. Additional mounting plate(s) may be provided for the back support or a back support covering member, such as may be used on the rear of the seat to cover or obstruct view of the structural components. The first and second arms may include apertures 267 for engaging or attachment of the back support surface 198.

Figure 25:
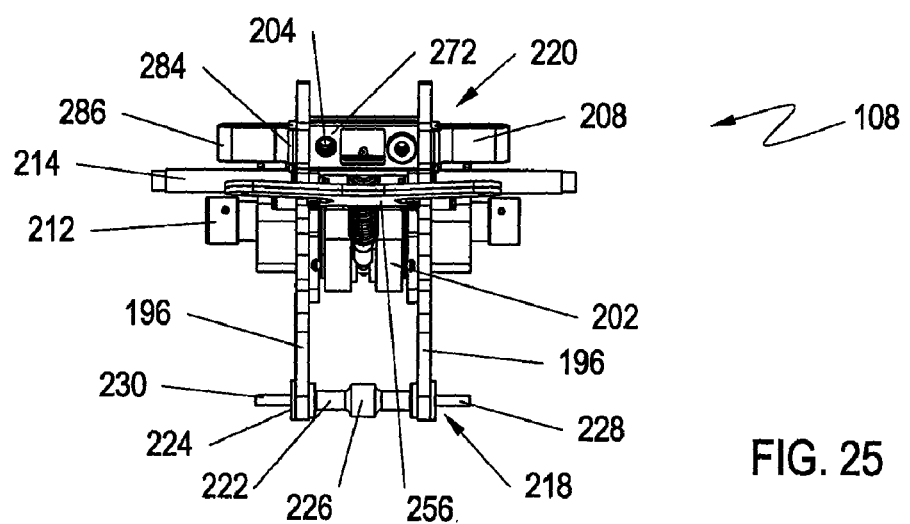
FIG. 25 is a top plan view of the seat back structure of the aircraft seat of FIG. 1, taken along line 25-25 of FIG. 24.
Figure 26:
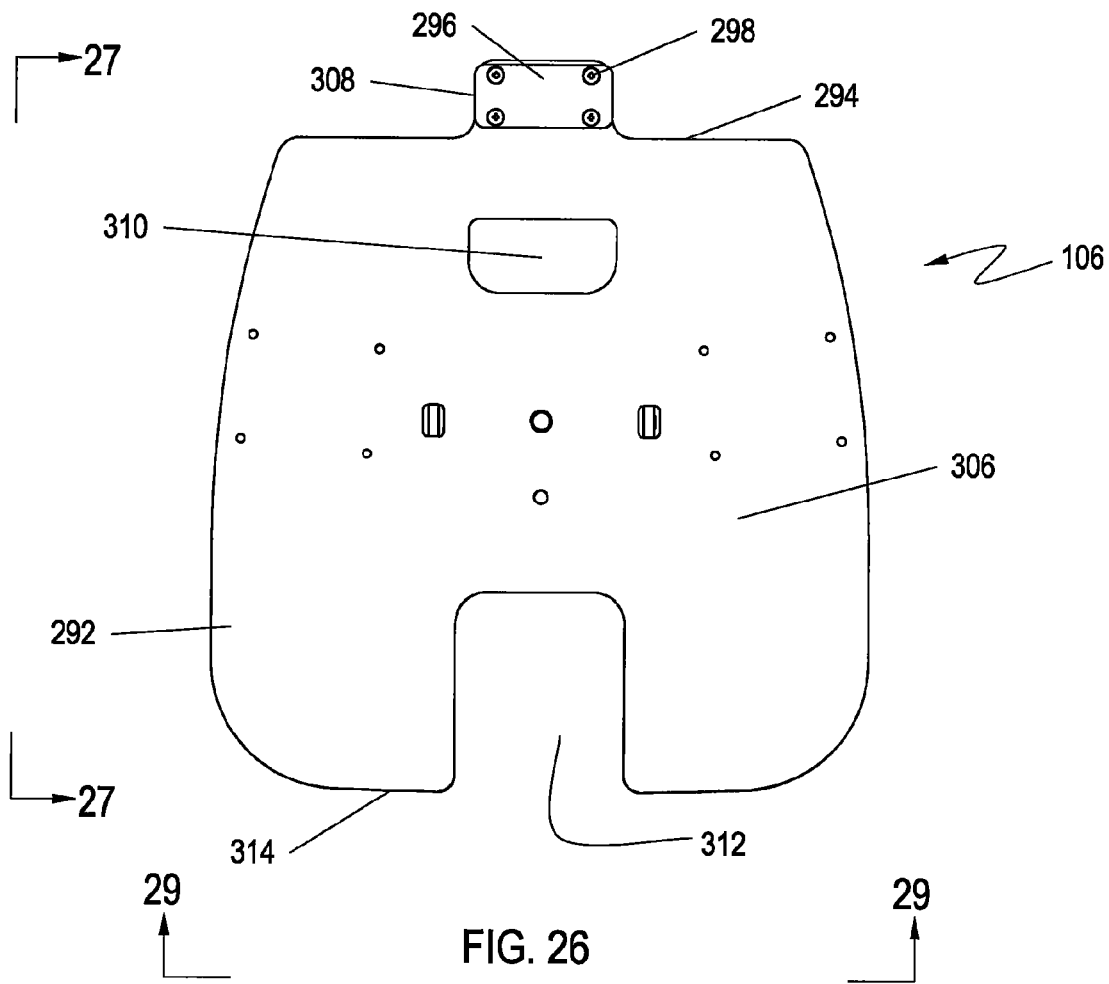
FIG. 26 is top plan view of the pan support structure of the aircraft seat of FIG. 1.
Figure 27:
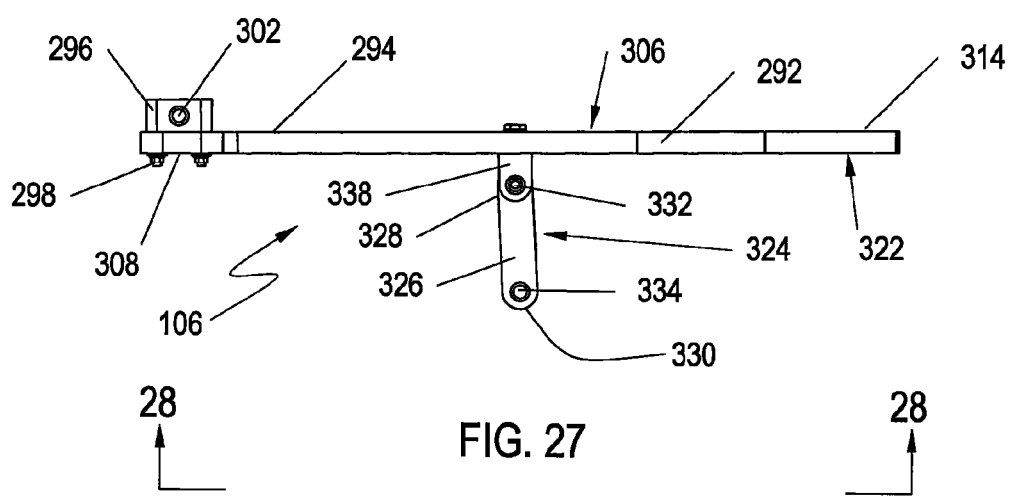
FIG. 27 is a side elevation view of the pan support structure of the aircraft seat of FIG. 1, taken along line 27-27 of FIG. 26.
Figure 28:
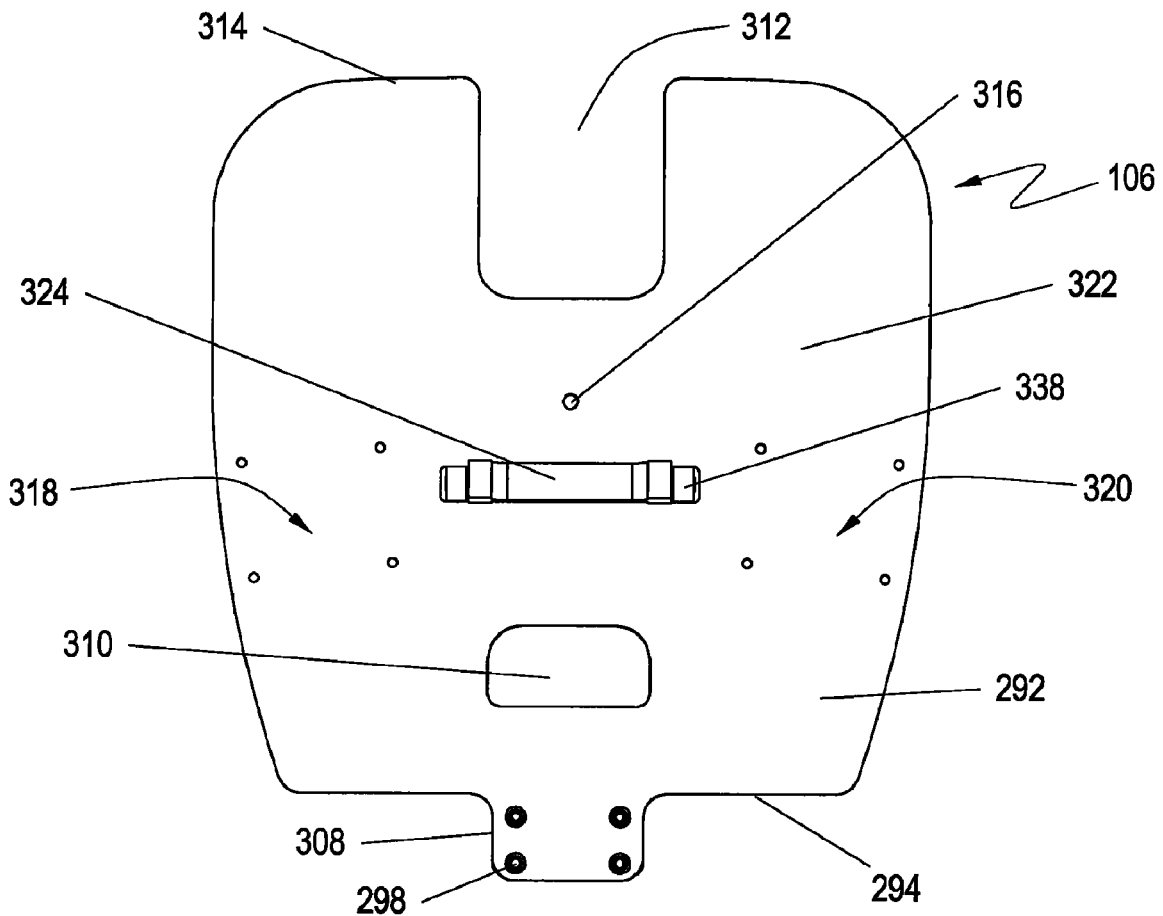
FIG. 28 is a bottom plan view of the pan support structure of the aircraft seat of FIG. 1, taken along line 28-28 of FIG. 27.
Figure 29:
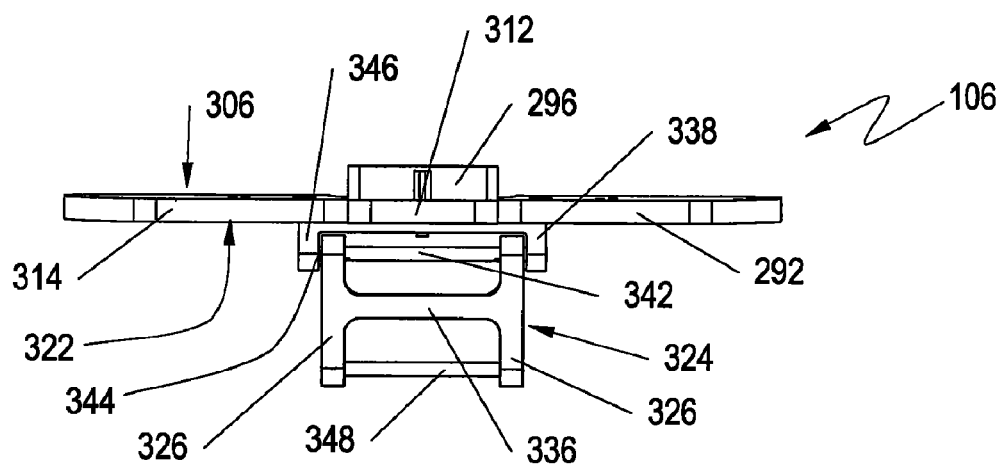
FIG. 29 is a front elevation view of the pan support structure of the aircraft seat of FIG. 1, taken along line 29-29 of FIG. 26.

The upper portion 220 of the seat back structure 108 and plates 196 carries one or more upper cross members 272, 274 for attachment of the headrest assembly 276. In FIGS. 24-25, two upper cross members 272, 274 are provided which members are secured between the seat back structure plates 196. The upper cross members 272, 274 may be formed of rectangular plates having one or more apertures 204 therethrough. These apertures in one embodiment form headrest guides 204. The apertures or headrest guides 204 of the first and second upper cross members 272, 274 are aligned for receipt of a portion of the headrest assembly 276.

Shoulder restraint guides 206 are also attached to the upper portion 220 of the seat back structure plates 196. Preferably, shoulder restraint guides 206 are aligned with the upper cross members 272, 274 such that one or more connecting elements 282 or devices may be used to simultaneously secure the shoulder restraint guides 206 and upper cross members 272, 274 to the plates 196. To this end, the plate 196 may include an aperture for pass through of the connecting element. Similarly, the upper cross member 272, 274 may include a cooperating feature, such as an aperture or receptor for engaging the connecting element 282. The shoulder restraint guides 206 are each formed of a mounting portion 284 and a restraint guide portion 286 extending from the mounting portion. The mounting portion 284 includes one or more apertures 288 for receipt of a connecting element 282, such as, but not limited to, a threaded screw, for securing the shoulder restraint guide in position. The restraint guide portion 286 is formed of an elongate member having a slot 206 therethrough. The slot 206 may be sized for the free movement of a shoulder restraint (not shown) through the opening formed by the slot.

Mounted to the seat back structure 108 is a pan support structure 106. The pan support structure 106 may form a seat or a portion of a seat. As can be seen in FIGS. 26-29, the pan support structure 106 has a plate 292 which may be substantially flat and formed to approximate the shape of a seat cushion. The pan support structure 106 includes a central portion and a rear portion. The plate 292 is secured at the rear portion 294 to the seat back structure 108. A rear attachment fitting 296 or connector assembly may be provided on the plate 292 to connect or couple the plate 292, and in particular the rear portion thereof, to the seat back structure 108 for causing the rear portion of the seat to pivot downwardly about a pivot axis in unison with the seat back as the seat back moves from an upright position to a reclined position. The attachment fitting 296 is preferably attached to an upper surface 306 of the plate 292 and may be attached to a rearward extension 308 of the plate 292. The rear attachment fitting 296 in the illustrated embodiment is attached to the plate 292 by one or more connection elements 298, such as, but not limited to, threaded screws. The rear attachment fitting 296 has a pivot receptor 302, which may be a cylindrical aperture, extending therethrough in a plane parallel to the plate 292 for receipt of a pan pivot member 304 (see FIG. 8) that extends through the receptor 302 and into the pan support structure mounting members 242 on the seat back structure 108. The receptor and pivot member form the pivot axis about the receptor.

The plate 292 further includes an aperture 310 positioned in the rear of the plate 292 which may provide clearance to the vertical adjuster 472 during recline. Additional apertures may be provided, for example, for reducing weight or for providing access to other devices. A recess or cut-out portion 312 is also positioned at the forward portion 314 of the plate 292. The recess 312 provides a passage for the anti-submarine strap 464 (see FIG. 43A). The recess 312 may also be provided to eliminate or reduce interference with aircraft controls. The anti-submarine restraint strap 464 is provided as a fifth point, or strap portion of a restraint system. The anti-submarine restraint strap may also be provided attached on the plate 292. To this end, one or more attachment locations 316 may be provided for the strap. In one embodiment, attachment locations may also be provided for recline and vertical adjustment button housings 318, 320.

A pivot assembly couples the central portion of the seat to the support assembly, or mid support structure for permitting the seat to pivot about a pivot axis relative to the support assembly. Mounted to the lower surface 322 of the plate 292 is a recline swing arm 324. The recline swing arm 324 is formed of one or more pivot arms 326. In the illustrated embodiment, two pivot arms 326 are provided, each of which include a pan support end 328 and an adjustment mechanism engaging end 330. Furthermore, each pivot arm 326 has an aperture 332 on the pan support end 328 and an aperture 334 on the adjustment mechanism engaging end 330. End 330 may also be arranged or adopted to engage the mid support structure when the optional thigh adjustment assembly is not present. A cross member 336 may span between two or more pivot arms 326 creating, in FIG. 29, an approximately H-shaped form, however, variations in shape would not depart from the overall scope of the present invention. The recline swing arm 324 is attached to the plate 292 by a front attachment fitting 338 which is formed of an elongate member attached by at least one attachment device, such as, but not limited to, a screw, threaded through the plate 292. The front attachment fitting 338 is preferably positioned in a centralized location on the lower surface 322 of the plate 292. The recline swing arm 324 is connected to the front attachment fitting 338 by one or more pivot pins 342 which extend into receptor 344 on an end portion 346 of the attachment fitting. In the illustrated embodiment, two pivot pins and receptors are shown. The pivot pin 342 is received by the cylindrical aperture 332 of the pan support end 328 in the recline swing arm 324. Similarly, pivot pins 348 may be received by cylindrical apertures 334 in the adjustment mechanism engaging end 330 of the swing arm 324. Pivot pins 348 are also received by the thigh angle adjustment mechanism or assembly 474, such that the swing arm 324 may be connected to the thigh angle adjustment mechanism. The pan support structure 106 may incorporate sleeve bearings that are pressed-in at the pivot connections, in both the recline swing arm 324 and the rear attachment fitting 296, to assist with smooth rotation over an extended lifetime.

As discussed, the lower support structure 102, mid support structure 104, pan support structure 106 and seat back structure 108 generally form a frame assembly 110 which carries the occupant support structures, or subassemblies, that directly interface with the occupant. Specifically, the frame assembly 110 may support a bottom cushion 350, back support surface 198, an armrest assembly 216 or 374, headrest assembly 276 and a restraint system (not shown).

The seat bottom cushion 350 is supported by the pan support assembly 106, and specifically the plate 292, and provides bottom and upper leg support to the seated occupant. A cushion 350, as shown in FIG. 30 is shaped to provide occupant comfort and may have a shape or cross-section which corresponds to the shape of the pan support plate 292. The cushion may be constructed of a core that includes a foam or cushioned material. For example, one or more types of polyurethane foam, which may be contoured and bonded together may form a cushion assembly. The cushion 350 may include a cover over the cushioned portion, which may be an upholstered material or alternatively may be any suitable material for covering at least a portion of an inner core. A preferred exemplary upholstery material is one which includes a uniform, durable finish, and allows for various aesthetic details or options, including but not limited to color and texture. The seat bottom cushion 350 may be provided with a securing mechanism for securing, or removably securing, the cushion on or to the pan support structure 106. One suitable exemplary securing mechanism is a hook-and-loop fastener, such as VELCRO® which may be secured to the surfaces of both the pan support structure 106 plate and seat bottom cushion 350 in a coordinated manner by any suitable means, including but not limited to adhesive or tape, and sewing. Alternative mechanisms of attachment would not depart from the overall scope of the present invention, including but not limited to, snaps, loops, and other retaining devices. Likewise, alternative materials, forms, and assemblies may be acceptable for the purposes provided. For instance, a mesh suspension material may be used, for example, in association with a frame to form a seat or bottom cushion or a portion thereof.

The back support surface 198, which is supported by the generally rigid frame of the seat back structure, provides back support to the occupant. The back support surface 198 is coupled by at least one attachment element to the frame and may flex relative to the frame. In a preferred embodiment, the back support surface 198 is constructed of flexible material such that it is flexible throughout its entire area. Preferably, the material is capable of flexing in response to the occupancy and movement of the occupant, as well as in response to the operation of the lumbar adjustment assembly 202. The back support surface 198, as shown in FIGS. 31-35, is formed of a highly contoured shell, which may be a plastic shell or other suitable material, which is shaped to comfortably receive an occupant's back and preferably formed to a substantial portion of the length of the seat back support. The seat back or back support surface 198 may be formed of a sheet approximating the size of an aircraft occupant's back. The contoured or formed shell has a degree of concavity on the occupant side 352 of the shell 198, as shown in FIGS. 33-34, such that it may approximate the contour of the aircraft occupant's back. The shell may therefore have a portion 354 which is partially convex on the occupant side 352 as shown in FIG. 35 which position is near the location of the occupant's lower spine.

In addition, the shell 198 may include one or more layers. For example, the shell 198 may have a padded or partially padded layer 356 and a structural layer 358. A suitable exemplary padded layer is a thin, constant-thickness layer of foam, such as polyurethane foam, which is provided on at least the occupant side 352 of the back support surface 198, although alternative materials and forms would not depart from the overall scope of the present invention. Additional padding may also be added where appropriate.

The occupant side 352 of the back support 198 or entire back support may also be covered at least in part with an upholstery material similar to that described with respect to the seat bottom cushion 350. The upholstery may be attached by any suitable permanent or removable means. The back support 198 may also optionally include a rear covering member, (not shown) which covers a rear portion of the back support surface 198 and may cover a portion of the frame.

The back support surface 198 also may have at least one and preferably two or more fasteners or attachment members 360, 362, that connect the back support surface 198 to the seat back structure 108. The shell 358 may be supported at one, two or more upper positions and preferably two upper positions by one or more arms, which may be rigid, semi-rigid, or flexible, and one or more lower positions by a swing arm. In the illustrated embodiment, the rear face, surface, or side 364 of the back support surface 198 has upper seat back support connection elements 360 and lower seat back support connection elements 362. In one embodiment, fasteners 360 connect to the mounting plate 256 attached to the seat back structure 108. The fasteners 360 may be integral with or separate components attached to the back support 198. The upper seat back support connection elements 360 are preferably pin members extending from one or more spacers 366 which pin members are received by mating receptors 267 on the seat back structure 108 (see FIG. 24), and specifically carried by the back support mounting plate 256. These connection elements 360 or portions thereof may be flexible to permit flexure with the flexing movement of the shell 358. The lower seat back support connection element 362 (see FIG. 32), is formed of a horizontal rod connected to the back support surface 198 by one or more links 370. The rod which links or attaches to the seat back structure carries an attachment housing 372 for attachment to the frame 110 or specifically, the seat back structure 108. Rotational or pivotal movement about the rod 362 (see FIG. 32) may be provided at the corresponding attachment to the seat back structure 108. In addition to structurally connecting the back support to the seat back structure 108, the upper arm allows the shell flex and twist a limited amount. The lower swing arm allows the shell to expand and contract in length and height as it is flexing.

Armrest assemblies 216 or 374 may be attached to the aircraft seat 100 and the preferably frame 110. The armrest assemblies are generally formed of one or more movable assemblies for adjustment of the armrest. In particular, the armrest assemblies are generally formed of a arm support portion which may be positionally adjusted and one or more pivot assemblies for movement of the arm support portion. One exemplary embodiment of an armrest assembly is shown in FIGS. 36-37. In FIGS. 36-37, only the right armrest assembly is illustrated. The left armrest assembly is a mirror image of the right armrest assembly and therefore will not be specifically illustrated. Each of the left and right armrest assemblies 216 has an elongate arm or frame 376 that is adapted to support an occupant arm. The frame 376 may support or carry a pad support 378 on a portion thereof to provide cushioning to the arm. The pad support 378 may be formed of any one or more materials described with respect to the seat cushion 350 and back support 198 and may also be contoured for user comfort. The pad may be attached to the frame by any suitable means. The frame 376 may also include one or more user operable controls 380, such as push button controls, as illustrated in FIG. 37, to control the various functions of the aircraft seat 100. To this end, a channel or housing 382 having an opening therethrough (not shown) may be included through the frame 376 of the armrest and adjoining components to carry cabling (not shown) or any other communication components which may be necessary for control of the movable portions of the aircraft seat 100. Alternatively, push button or other controls may be provided in any location on the seat assembly which may be accessible to a user, including but not limited to, below the seat bottom.

Figure 3:
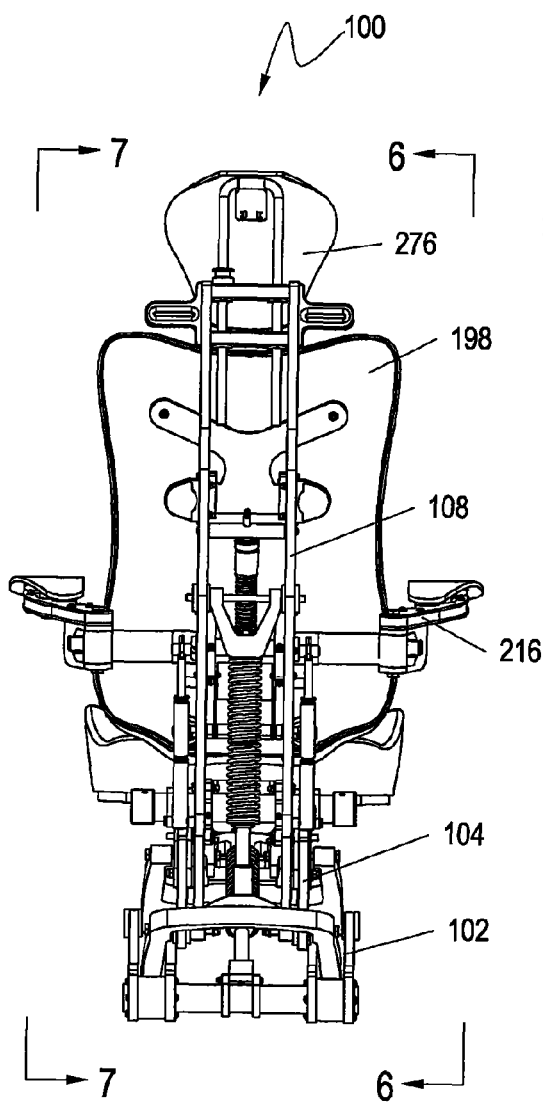
FIG. 3 is a rear elevation view of the aircraft seat of FIG. 1, taken along line 3-3 of FIG. 1.
Figure 4:
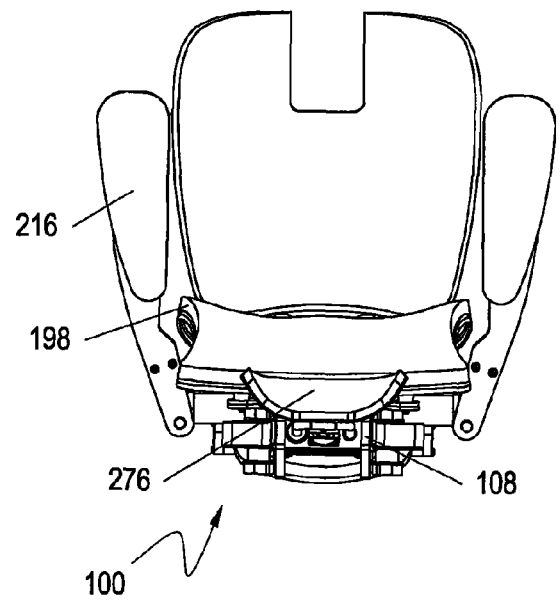
FIG. 4 is a top plan view of the aircraft seat of FIG. 1, taken along line 4-4 of FIG. 2.
Figure 5:
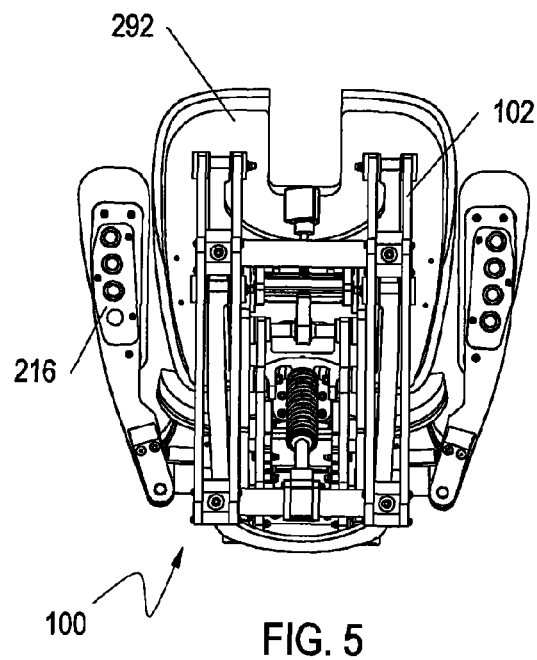
FIG. 5 is a bottom plan view of the aircraft seat of FIG. 1, taken along line 5-5 of FIG. 2.
Figure 6:
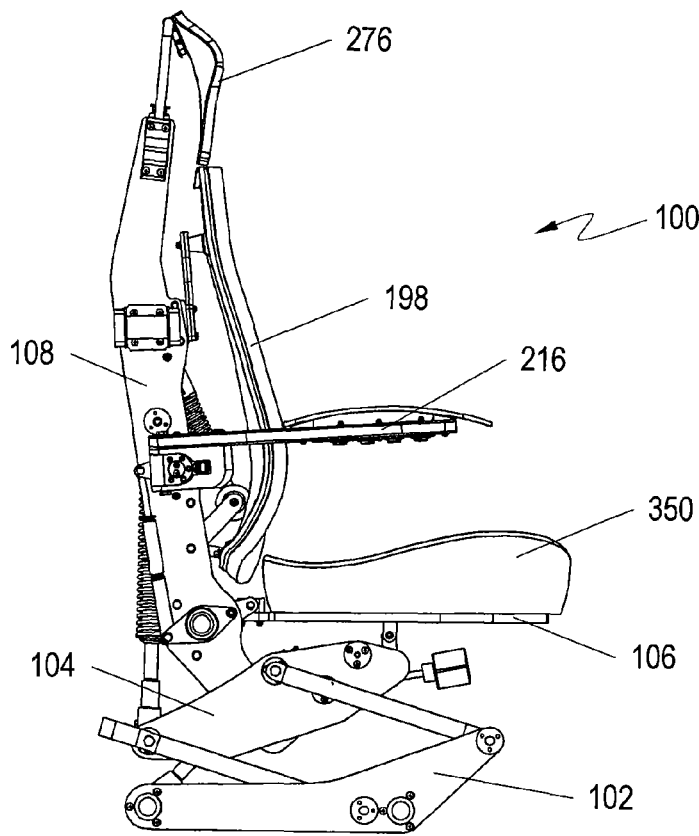
FIG. 6 is a side elevation view of the aircraft seat of FIG. 1, taken along line 6-6 of FIG. 3.
Figure 7:
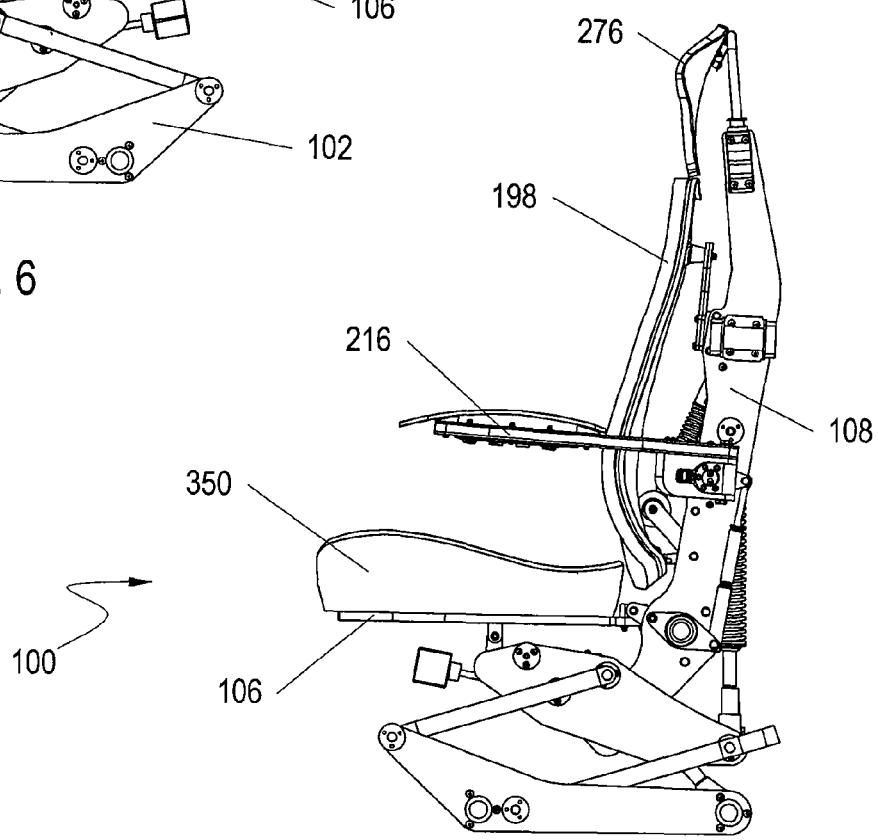
FIG. 7 is a side elevation view of the aircraft seat of FIG. 1, taken along line 7-7 of FIG. 3.
Figure 8:
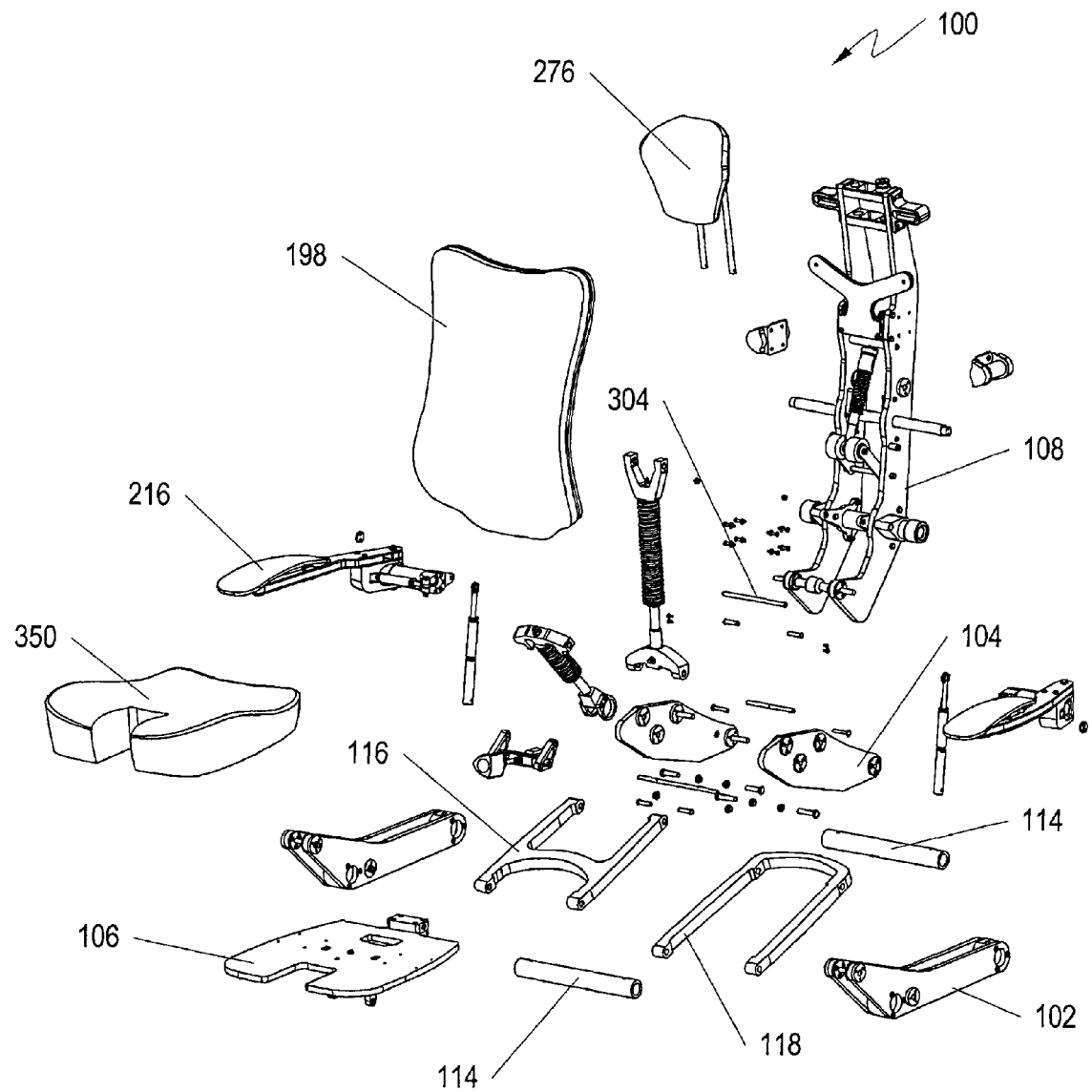
FIG. 8 is an exploded perspective view of the aircraft seat of FIG. 1.

Armrest assembly 216 is attached to the seat back structure 108 using rod 214, which may be a cylindrical rod, that extends through seat back support structure plates 196 (see FIG. 3). Preferably, armrest assemblies 216 include housing 386 having a receptor 388 sized or shaped to receive the rod 214 extending from the seat back structure such that the armrest assembly 216 may be rotatable about the rod 214. As seen in FIGS. 36-37, attached to the seat back structure engaging end 390 of the housing 386 is a pivot assembly 400 formed by a pivot link 392 which is connected to a telescoping pivot arm 394 secured at one end 396 to the seat back structure 108 to for instance, fitting 253 (see FIG. 23). As can be seen from FIG. 38, the telescoping arm 394 includes a first telescoping arm member 398 which is received in a second telescoping arm member 402, such that the increase or decrease in length or extension of the telescoping arm occurs by movement of the first arm member 398 relative to the second arm member 402. The adjustment in length results in pivotal movement of the armrest assembly or a portion thereof about the rod 214 over a first pivot axis 404. In one example of an embodiment, the first telescoping arm member 394 may be a mechlok.

A second pivot assembly 406 is connected to housing 386 to pivot the armrest support portion or frame 376 in an axis 408 perpendicular to the first pivot axis 404. To this end, a second pivot link 410 is attached to the housing 386 including a pivot arm 412 having a pivot pin 414 which extends through the pivot arm 412 and second pivot link 410 to form the second pivot axis. A second telescoping arm 416 substantially identical to first telescoping arm 394 may be attached to the first pivot link 392 and the pivot arm 412 or second pivot link 410 for control of the pivotal movement. To this end, the increase or decrease in length of second telescoping arm 416 may result in pivotal movement of the armrest assembly or a portion thereof about the second pivot axis 408. In one example of an embodiment, the second telescoping arm member 416 may be a mechlok.

Operation of the armrest assemblies, and in particular the telescoping arm members 394, 416 may be by manual or automatic means or may be facilitated by a control, such as but not limited to, a push button control. For example, a user may apply force to the armrest to move the armrest in the direction permitted by the pivot axis. Alternatively, a spring may be used to apply the force. Movement of the armrest increases or decreases the length of the telescoping arm member 394 or 416. A push button or other mechanism may be used to unlock the telescoping arm members against movement. Furthermore, the telescoping arm members 394, 416 may be hydraulically or air controlled.

Figure 39:
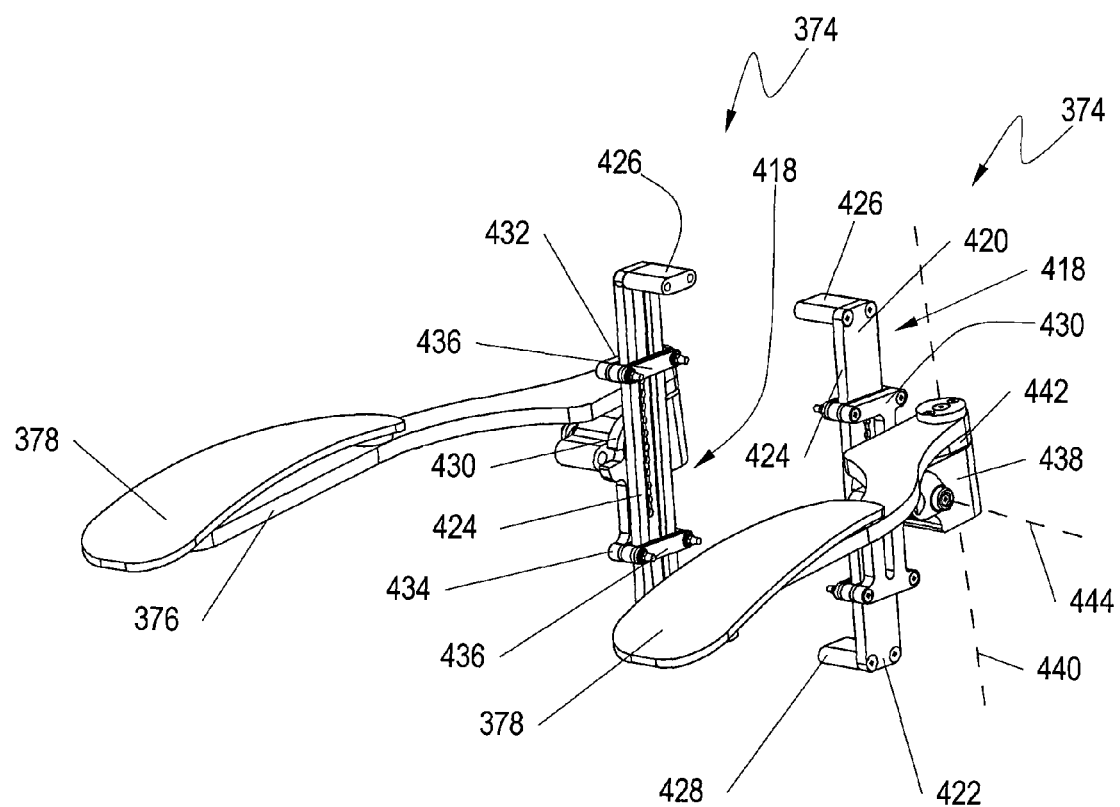
FIG. 39 is a perspective view of an alternative embodiment of an armrest assembly for use with the aircraft seat of FIG. 1, showing two armrest assemblies.

In an alternative embodiment shown in FIG. 39, the armrest assemblies 374 are similar to armrest assemblies 216 and like reference numbers are used to describe like components. The armrest assemblies 374 are mounted to the seat back structure 108 using an elongate frame attachment member 418 with an upper portion 420 and a lower portion 422. The elongate frame attachment member 418 is preferably formed of a link 424, or a flattened link, spanning between first and second connection elements 426, 428. The armrest frame 376 and supporting pad 378 may be attached to the elongate frame attachment member 418 by an adjustable mount 430. The adjustable mount 430 is movably or slidably connected to the elongate member 418 and has a first end 432 and a second end 434 each having a clamping mechanism 436 thereon. The clamping mechanism 436 in one exemplary embodiment may be a combination of upper and lower bar portions interconnected by threaded elements, which may be loosened or tightened to unclamp or clamp the armrest in position. The clamps 436 of the adjustable mount permit the vertical adjustment of the armrests. Armrest pivot members are also provided to permit lateral and tilting movement of the armrests. More specifically, attached to the adjustable mount is a first pivot member 442 which permits pivoting of the armrest assembly or a portion thereof about an axis or first axis 440. An additional or second armrest pivot member 438 may be operably or functionally connected to the first pivot member 442 to pivot about a second axis 444 perpendicular to the first axis. Pivotal movement permits pitch and yaw adjustment of the armrests.

Figures 40, 41:
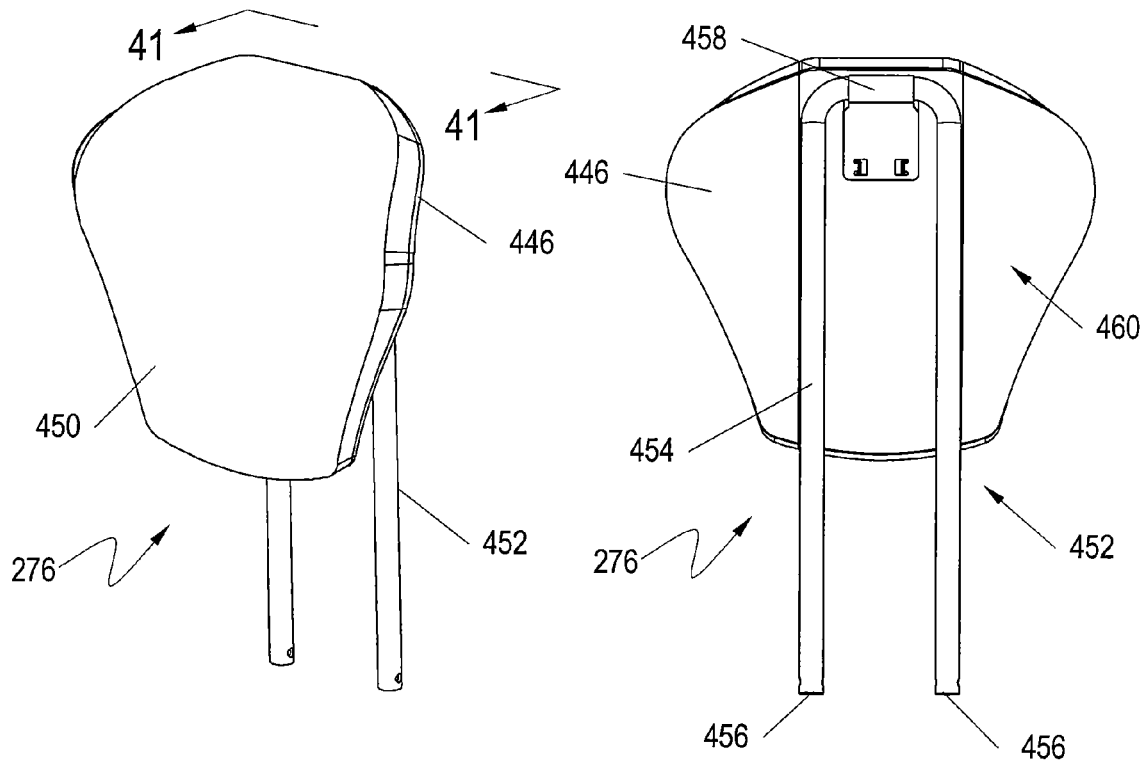
FIG. 40 is a perspective view of a headrest assembly for use with the aircraft seat of FIG. 1.
FIG. 41 is a rear elevation view of the headrest assembly for use with the aircraft seat of FIG. 1, taken along line 41-41 of FIG. 40.
Figure 42:
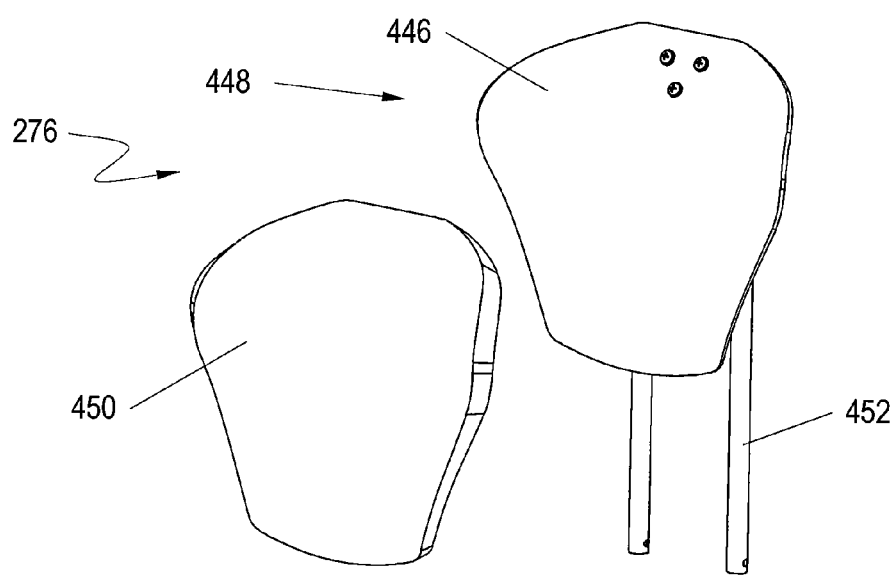
FIG. 42 is a partial exploded perspective view of the headrest assembly shown in FIG. 40 for use with the aircraft seat of FIG. 1.

In addition to the armrest assemblies, the seat back structure 108 may also carry a headrest assembly. While any headrest may be suitable for the chair described herein, an exemplary headrest assembly 276 is shown in FIGS. 40-42. Headrest assembly 276 is formed at least in part by a contoured plate 446 shaped to conform to the back portion of an occupant's head. Similar to the back support surface 198, the contoured plate 446 of the headrest may be covered on at least one surface, preferably the occupant side surface 448, with padding 450, such as but not limited to a constant thickness layer of foam, or polyurethane foam. At least one of the surface 448 or pad 450 may also be optionally covered with an upholstery material (not shown) as described with respect to the back support surface 198. The headrest plate 446 may be mounted to a mounting device 452. In an exemplary embodiment, mounting device 452 is formed by a U-shaped rod 454 having free ends 456 which U-shaped rod is mounted to the plate 446 by a pivot receptor 458. As shown in FIG. 42, the U-shaped rod is mounted to the back surface 460 of the plate. The free ends 456 of the mounting device 452 preferably interface with the guide features 204 of the upper cross members 272, 274 on the seat back structure 108 (see FIG. 3).

Figure 43A:
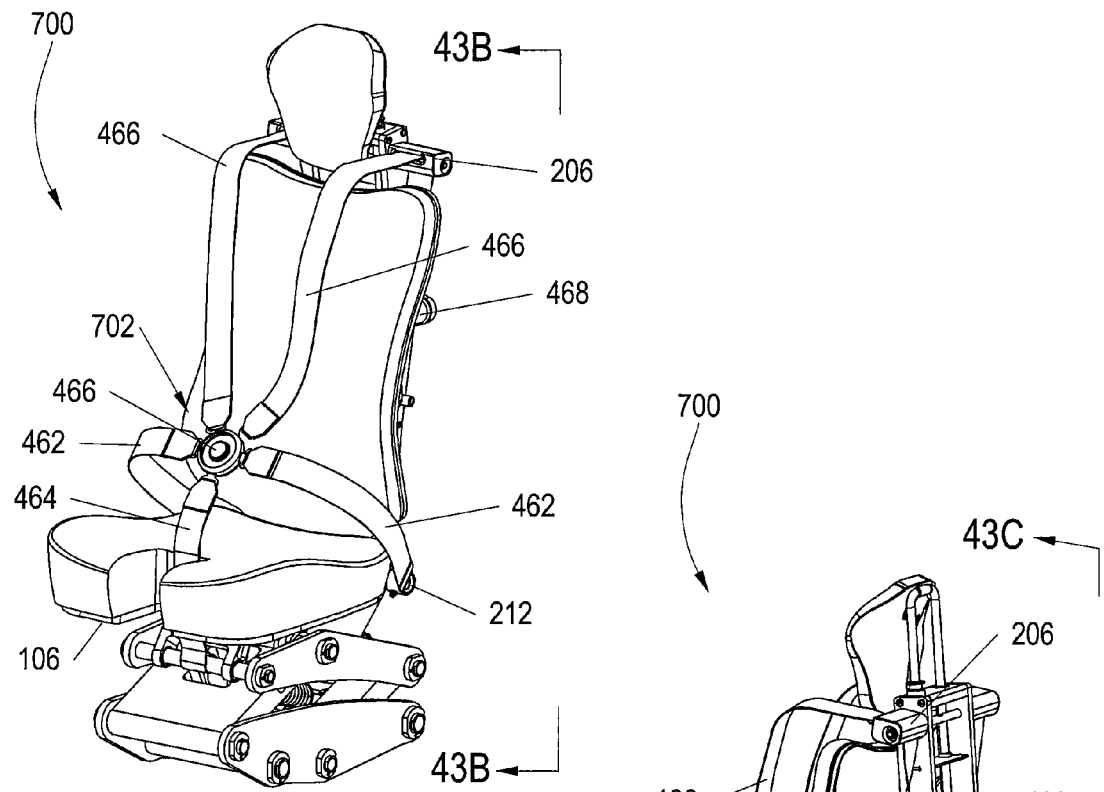
FIG. 43A is a perspective view of an embodiment of the aircraft seat having a restraint system, and showing armrests removed.
Figure 43B:
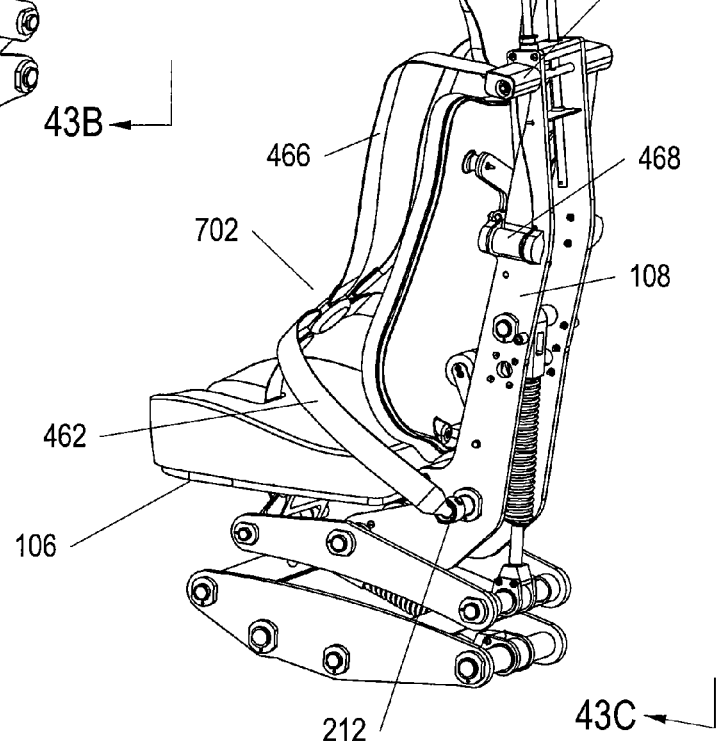
FIG. 43B is an additional perspective view of the aircraft seat having a restraint system, taken from line 43B-43B of FIG. 43A.
Figure 43C:
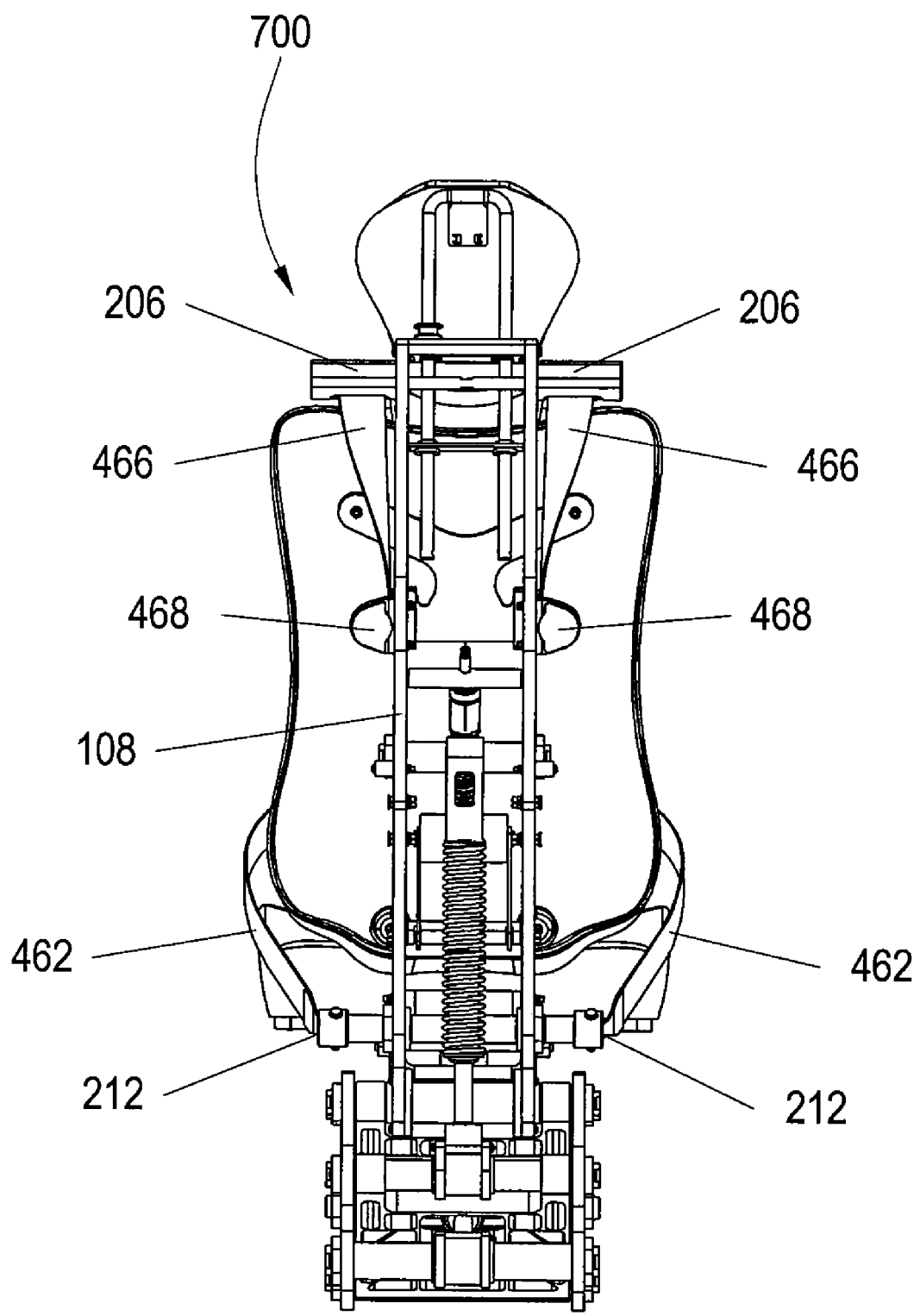
FIG. 43C is rear view of the aircraft seat having a restraint system, taken from line 43C-43C of FIG. 43B.

A restraint system is also, optionally, carried by, coupled to, or integral with the aircraft seat 100 or 700 (see FIGS. 43A-43C). Restraint systems are commonly commercially available. Any suitable restraint system may be acceptable for use with the aircraft seat 100 or 700 for restraint of an occupant. In an exemplary embodiment of the seat 700, as shown in FIGS. 43A-43C, an integral five-point restraint system 702 is provided. Namely, two restraint portions are provided by a lap belt which is attached to the lap belt anchor connected to the seat back structure 108. Specifically, one end of each of two mating lap belt sections 462 is attached to, threaded over, or received by the lap belt anchor 212 or mounting member between the cap 236 and plate 196 of the seat back structure. An additional restraint portion is provided by the anti-submarine belt 464 which may be mounted to or below the pan support structure 106. The remaining portions of the five-point restraint are formed by two shoulder belt straps 466 which a threaded through the first and second shoulder belt strap guides 206 attached to the seat back structure 108. One end of each shoulder strap 466 may be secured in a position to the rear of the seat. The strap guides may be stationary or may pivot about an axis. In one embodiment, an inertia reel or two inertia wheels 468 may be mounted to the rear surface of the back support surface 198 or the seat back structure 108 for receiving and securing an end of the shoulder straps. The free ends of each portion or belt strap of the five-point restraint may be connected together or to one or more additional belt straps by any common commercially available device or buckle 469 used for such purposes.

A number of adjustment mechanisms may be operably connected to the aircraft seat 100, including, but not limited to a recline adjustment assembly 470, a vertical adjustment assembly 472, and a thigh angle adjustment assembly 474. Also provided is a lumbar adjustment assembly 202. These subassemblies are provided to control the available degrees of freedom of movement between the structural subassemblies detailed herein.

Figure 44:
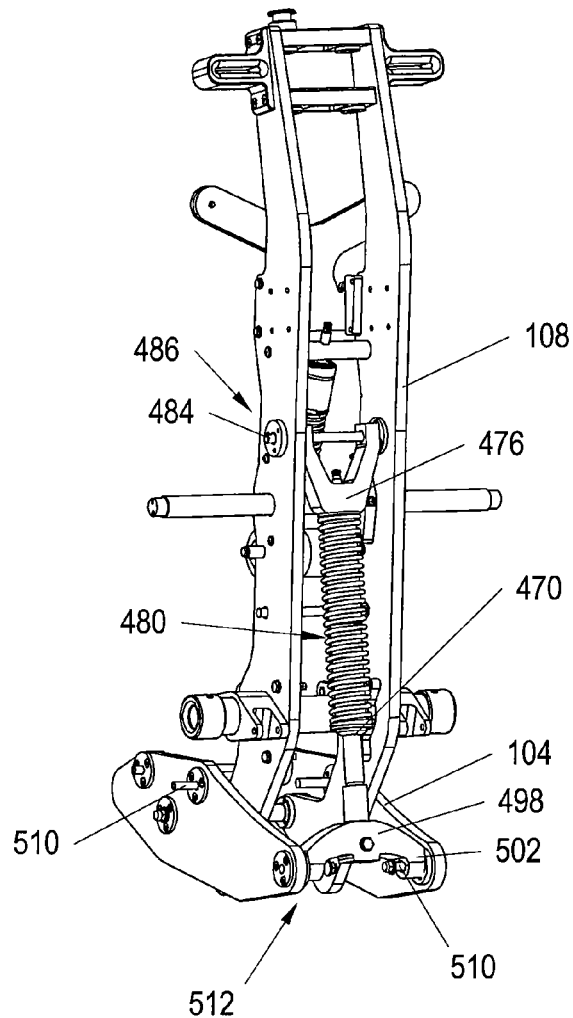
FIG. 44 is a rear perspective view of a recline adjustment assembly of the aircraft seat of FIG. 1, showing mid support structure connected to seat back structure.

The recline adjustment assembly 470 is optionally provided for control of seatback or back support 198 recline. The recline adjustment assembly 470 is capable of controlling the recline angle of the back support 198 and seat back structure 108. The recline adjustment assembly 470, as shown in FIG. 44, preferably connects or couples to the seat back structure 108 and the mid support structure 104, as well as the lower swing arm of the lower support structure 102. To this end, the recline adjustment assembly 470 is formed of a seat back structure connection member 476 having one or more connection elements 478 linked to an actuator 480. The first and second connection elements 478 are formed of arms including apertures 482 therethrough which receive one or more pivot pins 484 connected to the seat back structure 108 forming an upper pivot connection 486 with the seat back structure 108. Pivot pins 484 may be received in a fitting 252 in the seat back structure. The seat back structure connection member 476 is linked to the actuator 480 by a central attachment portion 488 having an aperture (not shown) for receipt of a fastening device 490, such as, but not limited to, a screw or bolt which is threaded into the of the actuator 480. To this end, threads may be provided on the actuator.

Figure 45:
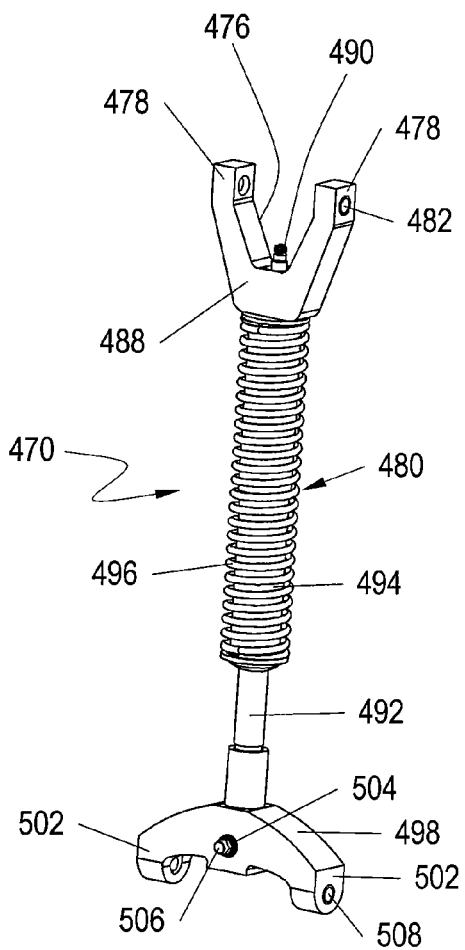
FIG. 45 is a perspective view of a recline actuator assembly shown in FIG. 44 for use with the aircraft seat of FIG. 1.

The recline adjustment assembly 470 is capable of control of the recline angle by variation in length of the actuator 480. To this end, the actuator 480 in the exemplary embodiment shown in FIG. 45 is formed of a piston having a cylindrical member 492 attached to a telescoping cylindrical member 494. The telescoping cylindrical member 494 has a spring 496 wound about its circumference and biased for movement in extension. The actuator 480 may be a hydraulic or air controlled cylinder, or other device suitable for the purposes provided. A preferred embodiment of the actuator 480 is available from Enidine Incorporated of Orchard Park, N.Y., under model number UL37. While a specific example is provided, the recline actuator and the interface geometry is such that mechanical and electromechanical variations in design of the actuator can be interchanged for the purposes provided with no modification to the primary seat structure.

The telescoping cylindrical member 494 carries a mid support structure connecting member or attachment member 498 having one or more connecting elements 502. The mid support structure connecting member or attachment member 498 preferably includes a receptor 504 sized to receive the end of the telescoping member 494 and further includes a pin or fastener 506 which can be inserted approximately perpendicular to the telescoping member and retain the telescoping member. The connecting elements 502 of the mid support structure connecting member or attachment member 494 include apertures 508 therein for receipt of one or more pins or pivot members 510 linked, or connected to the mid support structure 104 forming a lower pivot connection 512 with the mid support structure 104. Pins 510 may form a portion of pivot members 184 used to attach the lower swing arm 118 to the mid support structure 104. The recline adjustment assembly 470 may incorporate sleeve bearings that are pressed-in at the mid support structure and the seat back structure connection elements to assist with smooth rotation over an extended lifetime.

Figure 46:
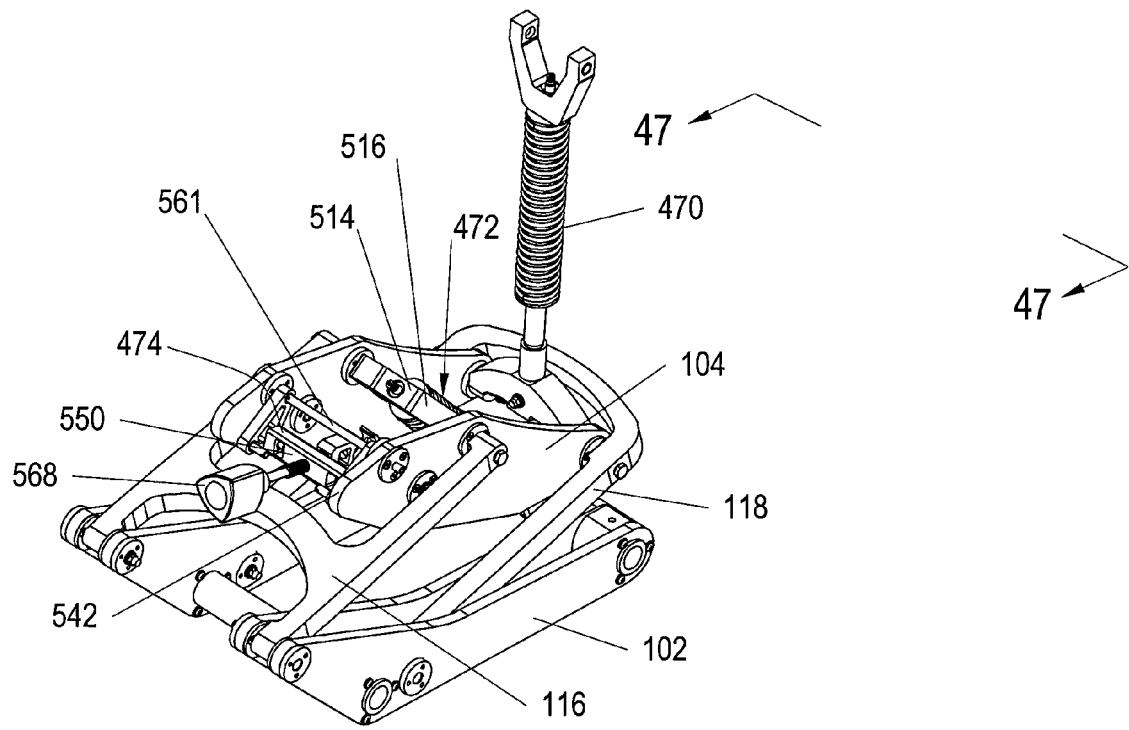
FIG. 46 is a perspective view of a height adjustment assembly for use with the aircraft seat of FIG. 1, showing lower support structure connected to mid support structure.
Figure 47:
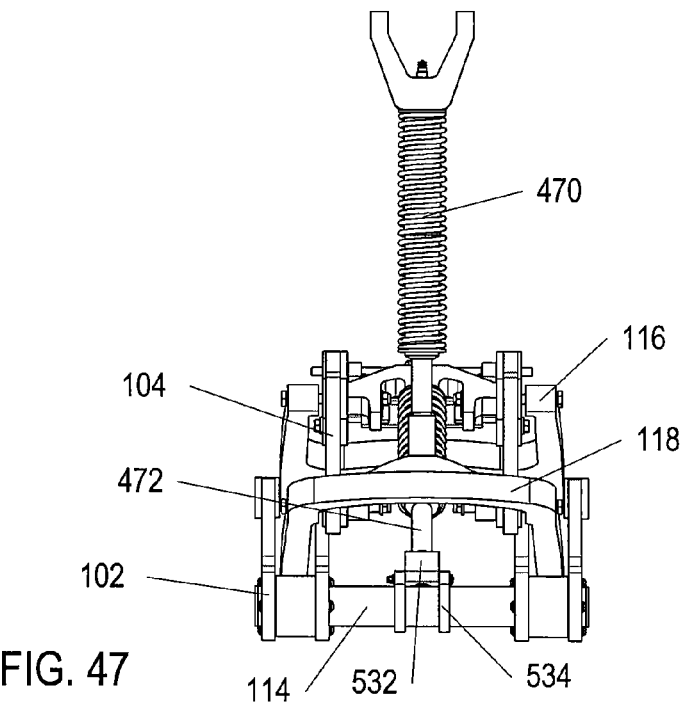
FIG. 47 is a end elevation view of the height adjustment assembly shown in FIG. 46 for use with the aircraft seat of FIG. 1, taken along line 47-47 of FIG. 46.

The vertical adjustment assembly 472 is optionally provided for seat height adjustment. Similar to the recline adjustment assembly 470, the vertical adjustment assembly 472 may control seat height by variation in length of the actuator assembly 514. The vertical adjustment assembly 472, as shown in FIGS. 46-47, preferably connects or is coupled to the lower support structure 102 and the mid support structure 104, as well as the upper swing arm 116 of the lower support structure 102 and, as a result, is capable of controlling or adjusting the seat height. To this end, the vertical adjustment assembly 472 is formed of a mid support structure connection member 516 having one or more connection elements 518 linked to the actuator 514. The connection elements 518 each may include an aperture, such as a pivot pin receiving aperture 520 or other device for connecting to the mid support structure 104. The pivot pin receiving apertures may receive a pivot pin or, for example, pivot member 182 which also secures upper swing arm 116 to the mid support structure 104.

Figure 48:
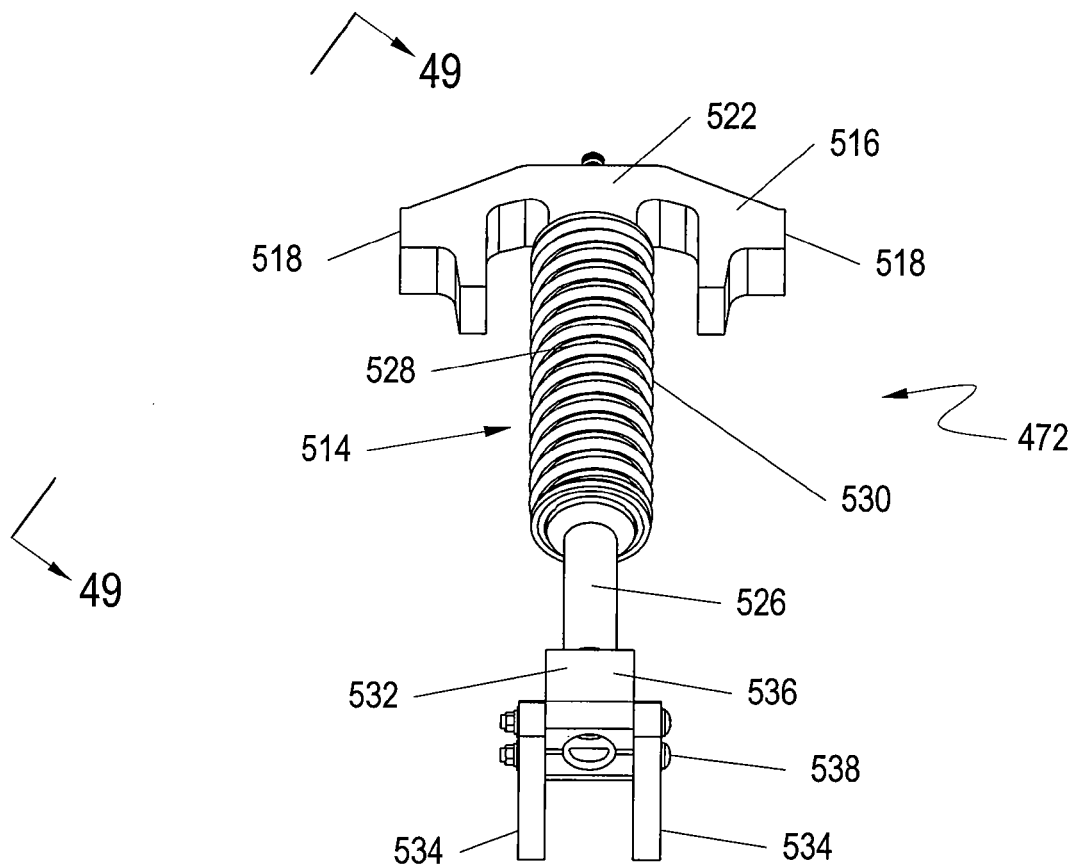
FIG. 48 is a perspective view of a height adjustment actuator assembly shown in FIG. 46 for use with the aircraft seat of FIG. 1.
Figure 49:
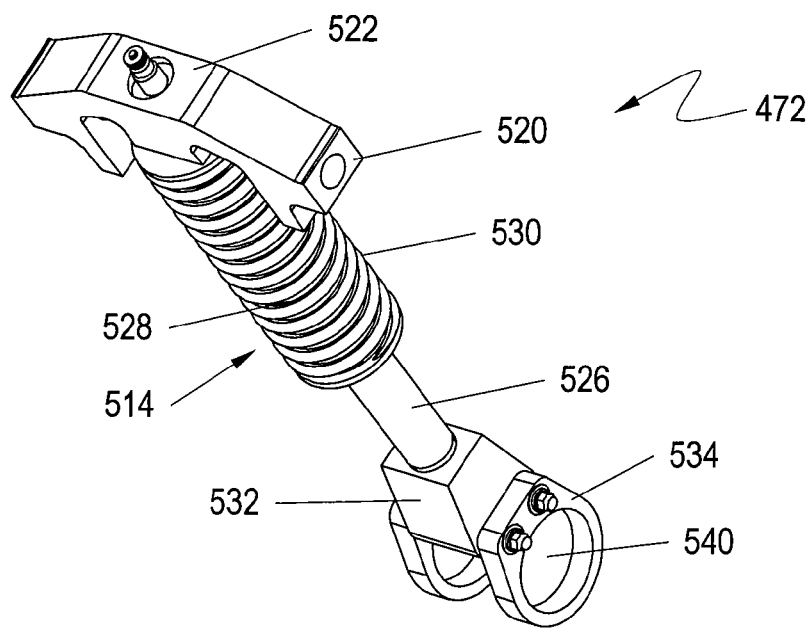
FIG. 49 is a perspective view of a height adjustment actuator assembly shown in FIG. 46 for use with the aircraft seat of FIG. 1, taken along line 49-49 of FIG. 48.

The mid support structure connection member 516 is linked to the actuator 514 by a central attachment portion 522 having an means to fasten or otherwise secure the actuator 514 to the connection member 516, including by not limited to an aperture for receipt of a fastening device, such as, but not limited to, a screw or bolt, which is threaded into the cylindrical member 526 of the actuator 514. The actuator 514 in the exemplary embodiment shown in FIG. 48-49, similar to actuator 480, is formed of a piston having a cylindrical member 526 which receives a telescoping cylindrical member 528. The telescoping cylindrical member 528 also has a spring 530 wound about its circumference and biased for resistance. The actuator 514 may be a hydraulic or air controlled cylinder, or other device suitable for the purposes provided. A preferred embodiment of the vertical actuator is available from Enidine Incorporated of Orchard Park, N.Y., under model number UL37. However, as with the recline actuator, the design of the vertical actuator 514 and the interface geometry is such that mechanical and electro-mechanical variations in design of the actuator can be interchanged for the purposes provided with no modification to the primary seat structure.

The telescoping cylindrical member 528 carries a lower support structure connecting member or attachment member 532 having one or more connecting elements 534. The lower support structure connecting member or attachment member 532 preferably includes a receptor 536 sized to receive the end of the telescoping member 528 and further may include a pin or fastener 538 which can be inserted approximately perpendicular to and through the telescoping member 528 to secure the telescoping member. The connecting elements 534 of the lower support structure connecting member or attachment member 532 include apertures 540 therein for receipt of a cross member, such as the rear cross member 114 (shown in FIG. 47), linked or connected to the lower support structure 102. The connecting elements 534 are received for pivotal rotation about the cross member. The vertical adjustment assembly 472 may also incorporate sleeve bearings that are pressed-in at the mid support structure connection elements and lower support structure elements to assist with smooth rotation over an extended lifetime.

The recline adjustment assembly 470 and the vertical adjustment assembly 472, and in particular actuation of actuator 480 and 514, may be facilitated by a control, such as a push button control, or may be by operated through manual adjustment.

Figure 50:
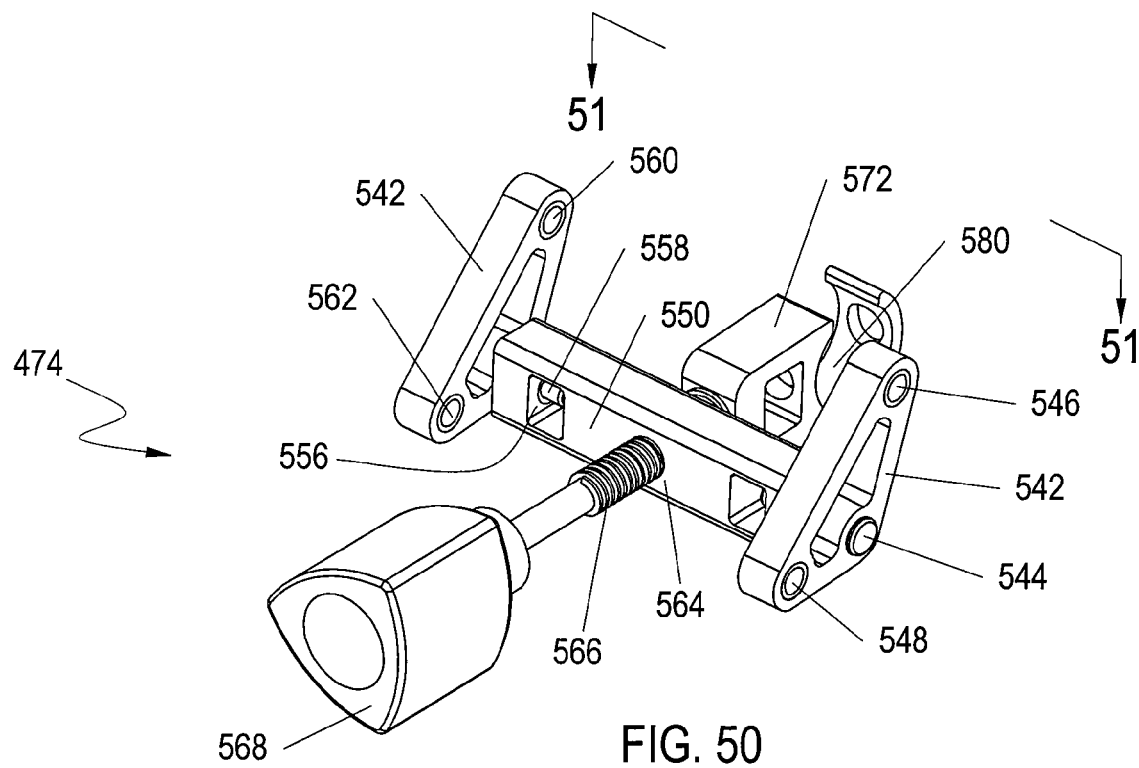
FIG. 50 is a perspective view of a thigh angle adjustment assembly for use with the aircraft seat of FIG. 1.
Figure 51:
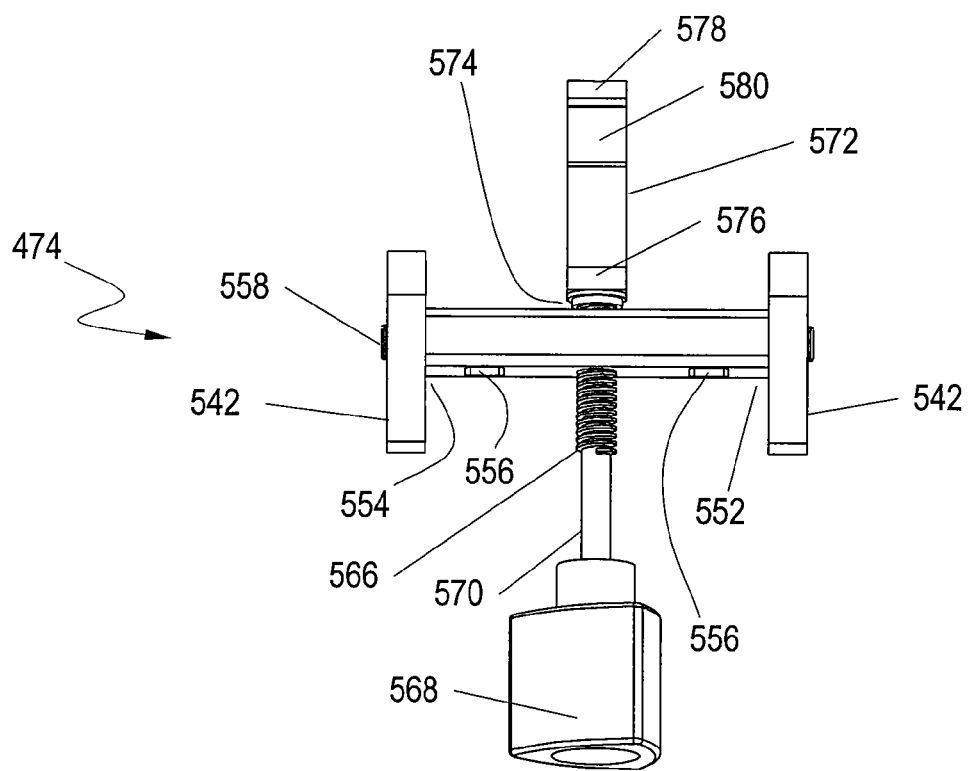
FIG. 51 is a top plan view of the thigh angle adjustment assembly for use with the aircraft seat of FIG. 1, taken along line 51-51 of FIG. 50.

The thigh angle adjustment mechanism or assembly 474 is an optional feature which may be added to the aircraft seat 100 for additional adjustable support. As seen in FIGS. 50-51, the thigh angle adjustment assembly 474 of an exemplary embodiment is mounted such that it connects or is coupled to the pan support structure 106 and the mid-support structure 104. As a result, the thigh angle adjustment assembly 474 is adapted to vary the position of the pan support structure 106 connection to the mid support structure 104, and is thereby capable of changing the angle of the pan support structure 106 and supported seat bottom cushion 350. To this end, the thigh angle adjustment mechanism may form an adjustment mechanism for moving a pivot axis located at the central portion of the seat upwardly and downwardly relative to the mid support structure or a support assembly, so as to cause the seat to pivot about the connector assembly connecting the pan to the seat back relative to the seat back whereby the seat can be inclined relative to the seat back when the seat back is in either its upright or its reclined position.

The assembly 474 shown in FIGS. 46 and 50-51, may include one or more swing arms 542 having one or more apertures forming connection locations 544, 546 and 548. In a preferred embodiment, at least two apertures and preferably three apertures are provided on each of the swing arms. One aperture 546 in each of the swing arms 542 receives a pan support structure connection element 560 which may be a pivot member or rod 561 (see FIG. 46) that is attached to the swing arms at the aperture and is also received by aperture 334 in the mechanism engaging end 330 of the pan support assembly recline swing arm 324. The pivot rod 561 may also be received by the thigh angle adjustment assembly connectors 188 on the mid support structure 108. The second aperture 548 in each of the thigh angle adjustment mechanism swing arms 542 may be spaced a distance from the pan support structure connection element 560 along the swing arm, and carries a mid support structure connection element 562. In the assembly shown, aperture 548 and connection element 562 connect to the seat pan swing arm 324. Aperture 546 and connection element 560 connect to the mid support at 128 on each mid support panel. Each element may be sized to receive a fastener for attaching the swing arm 542 to the respective pan support structure 106 and mid support structure 104.

The swing arms 542, when mounted to the mid support structure 104, are arranged in parallel alignment. Two swing arms 542 may be fixedly attached together by a cross member 550 having ends 552, 554 with pin receptors 556 for receipt of a pin 558, which may be a pivot pin, inserted through an aperture 544 in each of the swing arms and extending from the external surface of 542 into the opening 556 in the cross member 550. Cross member 550 forms a traveling block that travels along the threaded shaft 566 with rotation of the shaft. Pin 558 may connect the swing arms to the cross member or traveling block 550. The pin 558 may be cantilevered and held in place laterally by a spring pin (not shown) that inserts into a hole or aperture through an end, such as the inside end of pin 558. Traveling block 550 has a centralized aperture 564, preferably a threaded aperture, which is substantially perpendicular to the pin receptors 556 in the cross member. The centralized aperture receives threaded rod 566 carrying an adjustment knob 568 on a forward end 570 and a seat back structure connection member or seat back structure attachment device 572 on a second or rear end 574. The pitch or threaded portion of the screw or rod 566 is such that the system may be self-locking, although other locking mechanisms are contemplated. The seat back structure attachment device 572 has a first portion 576 which receives a portion of the threaded rod and is secured thereto. A second portion 578 of the seat back structure attachment device 572 may have a structure 580 for engaging the seat back structure 108, and preferably for at least partially contacting the mounting member 226 on pivot member 222 secured to the lower portion of the seat back structure 108, which is received by and pivotal within seat back structure connectors 186 on the mid support structure 104. As with the above-described subassemblies, sleeve bearings may be pressed-in at any one of the thigh adjuster swing arm pivot point connections to ensure smooth rotation over an extended lifetime.

A lumbar adjustment assembly 202 (see FIG. 52) is optionally provided for user selective adjustment of the lumbar region support provided by the back support 198. The selective adjustment of the lumbar adjustment mechanism or assembly 202 permits the adjustable support of the lumbar portion of the occupant's spine. The lumbar adjustment assembly 202 includes an extendable shaft 586 having a portion sized to be received by the upper lumbar receptor 582. The upper lumbar receptor is carried by the seat back structure 108. The extendable shaft 586 may be secured to a rotational joint 582 attached between two receptors 584 by any suitable means, including but not limited to, a threaded portion, a nut, a snap fit, or tongue and groove arrangement. The extendable shaft 586 illustrated in FIG. 52 may form a portion of actuator 590, similar to that described with respect to recline adjustment assembly 470 and vertical adjustment assembly 472, and may include a collar 592, sleeve 594, spring 596 and outer telescoping member or lower shaft 598. The actuator 590 may be a hydraulic or air controlled cylinder, or other device suitable for the purposes provided. A suitable actuator is available from Enidine Incorporated of Orchard Park, N.Y. under model number UL12. The actuator 590 may be operated by a suitable control, such as but not limited to a push button control, or may be manually operated.

Figure 52:
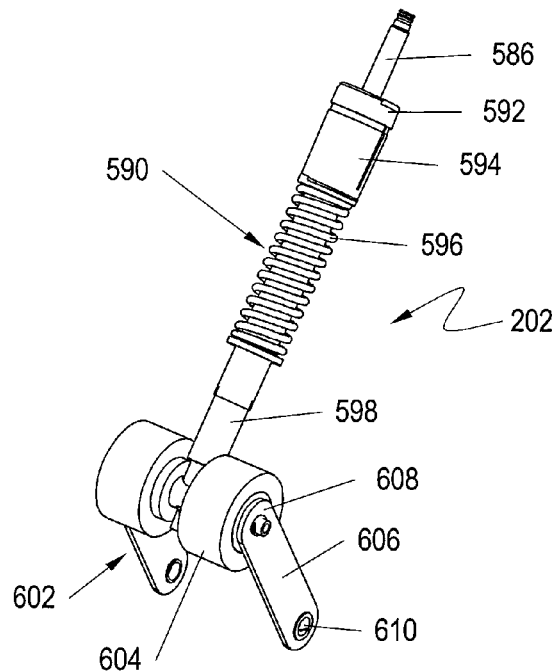
FIG. 52 is a perspective view of a lumbar adjustment assembly for use with the aircraft seat of FIG. 1, showing the lumbar adjustment assembly of FIG. 9.

The lower portion or lower shaft 598 of the actuator assembly 590 may carry a pressure application mechanism 602. In FIG. 52, pressure application mechanism 602 includes one or more rollers 604 or cylindrical rollers. The pressure application mechanism 602 is pivotally connected to arms 606 on a first end 608 and may, at a second end 610, be pivotally connected to pivot rod 370 or housing 372 on the lower portion of the back support 198 (see FIG. 53). The pivot arms 606 position the pressure application mechanism 602 toward the back support 198. The assembly 202 is arranged, such that extension or retraction of the extendable shaft 586 results in movement of the pressure application mechanism 602 toward or away from the back support 198.

Figure 53:
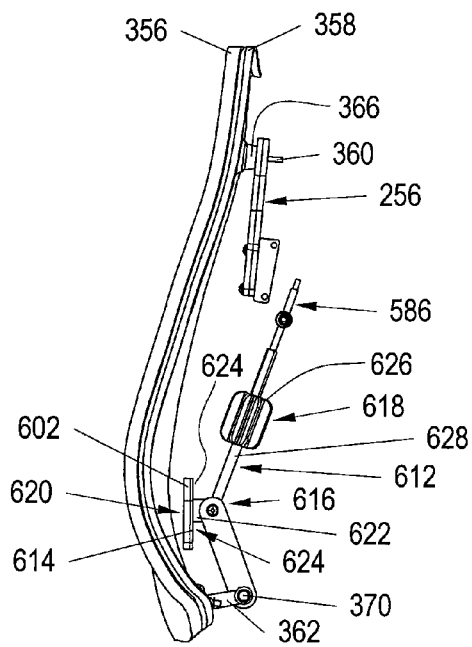
FIG. 53 is a side elevation view of an alternative embodiment of a lumbar adjustment assembly for use with the aircraft seat of FIG. 1, showing the lumbar adjustment assembly partially attached to the back support, and taken along line 53-53 of FIG. 54.
Figure 54:
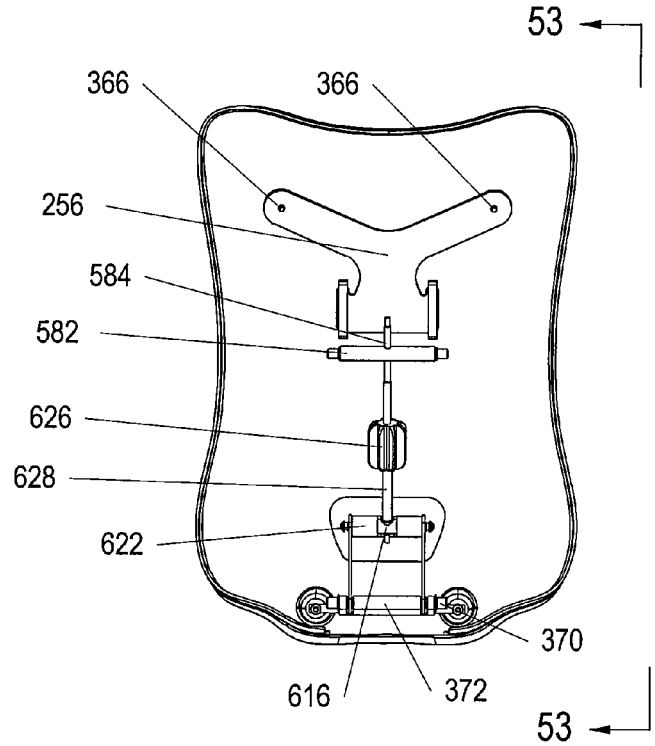
FIG. 54 is a rear elevation view of the lumbar adjustment assembly of FIG. 53 for use with the aircraft seat of FIG. 1, showing the lumbar adjustment assembly partially attached to the back support.

In an alternative embodiment shown in FIGS. 53-54, lumbar adjustment assembly 612 is substantially similar to lumbar adjustment assembly 202, except that a pressure plate 614 attached to a pivot member 616 is used in place of the roller assembly 604, and a screw-drive shaft 618 is used in place of actuator 590. Pressure plate 614 has an outer surface 620 for pressing against the back support 198 and a pivot member 622 connected on a back surface 624 for connecting to arms 606 carried by pivot member 616. The screw-drive shaft 618 has a threaded portion (not shown) which passes through an adjustment knob 626 for raising and relative movement of upper lumbar receptor 582 relative to shaft 586 and lower shaft 628.

The lumbar adjustment assembly 202 mounts (as shown in FIGS. 53-54) at a position adjacent the rear surface 364 of the back support 198. The upper fasteners 360 on the back support 198, which may include spacers 366, are attached to mounting plate 256 on the seat back structure 108. The mounting portion 260 of the plate 256 may have a rotational joint formed by upper lumbar receptor 582 connected to the seat back structure 108 mounting devices 270 used to attach the plate 256. The rotational joint 582 includes an upper lumbar receptor 584 which may be an aperture in or through the cross shaft. While specific assemblies and arrangements are disclosed, the lumbar adjustment assemblies 202, 612 discussed herein may mount entirely to the seat back structure 108, entirely to the back support 198 or a combination thereof.

In a preferred method of operation, the various adjustment mechanisms provide for a highly adjustable aircraft seat 100 to accommodate a variety of different passenger dimensions and comfort positions. The subassemblies of the aircraft seat 100 permit a variety of adjustments to be made for user comfort.

In one method of operation of the preferred aircraft seat 100, shown in FIGS. 55-56, vertical adjustment involves at least two of the structural subassemblies, namely the lower support structure 102 and the mid support structure 104 as well as the vertical adjustment assembly 472. To raise and lower the seat, or change the height of the seat 100, the vertical adjustment assembly 472 is operated. For instance, to raise the seat 100, actuator 514 length is increased by user operation of the controls of the assembly. In one example, a cable assembly (not shown) may be provided having a button or like control on a first side or end and a swing arm assembly may be positioned at the other end of the cable assembly. When the button is depressed, the depression of the button is translated into cable motion which, in turn rotates the swing arm about its pivot. In addition, the swing arm may, in one example push or press upon a button on the top of the actuator 514. The depression of the small button releases the internal locking mechanism of the actuator and it is then free to change length. As the length of the vertical actuator 514 increases, the mid support structure 104 moves in a four-bar motion vertically, and slightly forward. The four bar motion occurs by the mid support structure 104 moving in relation to the lower support structure 102. Specifically, the adjustment of the length of the vertical actuator 514, which is connected to the lower support structure 102 and to the mid support structure 104, causes the mid support structure 104 to move in relation to the lower support structure 102. This movement occurs simultaneously with the pivoting movement of the two swing arms 116, 118 which are formed by two longitudinal arm members 146 on the upper swing arm and two longitudinal arm members 148 on the lower swing arm. Movement of the swing arms occurs about the swing arm pivot members on both the lower support structure 126, 128. The swing arm pivot members are formed by connection of the swing arms to fittings 178, 180 via, for example, bolts which thread into 178, 180 in the mid support structure this arrangement permits uniform variation in the angle of the swing arms 116, 118 relative to the ground.

As can be seen in FIG. 55 which illustrates the seat geometry in the extreme full-down vertical position, the mid support structure 104 is positioned in close proximity to the lower support structure 102. Comparing FIG. 55 to FIG. 56 which illustrates the seat 100 in the extreme full-up vertical position, as the length of the vertical actuator 514 is increased, the vertical adjustment device 472, which is connected to the upper pivot member 182 of the mid support structure 104 forces the mid support structure 104 to move upward. This movement is facilitated by the simultaneous pivotal movement of the vertical adjustment assembly 472 at its lower support structure connection member 532 and mid-support structure connection member 516, as it is extended, as well as the simultaneous pivotal movement of the upper and lower swing arms 116, 118 at their pivotal connections with the lower and mid support structures. The aircraft seat 100 may be moved or adjusted to any number of positions between the lower extreme of FIG. 55, and the upper extreme shown in FIG. 56. Vertical adjustment of the seat assembly 100 of a preferred embodiment can range from 0 inches to 4 inches of actuator total travel, and may be approximately 3 to 4 inches of actuator travel. The aircraft seat 100 preferably has a range of from approximately 12 inches for low seat reference point 630 height to 19 inches high seat reference point 630 height. "Seat reference point 630" as used herein is may be a point in the mid-sagittal plane where the seat back and seat pan intersect and is measured from the bottom surface of the base member assemblies with the seat back in the upright recline position relative to aircraft controls.

In the upper extreme of FIG. 56, the mid support structure 104 is moved upward and slightly forward from the lower extreme of FIG. 55. It is understood that this vertical and slightly forward motion is a natural motion, for a seated occupant, as taller occupants are generally moved aft and downward, while shorter occupants are moved forward and up to achieve their ideal positions.

In addition to the vertical adjustment, operation of the aircraft seat 100 also may include a recline adjustment. Recline adjustment of a preferred embodiment, as shown in FIGS. 57-58, may involve a plurality of structural subassemblies, preferably, the mid support structure 104, the pan support structure 106 and the seat back structure 108 as well as the recline adjustment assembly 470. Comparing FIG. 57, which illustrates the seat geometry in the upright limit configuration and FIG. 58, which illustrates the fully-reclined limit configuration of the recline adjustment mechanism, in order to adjust the recline angle of the seat back, the recline adjustment assembly 470 is operated manually or by use of a control to adjust the length of the actuator 480. To recline the seat back structure 108 with attached back support 198 or more specifically to increase the angle between the seat back and the seat including seat cushion 350, recline actuator 480 length is reduced. To move upright and decrease the angle between the seat back structure 108 carrying the back support 198 and the seat and cushion 350, recline actuator 480 length is increased. As a result of the adjustment of recline actuator length, the seat back structure 108 pivots about pivot pin 484 connecting the recline adjustment assembly 470 to the seat back structure 108. Additionally, the seat back structure 108 rotates about the pivot member or seat back structure connectors 186 carried by the mid support structure 104. As a result of the geometry of the plates 196 of the seat back structure, the lower portion 218 may move below the mid support structure 104. This pivotal movement further alters the angle of recline of the seat back in relation to the mid support structure 104.

The mid support structure connecting member 498 of the recline adjustment assembly 470 also pivots about the lower or rear pivot member 184 of the mid support structure 104. Additionally, as the seat back structure 108 is rotated, the pan support structure 106 is pulled or pushed along with it. Specifically, a connector assembly couples the rear portion of the seat and specifically the pan support structure which carries the seat to the seat back structure for causing the rear portion of the seat to pivot downwardly about the pivot axis in unison with the seat back as the seat back moves from the upright position to the reclined position. More specifically, the pan support structure 106 is linked to the seat back structure at a location at the rear of the pan support structure by the pan pivot member 304 which is received by the rear attachment fitting 296 of the pan support structure and the pan support structure mounting members 242 on plates 196 of the seat back structure 108. Due to this attachment, the pan support structure 106 is pulled backward and slightly downward as the seat is reclined, or pushed forward and slightly upward as it is returned upright. The pan support structure also pivots about the pivot member 304 as the seat back structure is reclined or returned upright. The pan support structure 106 is also connected to the mid support structure 104 by thigh angle adjustment mechanism 474 which connects to the swing arm 326 of the pan support structure 106. As the seat back is reclined or returned upright, the swing arm 326 simultaneously pivots in opposite directions at its pan attachment end 328 and mechanism engaging end 330. The pan support structure 106 moves in the four-bar motion due to its swing arm 326 connected to the mid support structure 104 at the thigh adjustment assembly 474 and pivotal pan support attachment 296 and 304 on the seat back structure 108. The amount of thigh angle change with recline is determined by the length of the seat pan swing arm 326 and the location of its pivots on the pan support structure 106 and mid support structure 104.

The recline adjustment assembly has preferred actuator travel ranges from 0-4 inches and is preferably approximately 3-4 inches. The back angle may be adjusted in a range of approximately 10 degrees at a minimum, to approximately 31 degrees at a maximum back angle measured from vertical. The maximum possible back angle may be approximately 35 degrees from vertical as allowed by seat geometry. The thigh angle may range from a minimum of approximately 9 degrees at the minimum back angle, to a maximum of 20 degrees with the maximum back angle, both of which are measured with the thigh angle adjuster assembly 474 set to the minimum thigh angle. The seat reference point 630 height preferably ranges from a minimum of approximately 12 inches at the minimum back angle, to approximately 10 inches at the maximum back angle, both of which are measured with the thigh adjuster assembly set to the minimum thigh angle. The seat reference point 630 heights are measured from the bottom surface of the base member assemblies. While specific examples are provided herein, the effects of the dependent motion between the respective devices and subassemblies may be varied without departing from the overall scope of the present invention.

The thigh angle may also be adjusted. In a preferred embodiment, the thigh adjustment assembly functions as can be seen by reference to FIGS. 59-60, by moving the pivot location of the seat pan swing arm 324 up and forward to increase thigh angle, or in the opposite direction to decrease thigh angle. In a preferred embodiment, the jack-screw-driven traveling block 550 rotates the thigh adjuster swing arms 542 connected to the seat pan swing arm 324. The thigh angle adjustment mechanism 474 is capable of, thus, moving the pivot axis of the seat recline upwardly and downwardly relative to the support assembly so as to cause the seat to pivot about the connector assembly relative to the seat back whereby seat can be inclined relative to the seat back when the seat back is in either its upright or reclined position.

Figure 59:
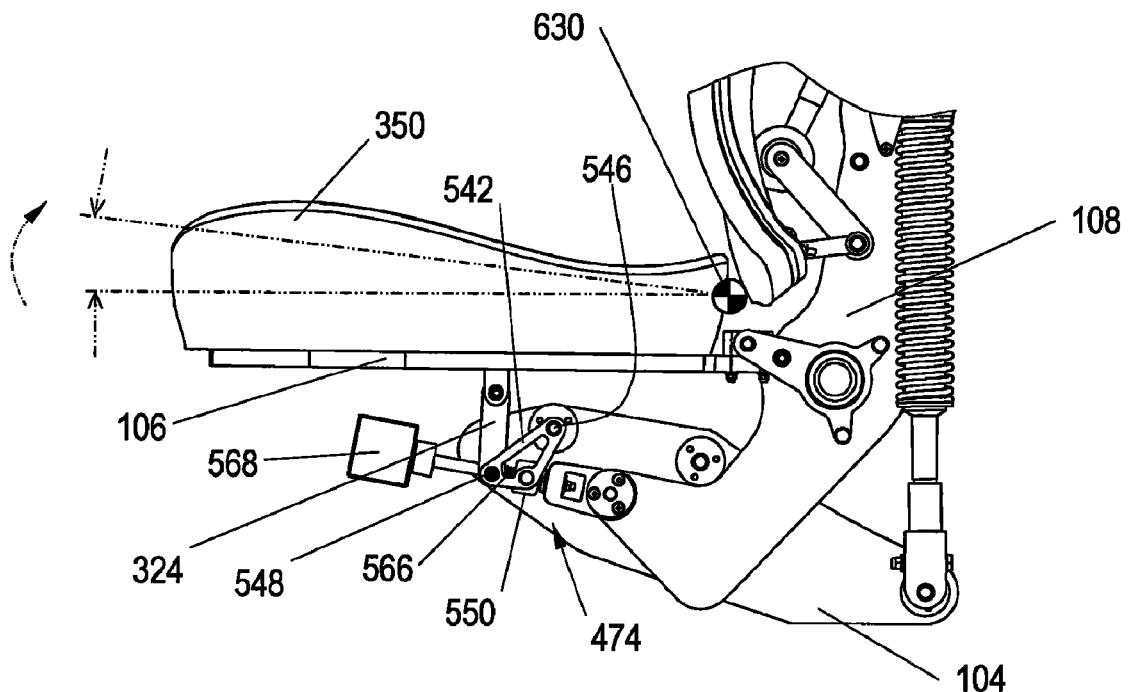
FIG. 59 is a cut-away side elevation view of the aircraft seat of FIG. 1, showing the thigh angle adjustment assembly in a minimum thigh angle orientation.
Figure 60:
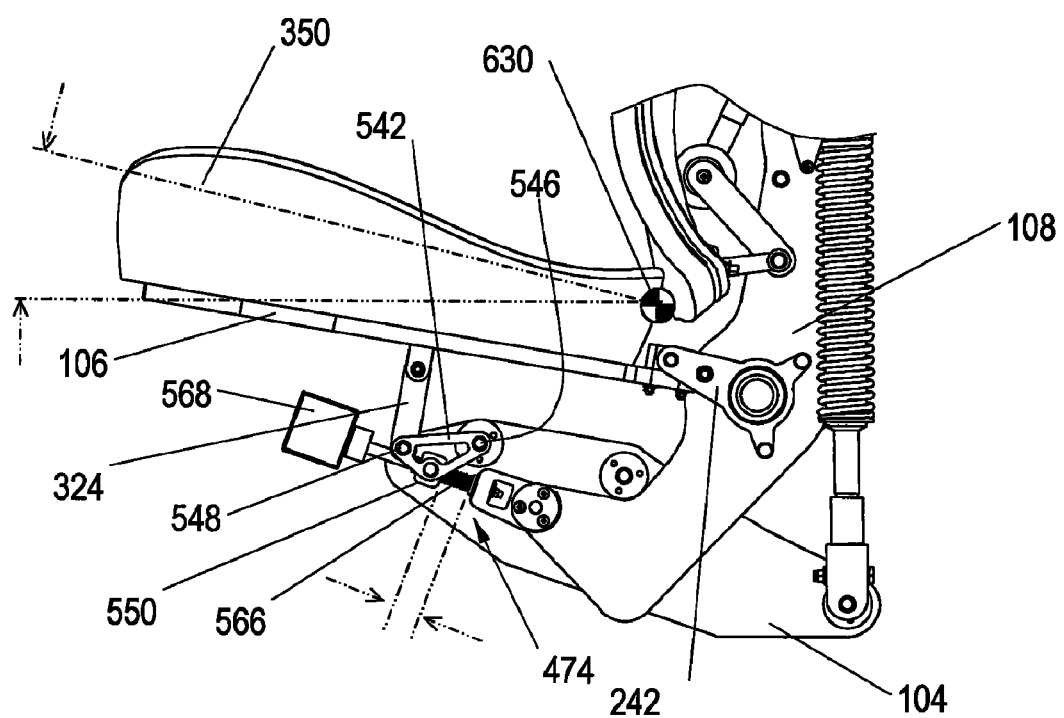
FIG. 60 is a cut-away side elevation view of the aircraft seat of FIG. 1, showing the thigh angle adjustment assembly in a maximum thigh angle orientation.

Specifically, the knob 568 may be turned by the seated occupant. As can be seen in FIG. 59, which illustrates the seat geometry in the full-down configuration of the thigh angle adjustment mechanism 474, the adjuster knob 568 has been rotated such that the traveling block 550 which is threaded for movement along the shaft 566, is positioned at or near the end of the threaded shaft of the adjustment assembly so that it is in close proximity to the seat back structure attachment device 572 connected to the seat back support structure 108 through pivot member 222. As the adjuster knob 568 is rotated to move the traveling block 550 towards the forward end of the shaft 566 (see FIG. 60 which illustrates the seat geometry in the full-up configuration of the thigh adjustment mechanism) the thigh adjustment mechanism swing arms 542 pivot about a stationary pivotal connection 546 to the mid support structure 104 and about the pivotal connection 544 to the traveling block 550, as well as the pivotal connection 548 to the seat pan swing arm 324. As a result of the stationary pivotal connection 546, the thigh adjustment assembly swing arm 542 rotates about the stationary connection 546 to raise the height of the pivotal connection 548 to the seat pan swing arm 324. As the seat pan swing arm 324 moves in unison, the seat pan 306 connected thereto is raised, thereby raising the seat cushion 350 at the forward or central location of the swing arm connection. Turning the adjustment knob 568 in the opposite direction results in the opposite of the described movements. Preferably, the thigh angle adjustment mechanism 474 has an adjustment mechanism travel range of the traveling block 550 of between 0 and 1 inch and more preferably of approximately 0.75 inches. The thigh angle adjustment mechanism 474 preferably may adjust the thigh angle in a preferred range from approximately 5 degrees to approximately 15 degrees measured from horizontal and including the thigh angle which may be naturally present due to the cushion 350. Additionally, the thigh angle adjustment mechanism 474 has minimal effect on the thigh angle change that occurs during recline of the seat back structure 108 and attached back support 198. Instead, it adds to or subtracts from the seat pan 306 angle at any given position of recline.

Figure 61:
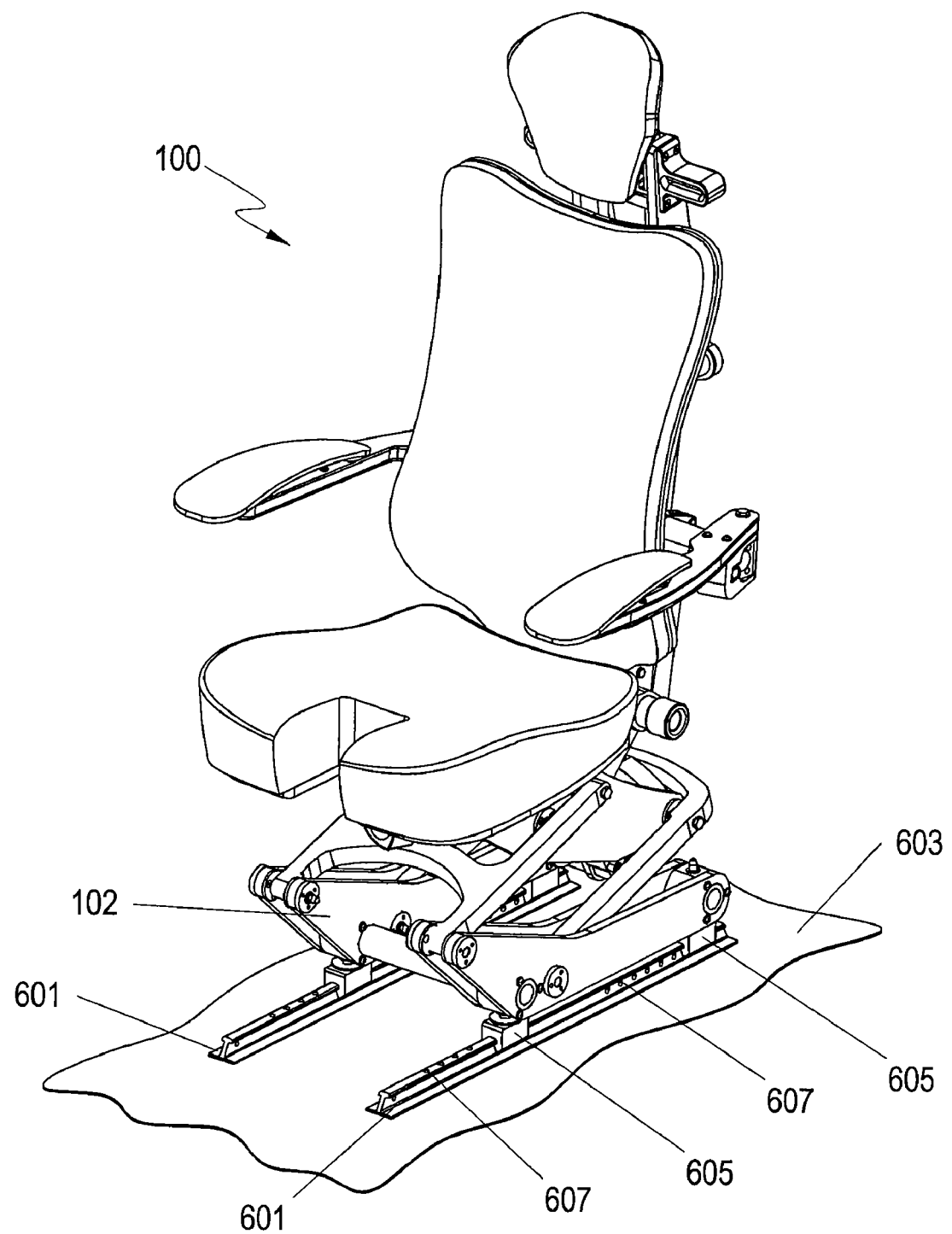
FIG. 61 is a perspective view of the aircraft seat of FIG. 1, showing the aircraft seat mounted in tracks positioned on the floor of an aircraft, the aircraft floor and tracks being shown partially cut away.

The installed aircraft seat 100 may also include fore-aft adjustment mechanisms via tracks 601 mounted on the floor 603 of a typical aircraft as shown in FIG. 61. The tracks 601 may be mounted, for example, forming a "T" shaped cross-section. Fittings 605 may be provided on the seat 100. In the example shown in FIG. 61, for instance, the fittings 605 are mating female fittings that interface with the tracks. Fore-aft position of the seat may be fixed by a removable or disengagable pinned connection between the seat 100, and in particular, the lower support structure 102, and the floor tracks 601, or may be a tongue and groove or threaded screw type connection. In order to adjust the seat, the relevant attachment devices is disengaged from the track, which may be by a handle-actuated cable connection, and the seat is free to move. The attachment device may then be reengaged. To facilitate attachment, apertures or holes 607 may be provided in the track, and may be located in the top surface of the track or positioned laterally through the bottom part of the "T".

To further accommodate a variety of occupant sizes and weights, as well as personal comfort preferences, the lumbar adjustment mechanism 202 or 612 is integrated into the seat back structure 108. The lumbar adjustment mechanism 202, 612 provides lumbar support, by applying occupant-adjustable pressure to the lumbosacral area of the back support 198 which, due to its flexibility, transmits that pressure to the occupant. As discussed, the back support surface 198 is constructed of a highly-contoured, flexible shell or structural layer 358. The lumbar adjustment assembly 202 has a portion 602 which contacts the back or rear portion 364 of the back support surface 198, and is adapted or arranged to apply pressure to the lumbar area of the back support surface 198 to impress similar support upon the lumbar area of the seated occupant. The flexibility of the back support surface 198 permits the adjustment of the contour of the surface in response to the adjustment of the lumbar adjustment mechanism.

To adjust the lumbar pressure application device 202 or 612 fore and aft, in one embodiment shown in FIGS. 52-54, either the actuator 590 is actuated, or the screw-drive shaft 618 adjusted by rotation of the attached knob 626 which may be accessible from behind the seat back, in front of the seat back structure 108. The lumbar adjustment mechanism 202, 612 may be adjusted to move the pressure application device fore and aft by increasing or decreasing the length of the actuator by the control mechanism or manual operation. An increase in length of the lumbar adjustment assembly 202 or 612, or more specifically, extension of extendable shaft 598 (FIG. 52) or 628 (FIGS. 53-54), due to its restrained upper attachment, causes pivotal movement at or about pivot members 582, 616, and 370 and moves the pressure application device 602 toward the back support 198. Movement in the opposite direction or decrease in length of the extendable shaft moves the pressure application device 602 away from the back support 198. The lumbar adjustment mechanism of a preferred embodiment permits a range of fore and aft adjustment of preferably between 0 and 1 inch and more preferably approximately 0.75 inches in the lumbosacral area.

Armrests may also be optionally provided which are adjustable. In the embodiment of FIGS. 36-37, the armrest 216 may be locked in place by telescoping rod assembly 394. The telescoping rod 394 serves as a lock, the release of which permits the pivotal movement of the armrest 216. To this end, telescoping rod assembly 394 may lock the frame 376 and pad 378 of the armrest assembly 216 against vertical pivoting about a pivot axis formed by the connection of the armrest to the seat back structure 108. In one example, the telescoping rod assembly 394 may include a push button (not shown) in communication with a cable tensioned or adapted to communicate a signal, which may be mechanical or electrical, to the telescoping rod assembly. The actuation of the push button releases or reengages the locking telescopic rod to permit movement. To this end, telescoping rod adjustment assembly is adapted to move in association with the movement of the armrest assembly 216. Specifically, increase or decrease in length of the rod 394 results from the pivotal movement of the armrest 216 and specifically the armrest support housing 386 about rod 214 on the seat back structure 108.

In one alternative embodiment, armrests are adjustable vertically. In the embodiment of FIG. 39, the armrest may be vertically adjusted by sliding the armrest housing 430 relative to the armrest 374 track or rod 424. This may be facilitated manually or by the addition of a release button which may then be depressed to release the securement of the housing to the track. Vertical adjustment may be limited only by the upper and lower stops or attachment locations of the slide, and thus length of the armrest slide or track. Vertical adjustment may also be permitted incrementally, with predefined increments of movement. For instance, a plurality of 0.4 inch increments may be provided by spaced apart adjuster apertures within the track or slide, and a total range of approximately 3.2 inches of movement may be available. Clamping mechanisms 436 may be released to facilitate movement and then reattached for securing the armrests in place. Additional adjustment can be provided by lengthening the track(s) and adding additional adjuster apertures. Preferably, the right and left armrest assemblies are stand-alone assemblies, such that the left and right assemblies can be adjusted independent of one another.

The armrests may also be optionally or alternatively adjustable to fold or pivot or to facilitate ingress and egress. The armrests 216 of FIGS. 36-37 may include an additional piston or telescoping arm 416, substantially as described with respect to telescoping rod assembly 394, which may be used to lock the armrest assembly 216 against horizontal pivoting of the frame 376 and pad 378 carried thereby. The telescoping rod assembly 416 may be locked or released by a push button in communication with a cable operable to permit or restrict telescoping movement of the rod and thus the pivot of the armrest. Similar to telescoping rod 394, actuation of the push button releases or reengages the lock to permit movement. Specifically, frame 376 movement or pivot inward toward the occupant causes the decrease in length of the telescoping arm 416. Increase in length of the telescoping arm 416 results as the frame 376 pivots away from the occupant. The push button may be the same push button used for vertical pivot locking and unlocking in association with assembly 394 or may be a separate button provided for use with assembly 416.

Figure 62:
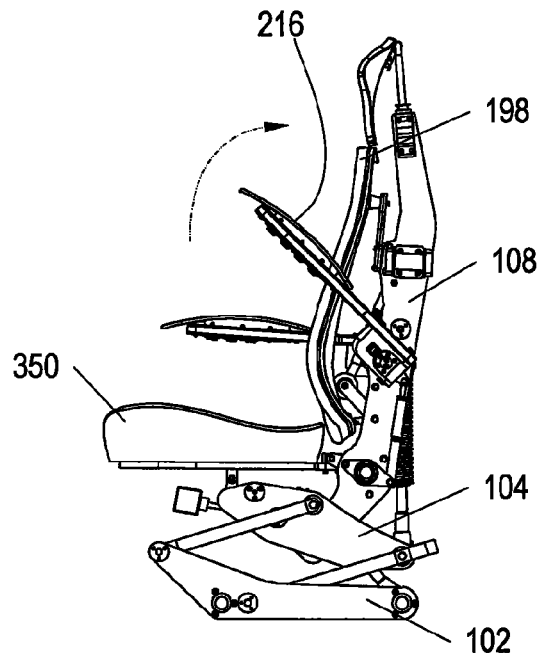
FIG. 62 is a side elevation view of the aircraft seat of FIG. 1, showing the armrest assembly of FIG. 39 in a folding motion, moving upward toward an upright position.
Figure 63:
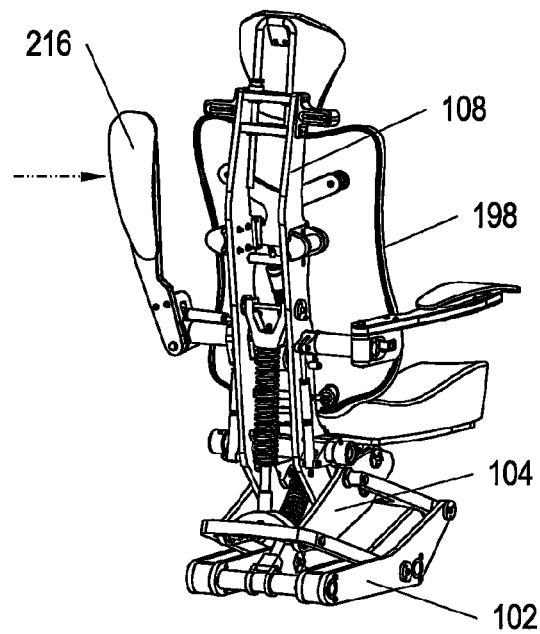
FIG. 63 is a rear perspective view of the aircraft seat of FIG. 1, showing the armrest assembly of FIG. 39 in a folding motion, moving inward toward a folded position.
Figure 64:
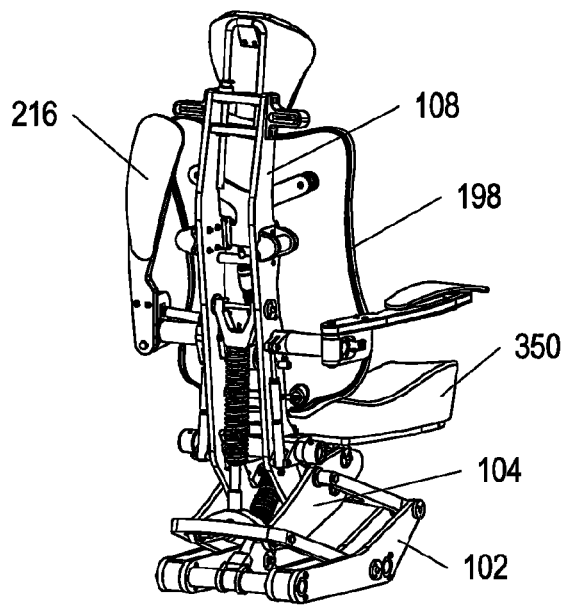
FIG. 64 is a rear perspective view of the aircraft seat of FIG. 1, showing the armrest assembly of FIG. 39 in a folded position.
Figure 65:
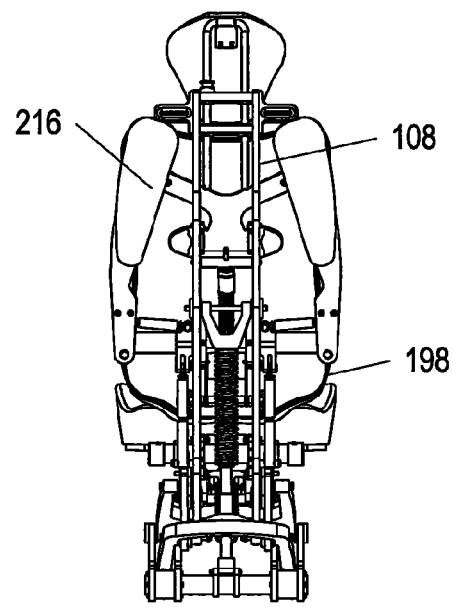
FIG. 65 is a rear elevation view of the aircraft seat of FIG. 1, showing the armrest assembly of FIG. 39, including two armrests in a folded position.
Figure 66:
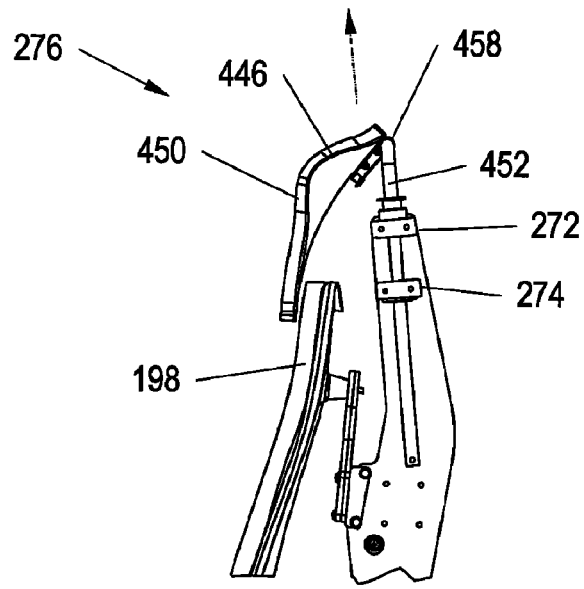
FIG. 66 is a side elevation view of a headrest assembly for use with the aircraft seat of FIG. 1, showing the extreme lowered position of the headrest assembly.
Figure 67:
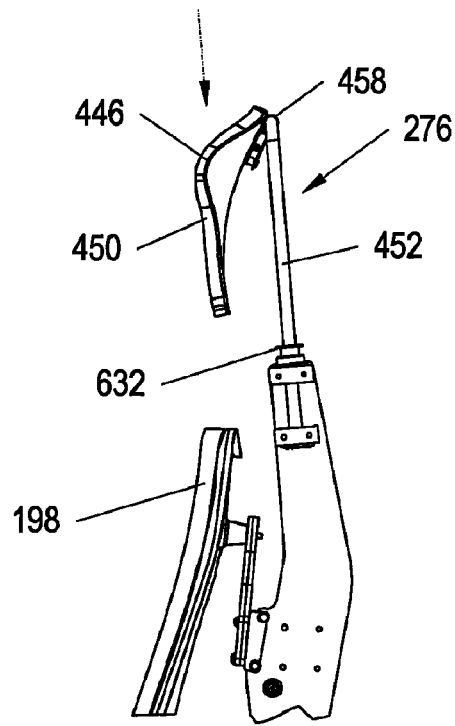
FIG. 67 is a side elevation view of a headrest assembly for use with the aircraft seat of FIG. 1, showing the extreme raised position of the headrest assembly.
Figure 68:
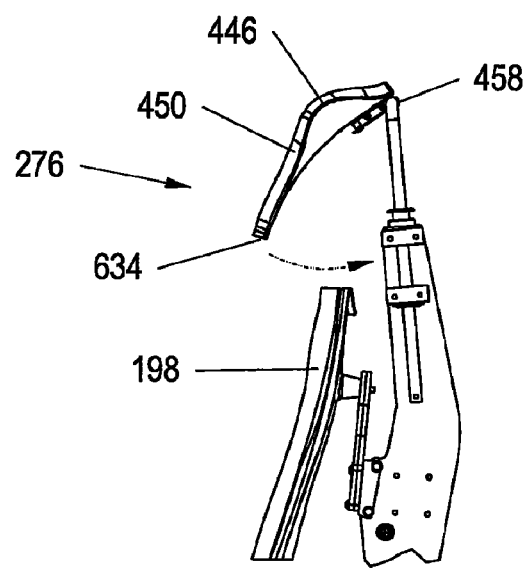
FIG. 68 is a side elevation view of a headrest assembly for use with the aircraft seat of FIG. 1, showing the extreme forward tilt of the headrest assembly.
Figure 69:
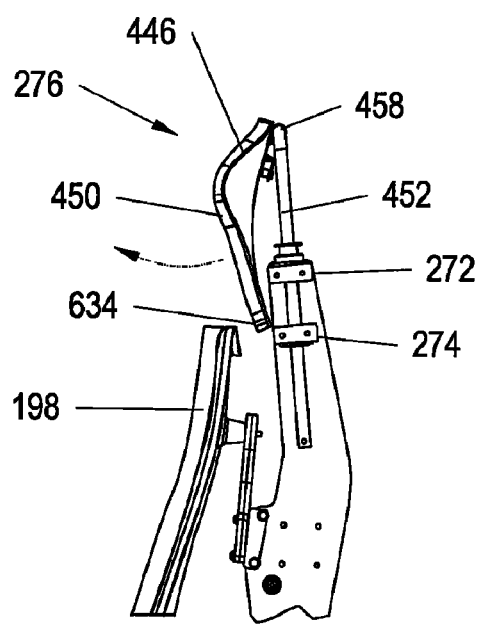
FIG. 69 is a side elevation view of a headrest assembly for use with the aircraft seat of FIG. 1, showing the extreme inward or back position of the headrest assembly.
Figure 70:
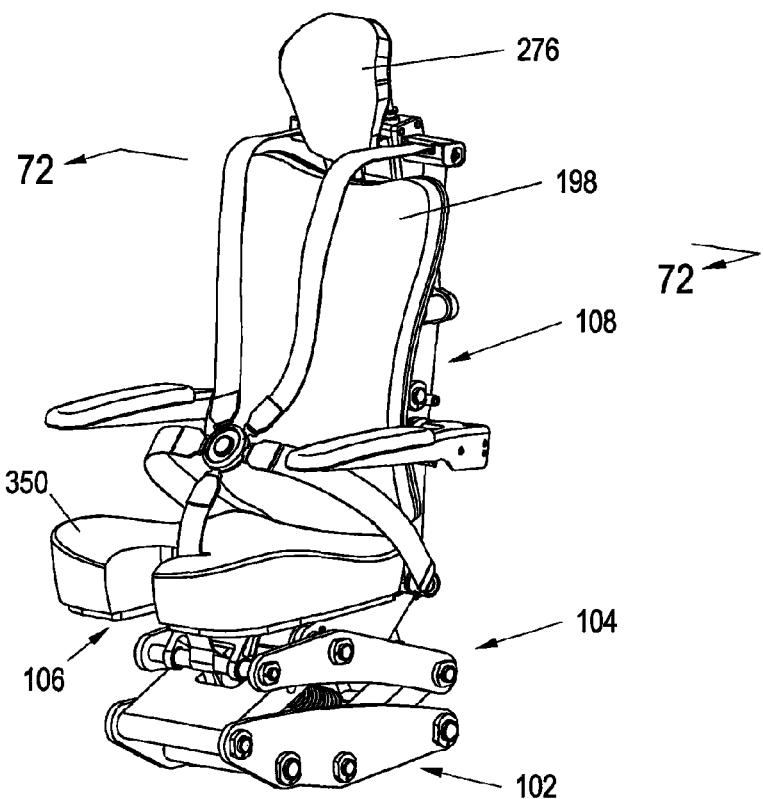
FIG. 70 is a perspective view of an alternative embodiment of an aircraft seat of the present invention.
Figure 71:
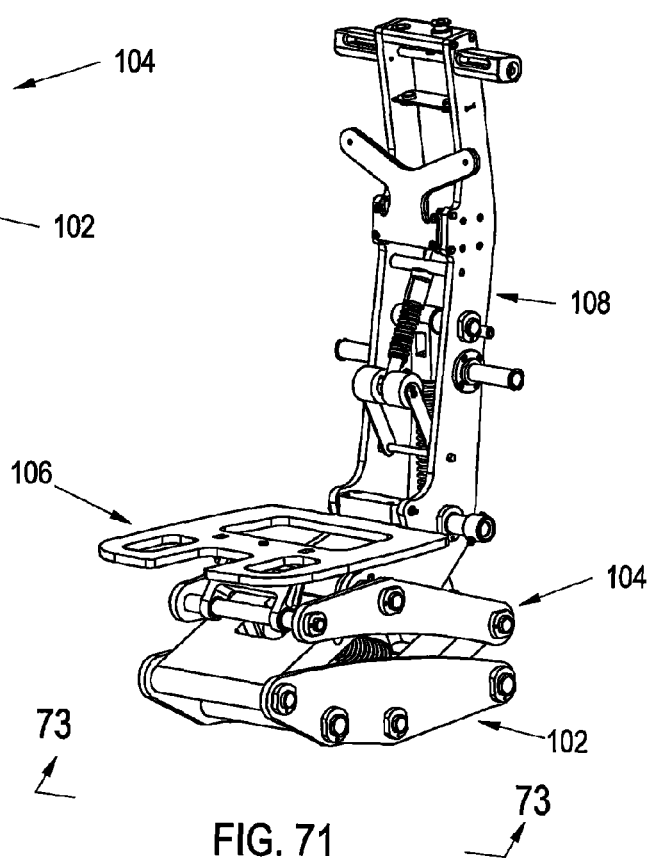
FIG. 71 is a perspective view of the aircraft seat of FIG. 70, showing the frame assembly and pan support assembly.
Figure 72:
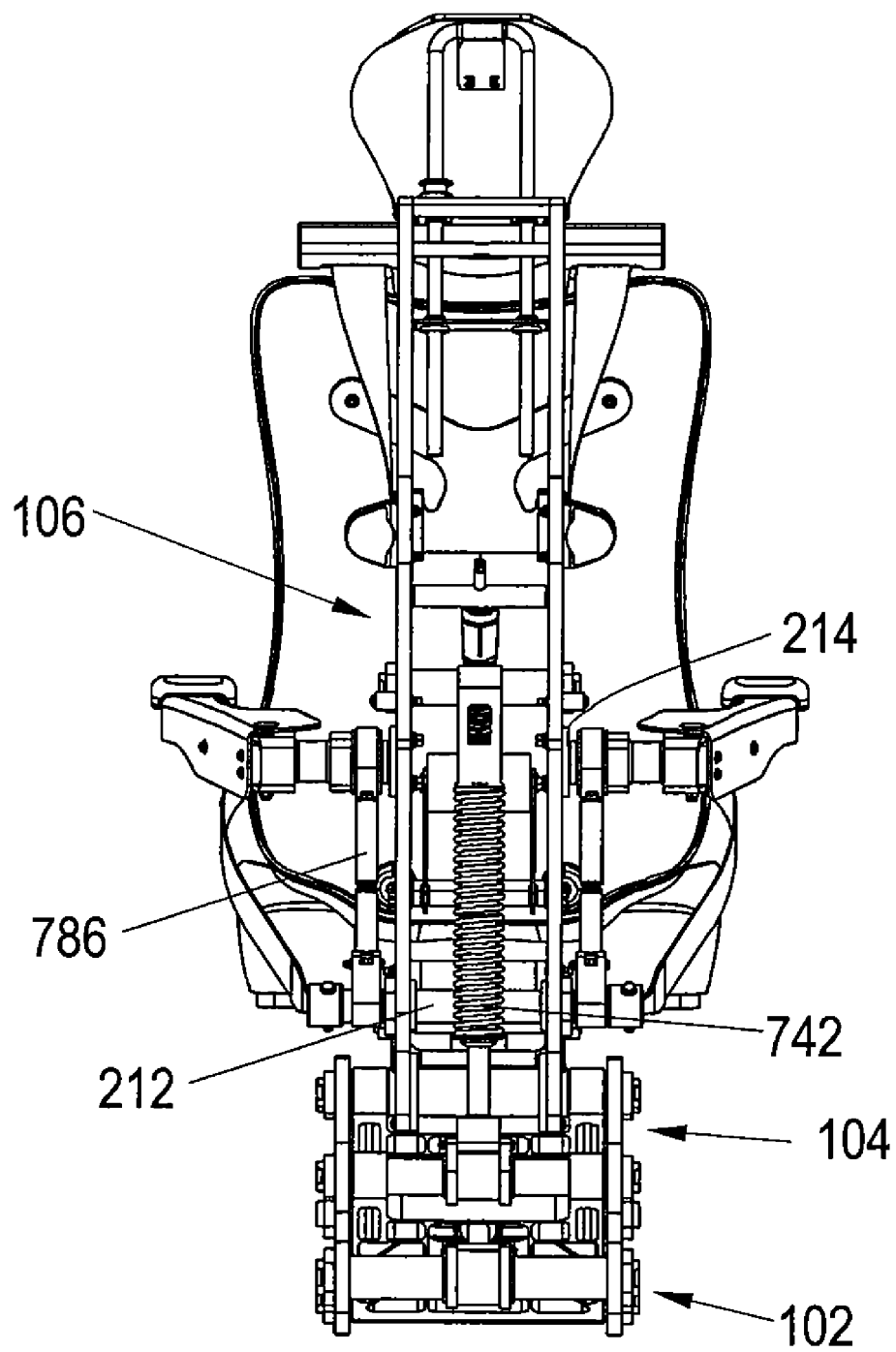
FIG. 72 is a rear elevation view of the aircraft seat of FIG. 70, taken from line 72-72 of FIG. 70.

The fold-away adjustment of the arm rest assembly (see FIGS. 62-65) may be accomplished by one or more folding or pivoting mechanisms. In operation of the armrest 216, starting with the armrests in the down position (FIG. 62), the user grasps any portion of the armrest arm assembly 216 and moves it upward, rotating the armrest arm 376 and pad 378 toward the back of the seat 100 until it is in contact with a stop (not shown). Once the armrest arm 376 and pad 378 are fully rotated aft (see FIG. 63), they can be rotated behind the seat back by applying pressure to the armrest toward the center of the seat 100 (see FIGS. 64-65). In the fold-away orientation, the armrests are entirely within the maximum lateral and aft portions of the seat (see FIG. 65).

In one example of an alternative embodiment, no locking features are provided with the fold-away feature. Instead, motion stops and friction may be used for positioning. Fold-up and fold-down may also be limited by a pin in the pivot housing that contacts a travel stop member on the armrest slide. The fold-behind motion may thus be controlled by a pin and slot near the fold-behind axis in the pivot housing. A friction hinge may be used to hold the armrest arm behind the seat back. The friction hinge may be located in the pivot housing on the fold-behind axis. The design of the armrest arm, pivot housing, and slide preclude one of the folding motions depending upon where the armrest is positionally adjusted. For example, the armrest cannot be rotated laterally while it is forwardly positioned. Likewise, the armrest cannot be folded down while it is folded behind the seatback. The fold-away mechanism of each of the left and right armrests is independent, such that each armrest may be operated independently of the other armrest. In addition, the fold-away mechanism is not dependent upon the vertical adjustment location of the armrest assembly, as it functions regardless of vertical position of the armrest.

The headrest 276 of the aircraft seat 100 may also be adjustable (see FIGS. 66-69). The headrest 276 may be vertically adjustable and adjustable fore and aft. The vertical motion of the headrest assembly may be guided at four locations 204 in the two upper cross members 272, 274 provided in the seat back structure 108. The guides 204 may include bearings (not shown), preferably plastic bearings to assist in guiding the headrest. Vertical motion may also be controlled by a one-way locking collar 632 (see FIG. 66), which locks only in the downward direction. Referring to FIGS. 66-69, to raise the headrest 276, the occupant may simply pull upward on the headrest pad assembly. The headrest 276 rises until the occupant stops this action. To lower the headrest, the occupant releases the locking collar 632 by preferably pulling on its upper flange and pushing down on the headrest 276. Once the desired position is reached, the locking collar 632 is released to lock the headrest 276 in position. Preferably, to account for larger occupants, the vertical adjustment axis is oriented forward, which results in the headrest pad moving forward as it moves up, accounting for a thicker upper body size and resulting forward position of the back surface of the head. In a preferred embodiment, the vertical headrest adjustment may be adjusted vertically within a range of approximately 6.5 inches, and is further substantially infinitely adjustable within this range.

Fore and aft positioning of the headrest may be accomplished by pulling on the lower portion 634 of the headrest 276. The plate 446 of the headrest assembly may be connected to the headrest support tube 454 by a spring clip or pivot member 458 that is clamped around the tube. The spring clip 446 serves as a pivot point for the plate and a force control as a result of the constant frictional force it exerts on the headrest tube. As a result, the headrest plate 446 may be rotated around the headrest tube 454 by applying force sufficient to overcome the friction force applied by the spring clip 458. The friction force is preferably tailored to be sufficient to support the head of an occupant in the reclined position without movement. However, if sufficient force is applied with the head, the headrest assembly may move until it contacts the seat back or headrest support tubes. The headrest fore-aft adjustment permits the headrest to be adjusted into an overlapping position with the top edge of the seat back, allowing shorter occupants to effectively use the headrest. Preferably, the fore-aft adjustment mechanism permits approximately 3-4 inches of forward travel measured from the bottom edge of the headrest pad, and approximately 30 degrees of forward rotation. A forward motion stop may be provided to prevent rotation of the headrest or plate 446 from rotating over the top of the mounting device 452.

In a preferred method of construction of an aircraft seat frame 110, the various plates of the lower support structure 102, mid support structure 104, pan support structure 106 and seat back structure 108 may be formed with uniform construction and uniform thickness. In this regard, a common material, such as a flat graphite plate or composite plate of appropriate dimension, may be obtained. In one example of an embodiment, the plate may be manufactured in four (4) foot widths up to forty (40) feet in length, although alternative dimensions would not depart from the overall scope of the present invention. In addition, the plate may be formed of one or more plies of material. This plate is then cut by two-dimensional cutting, including, but not limited to CNC cutting, of the various plate members having the shapes described herein. Two-dimensional cutting may include cutting along the X and Y axes of a sheet of material. To this end, a cutting device may be used which has a cutting head that is operable to cut profiles in two dimensions, such as an x-y plane in generally planar work pieces, including but not limited to metal sheet or plate. An example of one application of two-dimensional cutting is a two-dimensional cutting table, in which a cutting head moves in X-Y axes, according to the outputs given by a CNC Controller. While a specific application and cutting device are described for purposes of example, alternative cutting devices and applications may be acceptable for purposes of the present invention. The Z (height) axis may be controllable, in order to adapt to non-flat or thicker materials as the cutting head may need to be in close proximity to the material being cut. This type of system is best for rapid production of many different types of parts from different materials. Alternatively, the plate members may be pre-cast or molded or otherwise formed into the desired shapes using commercially available mechanisms, methods or devices. The two-dimensional cutting of the plate results in a plurality of structural components of uniform construction and thickness. These structural components may be primary structural components of the aircraft seat or may be portions of one or more subassemblies or attachment devices described herein. These plates may then be formed or assembled into a seat frame. For example, the plates may be formed or assembled into the various subassemblies by attachment of the respective fittings and other components discussed herein to form the lower support structure 102, mid support structure 104, pan support structure 106 and seat back structure 108. In a further example, the support structures generally include a first part or plate and a second part or plate which parts are combined by one or more components, such as a mechanical joint that permits movement of the first part relative to the second part to arrive at the finished part. These structures are then assembled as described and illustrated herein to form the frame assembly 110. It is contemplated that the back support plate and headrest plate may also be cut using the foregoing method and then shaped according to the appropriate dimensions using common commercial means. Alternatively, the back support plate and headrest plate may be molded to the desired shape. Additional elements, such as the pad, may be attached using common commercial means, including but not limited to, by adhesive attachment.

According to the foregoing method of assembly, a seat for use in an aircraft having a floor may be formed. The seat includes a support assembly that has first and second support plates adapted to be secured to a floor, a seat carried by the support assembly and a seat back pivotably coupled to the support assembly. The seat may have a seat plate for supporting a seat cushion as defined hereinabove. The seat back may have first and second back support plates for supporting a back cushion as defined herein above. Each of the plates may be made of the same composite material and have the same thickness so as to facilitate manufacture of the seat. Additional support plates, such as third and fourth support plates, may also be provided as illustrated with respect to the mid support structure detailed hereinabove, coupled between the seat plate and the first and second support plates. These additional support plates may also be made of the composite material and have the same thickness as other plates.

An alternative embodiment of an aircraft seat assembly 700 is shown in FIGS. 70-81. Seat assembly 700 is substantially similar to seat assembly 100 and like numerals have been used to describe like components. In this regard, aircraft seat assembly 700 generally includes a seat cushion 350, a back support surface 198, and a headrest assembly 276 supported by a frame formed generally of one or more of a lower support structure 102, a mid support structure 104, a pan support structure 106, and a seat back structure 108.

Figure 73:
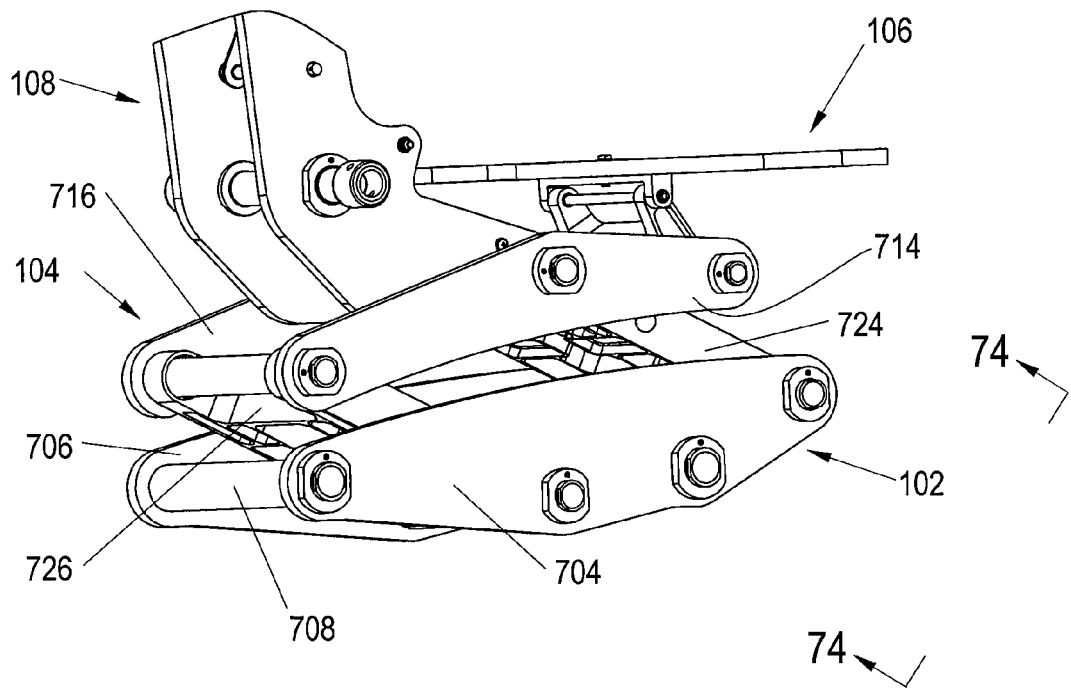
FIG. 73 is a cut-away rear perspective view of the aircraft seat of FIG. 70, taken from line 73-73 of FIG. 71.
Figure 74:
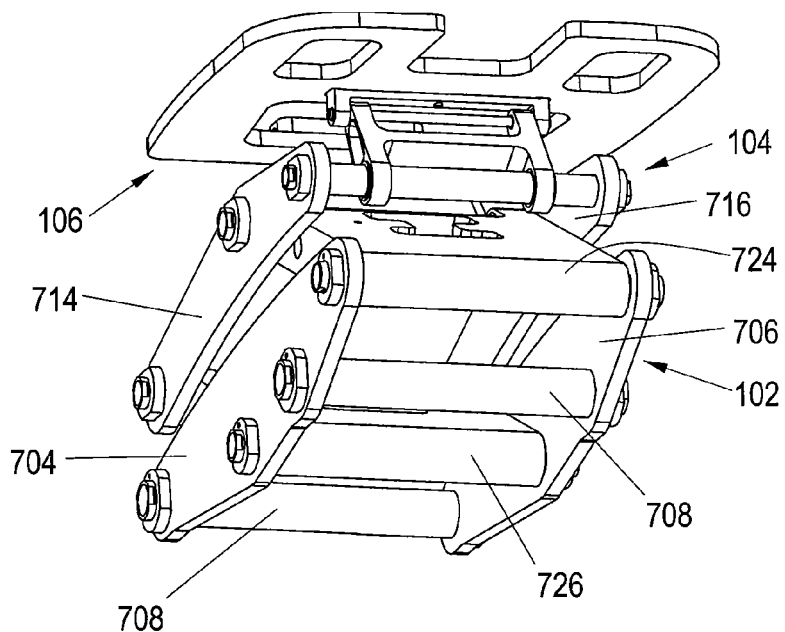
FIG. 74 is a perspective view of the aircraft seat of FIG. 70, taken from line 74-74 of FIG. 73, absent the seat back support structure.
Figure 75:
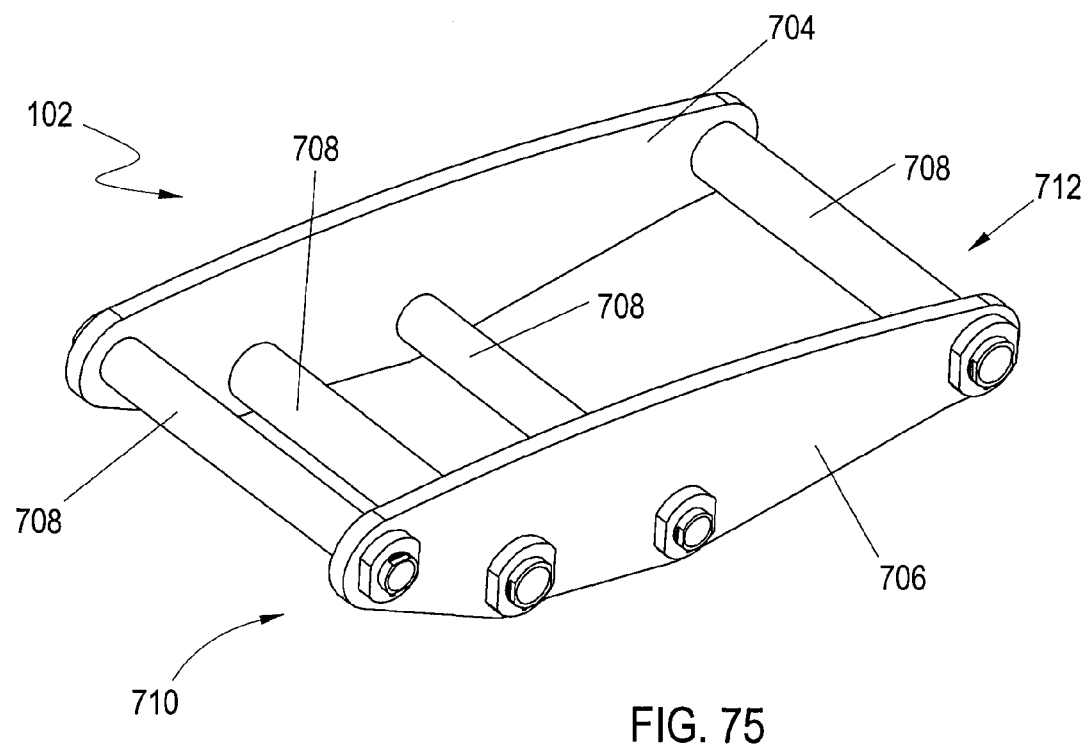
FIG. 75 is a perspective view of the lower support structure of the aircraft seat shown in FIG. 70.
Figure 77:
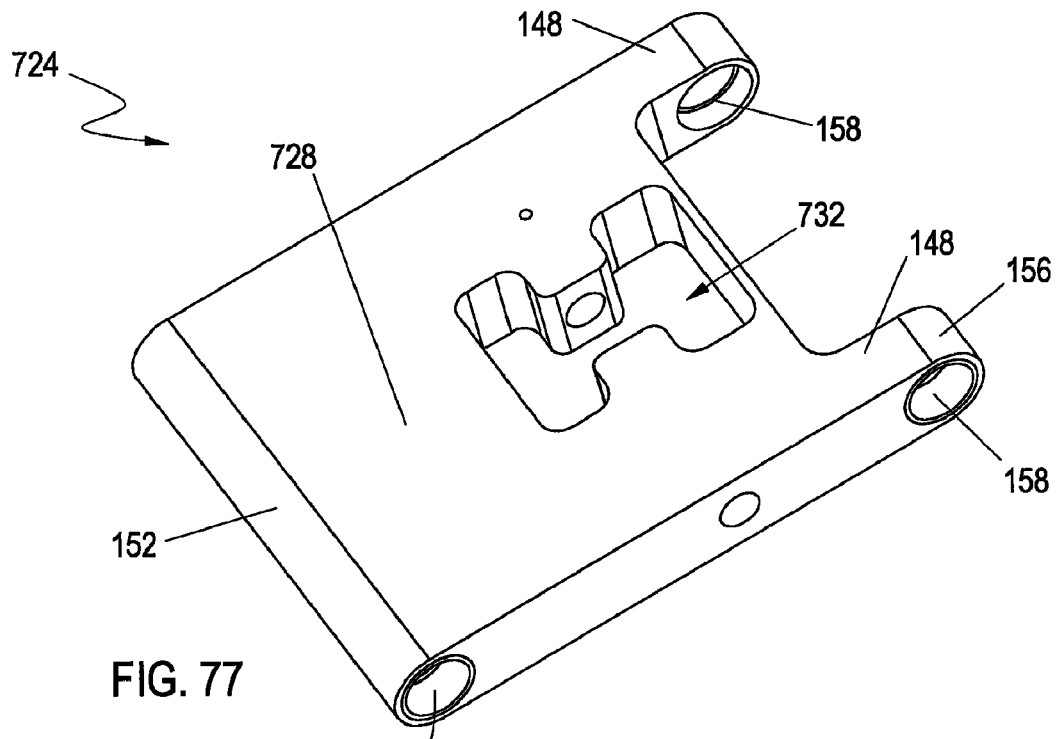
FIG. 77 is a perspective view of a swing arm used with the aircraft seat shown in FIG. 70.
Figure 78:
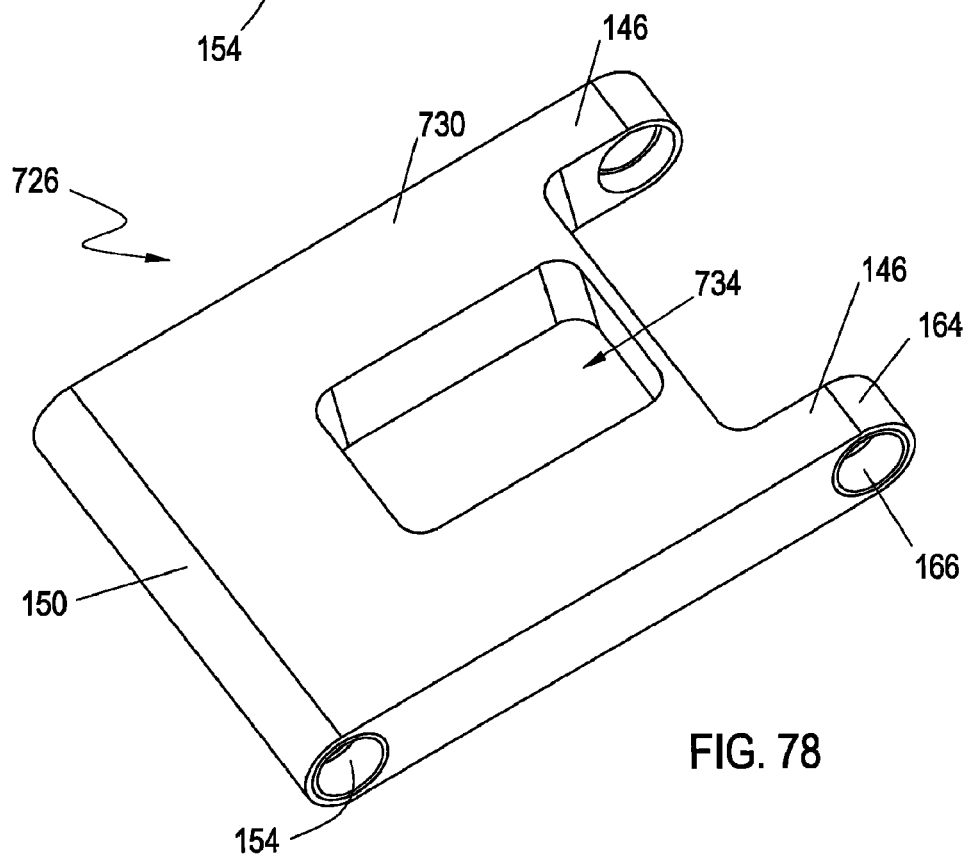
FIG. 78 is a perspective view of a swing arm used with the aircraft seat shown in FIG. 70.

However, as can be seen by reference to FIGS. 73-75, the lower support structure 102 is formed by a first plate member 704 and a second plate member 706 interconnected by a plurality of rigid cross members 708. The rigid cross members 708 are spaced apart along the plate members 704, 706. At least one cross member 708 is positioned proximate a forward end 710 of the lower support structure 102 and at least one cross member is positioned proximate a rearward end 712 of the lower support structure. One or more additional cross members may be provided between the forward and rearward ends 710, 712.

Figure 76:
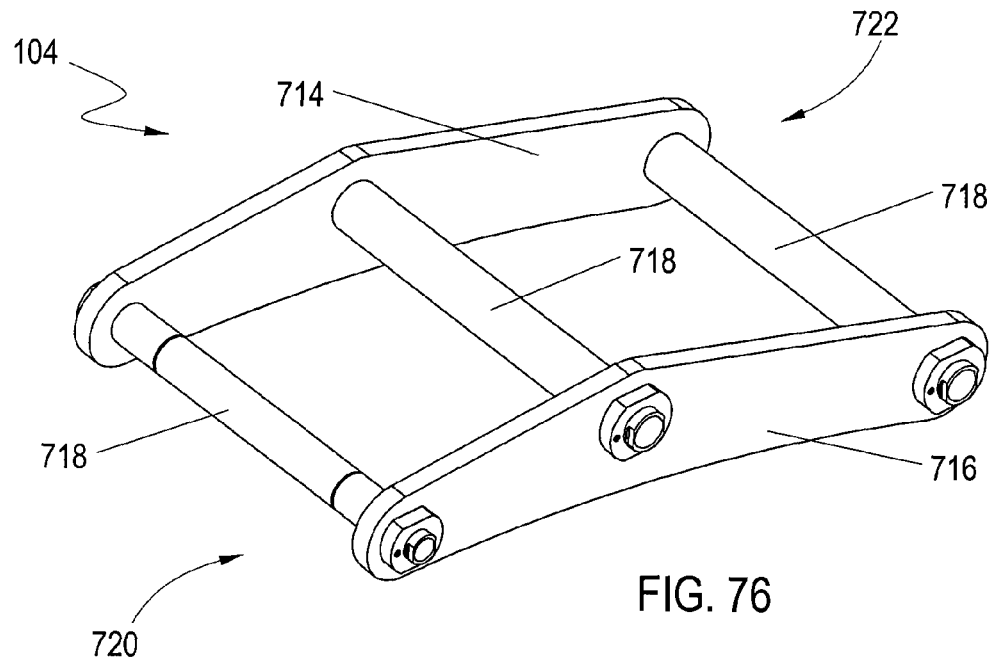
FIG. 76 is a perspective view of the mid support structure of the aircraft seat shown in FIG. 70.

Additionally, as can be seen by reference to FIGS. 73-74 & 76, mid support structure 104 includes a first plate member 714 and a second plate member 716 interconnected by a plurality of rigid cross members 718. Similar to the lower support structure, the rigid cross members 708 are spaced apart along the plate members 714, 716. At least one cross member 718 is positioned proximate a forward end 720 of the plates 714, 716 and at least one cross member is positioned proximate a rearward end 722 of the plates 714, 716. One or more additional cross members may be provided between the forward and rearward ends 720, 722.

The cross members 708, 718 may be attached to the respective plate members 704 or 706, or 716 or 718 by fittings substantially as described herein.

The mid support structure is movably connected to the lower support structure by swing arms 724 and 726 (see FIGS. 73-74 & 77-78). Swing arms 724 and 726 are substantially similar to swing arms 116 and 118 and like numerals have been used to reference like components, except that the swing arms 724 and 726 include a housing 728 and 730 bridging or forming a portion of the longitudinal arms 146, 148 of the respective arm members. The housing 728 and 730 may also include a recess 732, 734 for access or other purposes. The apertures 154 in the lower portion 150, 152 of each of the swing arms are adapted to receive and be pivotally movable on a cross member 708. Similarly, the apertures 158 and 166 in the upper portions 156, 164 of the swing arms form mid support receptors which are adapted to receive and be pivotally movable on a cross member 718.

The seat back structure 108 of FIG. 79, for use with the assembly 700 is substantially as described with respect to seat back structure 108 shown in FIGS. 22-25 and like numbers have been used to illustrate like components. However, the seat back structure 108 of FIG. 79 includes a cylindrical receptor 736 spanning between plate members 740 and forming the pivot support member. The cylindrical receptor 736 receives a cross member 718 of the mid support structure. Additionally, in the seat back structure of FIG. 79, pan support structure mounting members 738 are integrally connected to the plate members 740.

As can be seen by reference to FIGS. 70-81, the seat assembly 700 includes a seat back support structure connection to the mid support structure which is provided in the same location as the swing arm connection to the mid support structure. In comparison, the lower support structure, mid support structure and seat back support structure are arranged such that the seat assembly 100 described in reference to FIGS. 1-69 may include a seat back support structure connection to the mid support structure which is slightly below and forward of the swing arm connection to the mid support structure.

Recline actuator assembly 742 for seat assembly 700 is substantially as described with respect to recline actuator assembly 470 and like numbers have been used to illustrate like components. However, recline actuator assembly 742 includes a mid support structure mounting member 744 including a single cylindrical receptor 746 formed in a housing 748. The cylindrical receptor 746 is sized to receive a cross member 718 of the mid support structure. Similarly, the seat back structure connection member 750 is formed of a housing 752 having a cylindrical receptor 754 sized to receive a pivot bar or rod 756 spanning between the plate members 740 of the seat back support.

Vertical actuator assembly 756 for seat assembly 700 is substantially as described with respect to vertical actuator assembly 472 or 514 and like numbers have been used to illustrate like components. Vertical actuator assembly 756, however, includes a lower support structure mounting member 760 formed by a single cylindrical receptor 758 formed in a housing. The cylindrical receptor 758 is sized to receive a cross member 708 on the lower support structure. The mid support structure mounting member 762 is formed by a housing 764 which may receive a portion of the spring 530 and includes an aperture 766, which may be a cylindrical aperture through a portion thereof. The cylindrical aperture is sized to receive a cross member 718 on the mid support structure or alternatively a member or portion of the swing arm 724. In one example of an embodiment, as may be seen by reference to FIGS. 70-72, the vertical actuator assembly 756 connects to the swing arm 724 and may connect to a mid section of the swing arm 724, which connection may be off center.

Figure 82:
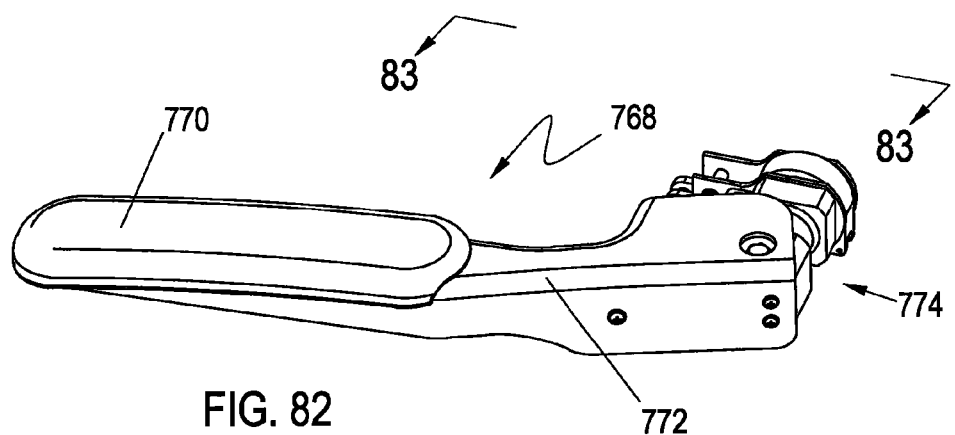
FIG. 82 is a perspective view of an alternative embodiment of an armrest assembly for use with the aircraft seat shown in FIG. 70.
Figure 83:
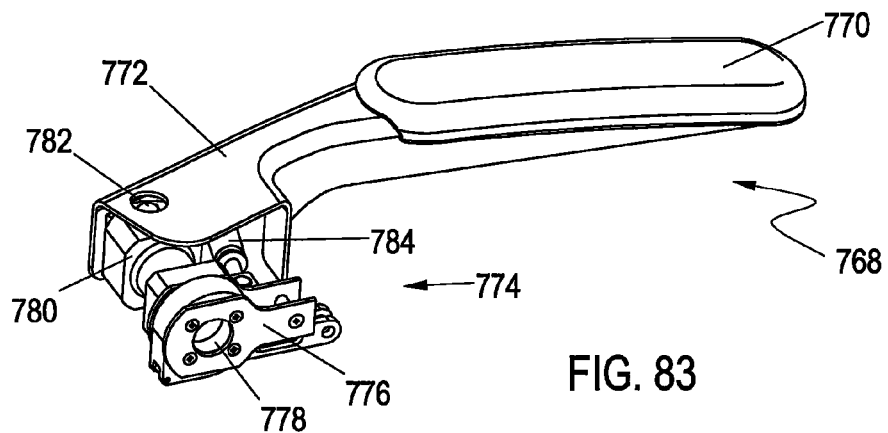
FIG. 83 is a perspective view of an alternative embodiment of an armrest assembly for use with the aircraft seat shown in FIG. 70, taken along the line 83-83 of FIG. 82.
Figure 84:
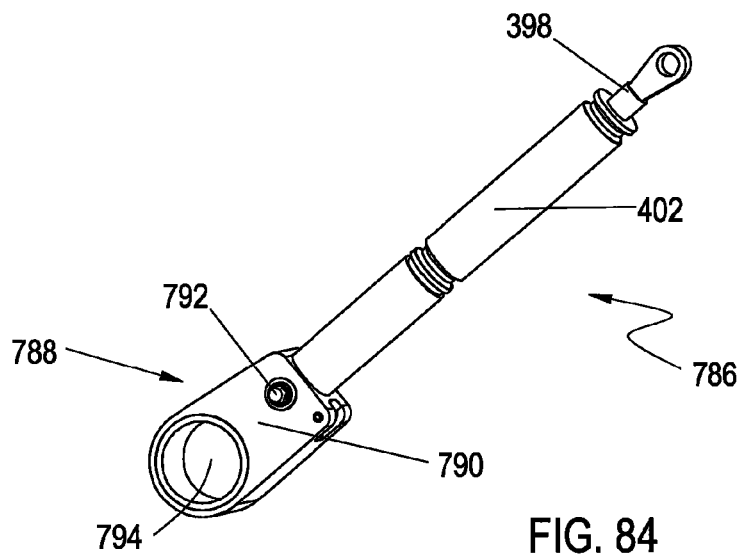
FIG. 84 is a perspective view of a telescoping arm assembly for use with an aircraft seat of FIG. 70, and for use with the armrest assembly shown in FIG. 82.

An alternative embodiment of an armrest assembly 768 is shown in FIGS. 82-84. Armrest assembly 768 is substantially similar to armrest assembly 216 and like numbers have been used to illustrate like components. Armrest assembly 768 includes a pad support 770 carried by a frame 772 substantially as described with respect to pad support 378 and frame 376. The housing or attachment member 774 for attachment to the seat assembly is provided with a first pivot assembly 776 including a throughbore or aperture 778 which may be rotatably received on the armrest mounting member 214. The first pivot assembly 776 is pivotal about the axis formed by the armrest mounting member 214. The housing 774 also includes a second pivot assembly 780. The second pivot assembly includes a pivot member 782 or pin arranged for pivoting about an axis formed by the pivot member and perpendicular to the pivot axis of the first pivot assembly 776. First pivot assembly 776 may be linked or controlled by a first telescoping arm assembly 786 (see FIG. 84). The first telescoping arm assembly is operably attached for movement of the first pivot assembly and may be linked or attached to the lap belt mounting member 212 on a first end and to the armrest mounting member 214 or the housing 774 on a second end (see FIG. 72). The first telescoping arm assembly 786 includes a first arm member 398 connected to a telescoping arm assembly 402 or sleeve. The telescoping arm assembly 786 may be, in one embodiment, a mechlok. A connection member or link assembly 788 is carried by the second telescoping arm assembly and includes an aperture 794 in housing 790 which may receive, for example, the lap belt mounting member 212. The link assembly 788 is connected to the second telescoping arm assembly by a pivot member or pin 792. A telescoping arm assembly 784 substantially identical to telescoping arm assembly 786 may also be provided for control or locking of the pivot of the second pivot assembly 780. To this end, the telescoping arm assembly may be attached on one end to the frame 772 and on a second end to the first pivot assembly 776 or housing 774. The second telescoping arm assembly 784, in one embodiment, may be a mechlok. As with the previously described embodiments, the first and second pivot assemblies permit pitch adjustment for height and allow yaw adjustment for stowage. The armrest assembly 768 may be further provided with a stop, which may be integrally provided or a separate component added to the armrest or frame of the seat assembly, for stopping pitch or yaw movement. The stop for arresting pitch or yaw movement may be arranged to stop pitch movement or yaw movement in one direction or may be arranged to stop movement in both directions.

Operation of the aircraft seat assembly 700 is substantially identical to the operation of aircraft set assembly 100 described hereinabove and will therefore not be further discussed herein. Similarly, operation of the armrest assembly 768 is substantially identical to the operation of armrest assembly 216 and will therefore not be discussed in further detail herein. Likewise, construction of the assemblies is substantially identical to that described hereinabove and will therefore not be further discussed herein.

The aircraft seat and examples of embodiments described herein provide numerous advantages over traditional aircraft seats. The aircraft seat is capable of withstanding the structural load requirements of an aircraft seat, includes an integral occupant restraint and includes a coordinated recline—seat bottom motion which can be locked into a specific reclined position. Main structural adjustments are driven by two centrally-located actuators such that the actuators may be interchanged with other mechanical or electromechanical actuators with no modification to seat structure. Moreover, the fittings of the frame provide high-precision interface features and localized structural reinforcement to the plates. In comparison, traditional seat assemblies include actuators for a single seat adjustment, usually recline, and the seat structure and actuator attachment fittings are not designed to remove or drop in another actuator without significant modification to the seat structure. The adjustable thigh angle drives the entire angle of the pan support structure, yet does not affect the coordinated recline feature. Furthermore, many of the structural components of the aircraft seat can be made from a flat composite plate of the same unidirectional composition with no machining performed to modify or reduce thickness, such as pocketing. Thus, only two-dimensional cutting of outside part profiles and drilling or machining of holes is performed or necessary.

Generally, the seat geometry allows for a significantly larger range of vertical adjustment than currently possible. This large range provides the flexibility to have a greater range of vertical adjustment by for example, the use of a different actuator or a shift in the adjustment range upward by raising the low seat reference point height via modification of the current actuator housing. In a preferred embodiment, the recline adjustment mechanism is arranged to "cradle" the occupant during recline, allowing the user to recline by not only pivoting at the pelvis, but also at the knees and ankles, helping to support the user in different positions during different phases of flight. This cradle-effect is accomplished by the placing of the seat back pivot point well forward and below the seat reference point and allowing the seat pan/bottom to articulate as the seat back is reclined in a dependent motion. Advantageously, the use of the mid-support structure permits the pan support structure move in the four-bar motion. As a result, implementation of this geometry/configuration provides a downward seat reference point motion and increasing thigh angle by a proportionate amount as the seat is reclined. Preferably, the adjustable thigh angle mechanism accommodates a greater range of occupant foot position and accommodates occupant preference for thigh pressure.

To this end, an aircraft seat is provided which cradles the occupant during recline, allowing the occupant to recline by pivoting not only at the pelvis, but also at the knees and ankles. This is accomplished by placing the seat back pivot point well forward and below the seat reference point, and allowing the seat pan/bottom to articulate as the seat back is reclined in a dependent motion. Implementation of this configuration results in downward seat reference point motion and increasing thigh angle as the seat is reclined, which in turn, keeps the occupant better positioned in the seat and more comfortable over a longer duration.

The bottom cushion of the aircraft seat provides the ability to the pilot to fully-extend his or her legs to fully actuate the rudder pedals of the aircraft. The cushion uses a wedge-shaped design, with firm foam under the Ischial Tuberosities of the occupant, and softer, thicker foam under the legs. This softer, thicker foam provides the necessary support to the occupant, but can be depressed during full rudder actuation without hindrance.

The aircraft seat also includes a seat back which is a contoured, flexible shell having a thin foam for seat back support surface. The contour provides support in appropriate locations, but is not exclusionary. The flexibility of the shell and its mounting locations allows the seat back to flex in response to occupant movements, as well as differing occupant sizes. If the occupant twists the seat back, the seat back twists some amount with the occupant.

The armrests may incorporate a pitch adjustment for height and armrest leveling, as well as a yaw adjustment for lateral adjustment during use, as well as stowage. The armrests, which include the foregoing described features and include a curved pad, better accommodate a range of occupants than traditional planar pads with tilting adjustments. The curved pad ensures that there is always a portion of the pad that is parallel to the floor and the height adjustment allows the occupant to set the proper elbow height. Furthermore, in one embodiment of the armrest 374 (shown in FIG. 39) the vertical adjustment axis of the armrests is not parallel to the seat back angle, but forward leaning. As a result, as the armrests are adjusted upward for taller occupants, they move forward effectively lengthening the armrest.

The headrest includes a top pivot, which allows the bottom edge of the headrest to move forward, resulting in a pad surface that more closely matches the curvature of the upper neck and base of the head.

As can be seen from the foregoing, an aircraft seat has been provided that has improved comfort, more easily accommodates a variety of occupant sizes, and meets the performance requirements of an aircraft seat.

While specific ranges of motion are provided herein, it is understood that variations may be made thereon without departing from the overall scope of the present invention.

Additionally, although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A seat for use in an aircraft having a floor comprising a support assembly having at least first and second support plates adapted to be secured to the floor, a seat carried by the support assembly and having a seat plate for supporting a seat cushion and a seat back pivotably coupled to the support assembly and having at least first and second back support plates for supporting a back cushion, the first and second support plates and the seat plate and the first and second back support plates each being made of a composite material, wherein the composite material is the same composite material and having the same thickness for facilitating manufacture of the seat.

2. The seat of claim 1 wherein the seat back has a length and the first and second back support plates extend substantially the entire length of the seat back.

3. The seat of claim 1 wherein the support assembly includes third and fourth support plates coupled respectively between the first and second support plates and the seat plate, the third and fourth support plates being made of the composite material and having the same thickness as the first and second support plates.

* * * * *

UNITED STATES PATENT AND TRADEMARK OFFICE
CERTIFICATE OF CORRECTION

PATENT NO. : 8,087,729 B2
APPLICATION NO. : 12/330892
DATED : January 3, 2012
INVENTOR(S) : Kladde Page 1 of 1

It is certified that error appears in the above-identified patent and that said Letters Patent is hereby corrected as shown below:

In the Specification

In Column 3, Line 42, delete "is top" and insert -- is a top --, therefor.

In Column 4, Line 26, delete "is rear" and insert -- is a rear --, therefor.

In Column 4, Line 36, delete "is a end" and insert -- is an end --, therefor.

In Column 5, Line 3, delete "in an maximum" and insert -- in a maximum --, therefor.

In Column 5, Line 6, delete "in an maximum" and insert -- in a maximum --, therefor.

In Column 7, Line 39, delete "farther" and insert -- further --, therefor.

In Column 14, Line 15, delete "a arm" and insert -- an arm --, therefor.

In Column 21, Line 16, delete "structure this" and insert -- structure, this --, therefor.

In Column 32, Line 19, after "skilled in", insert -- the art will recognize that steps and operations may be rearranged, replaced, or eliminated --.

Signed and Sealed this
Twenty-second Day of October, 2013

Teresa Stanek Rea
*Deputy Director of the United States Patent and Trademark Office*